United States Patent
Sugio et al.

(10) Patent No.: US 10,554,999 B2
(45) Date of Patent: Feb. 4, 2020

(54) VIDEO ENCODING METHOD, VIDEO ENCODING DEVICE, VIDEO DECODING METHOD AND VIDEO DECODING DEVICE

(71) Applicant: Sun Patent Trust, New York, NY (US)

(72) Inventors: Toshiyasu Sugio, Osaka (JP); Takahiro Nishi, Nara (JP); Youji Shibahara, Tokyo (JP); Kyoko Tanikawa, Osaka (JP); Hisao Sasai, Osaka (JP); Toru Matsunobu, Osaka (JP); Kengo Terada, Osaka (JP)

(73) Assignee: SUN PATENT TRUST, New York, NY (US)

( * ) Notice: Subject to any disclaimer, the term of this patent is extended or adjusted under 35 U.S.C. 154(b) by 41 days.

(21) Appl. No.: 15/367,603

(22) Filed: Dec. 2, 2016

(65) Prior Publication Data

US 2017/0085911 A1    Mar. 23, 2017

Related U.S. Application Data

(63) Continuation of application No. 14/130,390, filed as application No. PCT/JP2013/000246 on Jan. 21, 2013, now Pat. No. 9,560,353.
(Continued)

(51) Int. Cl.
*H04N 19/52*    (2014.01)
*H04N 19/597*    (2014.01)
*H04N 19/513*    (2014.01)

(52) U.S. Cl.
CPC .......... *H04N 19/52* (2014.11); *H04N 19/513* (2014.11); *H04N 19/597* (2014.11)

(58) Field of Classification Search
CPC ....................................................... H04N 19/52
(Continued)

(56) References Cited

U.S. PATENT DOCUMENTS

| 6,430,224 B1 | 8/2002 | Naito et al. |
| 2007/0071107 A1* | 3/2007 | Ha ..................... H04N 19/597 375/240.24 |

(Continued)

FOREIGN PATENT DOCUMENTS

| JP | 11-252586 | 9/1999 |
| JP | 2000-32447 | 1/2000 |

(Continued)

OTHER PUBLICATIONS

International Search Report dated Apr. 2, 2013 in corresponding International Application No. PCT/JP2013/000246.
(Continued)

*Primary Examiner* — Yulin Sun
(74) *Attorney, Agent, or Firm* — Wenderoth, Lind & Ponack, L.L.P.

(57) ABSTRACT

A moving picture coding method including: determining whether or not (a) a picture including a co-located block and (b) a current picture to be coded are included in a same view, the co-located block being a block that is included in a picture different from the current picture and is at a position corresponding to a position of a current block to be coded included in the current picture; adjusting the position of the co-located block when the picture including the co-located block and the current picture are included in different views; and adding to the list an entry including a motion vector derived from the co-located block, wherein the adjusting includes: obtaining a disparity vector between the view including the picture including the co-located block and the view including the current picture; and adjusting the position of the co-located block by the obtained disparity vector.

2 Claims, 47 Drawing Sheets

Related U.S. Application Data

(60) Provisional application No. 61/591,420, filed on Jan. 27, 2012.

(58) Field of Classification Search
USPC .................................................. 375/240.16
See application file for complete search history.

(56) References Cited

U.S. PATENT DOCUMENTS

| | | |
|---|---|---|
| 2008/0170618 A1 | 7/2008 | Choi et al. |
| 2008/0240240 A1 | 10/2008 | Kodama |
| 2009/0304084 A1 | 12/2009 | Hallapuro |
| 2012/0062756 A1* | 3/2012 | Tian .................... H04N 19/008 |
| | | 348/218.1 |

FOREIGN PATENT DOCUMENTS

| | | |
|---|---|---|
| JP | 2008-252176 | 10/2008 |
| JP | 2010-516158 | 5/2010 |
| WO | 2008/084997 | 7/2008 |
| WO | 2010/078212 | 7/2010 |
| WO | 2011/062082 | 5/2011 |

OTHER PUBLICATIONS

ITU-T Recommendation H.264, Advanced video coding for generic audiovisual services, Mar. 2010.

Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803-d2, 6th Meeting: Torino, IT, Jul. 14-22, 2011.

Benjamin Bross et al., "WD5: Working Draft 5 of High-Efficiency Video Coding", Joint Collaborative Team on Video Coding (JCT-VC) of ITU-T SG16 WP3 and ISO/IEC JTC1/SC29/WG11, JCTVC-G1103_d7, Ver.8, 7th Meeting: Geneva, CH, Nov. 21-30, 2011.

* cited by examiner

FIG. 2A

RefPicList0 (Reference picture list L0)

| Value of refIdxL0 | Value of RefPicList0 [refIdxL0] = picNum |
|---|---|
| 0 | RefPicList0 [0] = 301 |
| 1 | RefPicList0 [1] = 300 |
| ... | ... |
| 11 | RefPicList0 [11] = 303 |
| 12 | RefPicList0 [12] = 304 |

Descending order ↓

Ascending order ↓

FIG. 2B

Picture including co-located block

RefPicList1 (Reference picture list L1)

| Value of refIdxL1 | Value of RefPicList1 [refIdxL1] = picNum |
|---|---|
| 0 | RefPicList1 [0] = 303 |
| 1 | RefPicList1 [1] = 304 |
| ... | ... |
| 13 | RefPicList1 [11] = 301 |
| 14 | RefPicList1 [12] = 300 |

Ascending order ↓

Descending order ↓

(STEP1) ScaleFactor = tb / tx = (302 - 301) / (303 - 301) = 1/2 = 0.5
(STEP2) mvL0        = ScaleFactor * mvL0Col
(STEP3) mvL1        = mvL0 - mvL0Col

FIG. 6

Otherwise, the motion vectors mvL0, mvL1 are derived as scaled versions of the motion vector mvCol of the co-located sub-macroblock partition as specified below (see Figure 8-2).

| | |
|---|---|
| tx = (16384 + Abs(td / 2)) / td        STEP1 | (8-199) |
| DistScaleFactor = Clip3(-1024, 1023, (tb * tx +32) >> 6) | (8-200) |
| mvL0 = (DistScaleFactor * mvCol + 128) >> 8    STEP2 | (8-201) |
| mvL1 = mvL0 - mvCol        STEP3 | (8-202) | where tb and td are derived as:

tb = Clip3(-128, 127, DiffPicOrderCnt(currPicOrField, pic0))    (8-203)

td = Clip3(-128, 127, DiffPicOrderCnt(pic1, pic0))    (8-204)

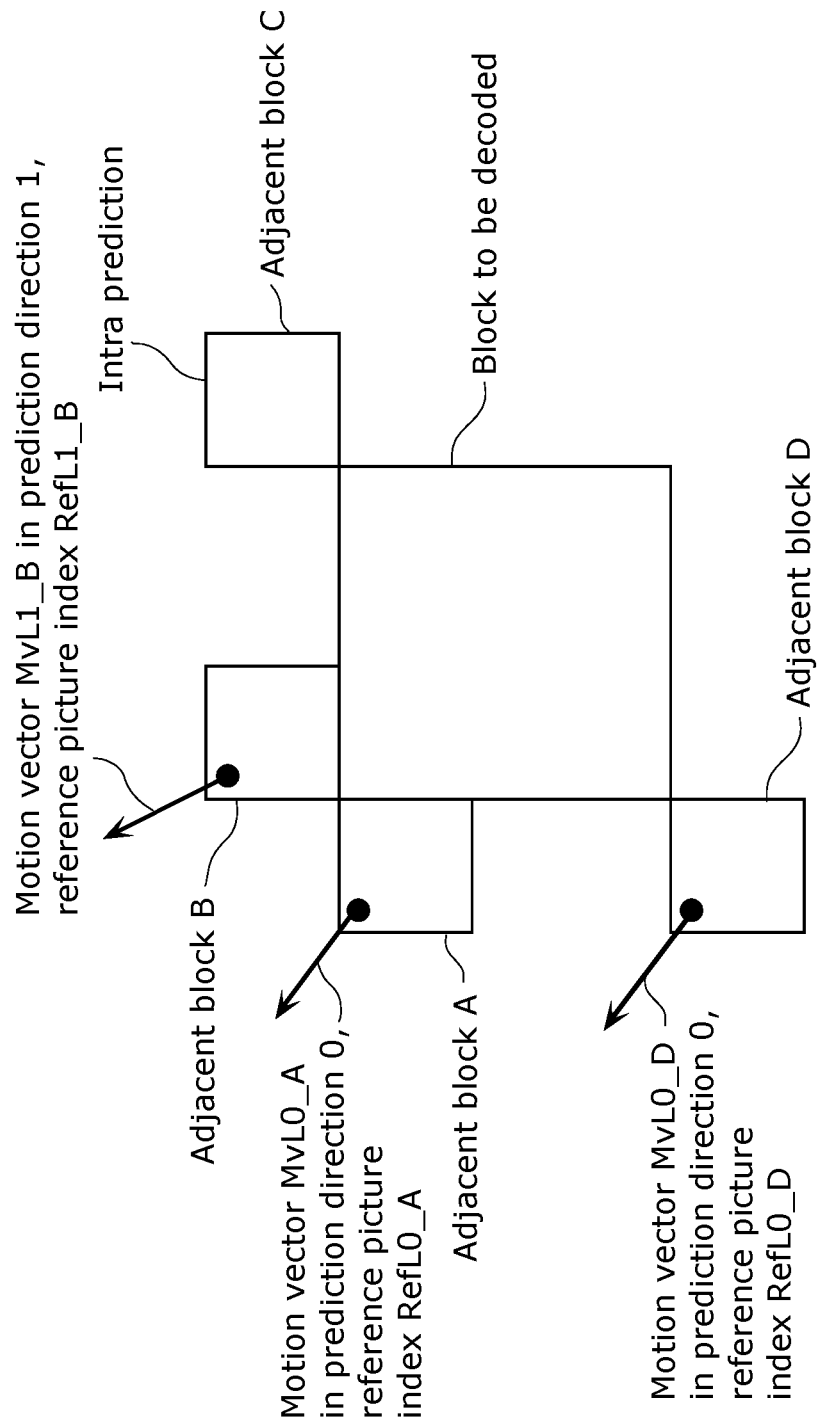

FIG. 12A

Motion vector predictor candidate list L0

| Motion vector predictor candidate designating index for prediction direction 0 | Motion vector predictor candidate in prediction direction 0 | N |
|---|---|---|
| 0 | Adjacent block Ak (MvL0_A[1], RefL0_A[1]) | A[0..k] |
| 1 | Adjacent block Bk (MvL0_B[0], RefL0_B[0]) | B[0..k] |
| a | Co-located block (MvL0_Col, RefL0_Col) | Col |

FIG. 12B

Motion vector predictor candidate list L0 (The number of candidates 2)

| Motion vector predictor candidate designating index for prediction direction 1 | Motion vector predictor candidate in prediction direction 1 | N | A[0..k] |
|---|---|---|---|
| 0 | Adjacent block Ak (MvL1_A[0], RefL1_A[0]) | | |
| 1 | Co-located block (MvL1_Col, RefL1_Col) | | Col |

FIG. 18A

| Motion vector predictor candidate designating index for prediction direction 0 | Motion vector predictor candidate in prediction direction 0 | N |
|---|---|---|
| 0 | Adjacent block Ak (MvL0_A[0], RefL0) | A[0..k] |
| 1 | Adjacent block Bk (MvL0_B[1], RefL0) | B[0..k] |
| 2 | Co-located block (MvL0_Col, RefL0), or block adjusted by disparity Transd_colBlk (MvL0_Transd_Col, RefL0_Transd_Col) | Col |

FIG. 18B

| Motion vector predictor candidate designating index for prediction direction 1 | Motion vector predictor candidate in prediction direction 1 | N | A[0..k] |
|---|---|---|---|
| 0 | Adjacent block Ak (MvL1_A[0], RefL1) | | |
| 1 | Co-located block (MvL1_Col, RefL1), or block adjusted by disparity Transd_colBlk (MvL1_Transd_Col, RefL1_Transd_Col) | Col | |

FIG. 25

```
   /* obtaining the picture Number (POC #) of
      co_located block (first entry of RefList (ordinally L1) */
1: colPic = RefList(1 - co_located_l0_flag))[0];

/*determining whether the currPic is in (or is not in)
     the same sequence of the colPic) */
2: if (view_id (currPic) != view_id (colPic)) {
3:    co_located_position =
      position + disparity_vector (view_id (currPic),view_id (colPic));
      /* STEP: (if not in the same sequence),
           offsetting (calibrating) the position
              with the disparity vector */
4:}
5: append_mv_data (co_located_position, colPic);
   /* obtain motion data (mv, refidx)
      for the same or offsetted position */
```

FIG. 26
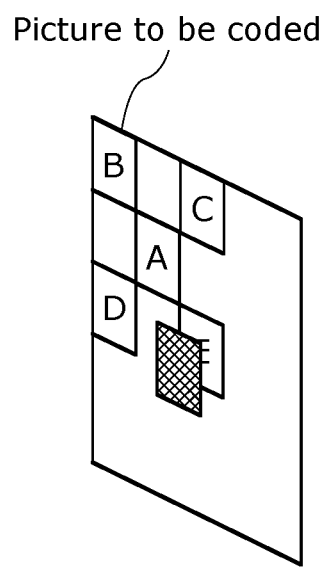
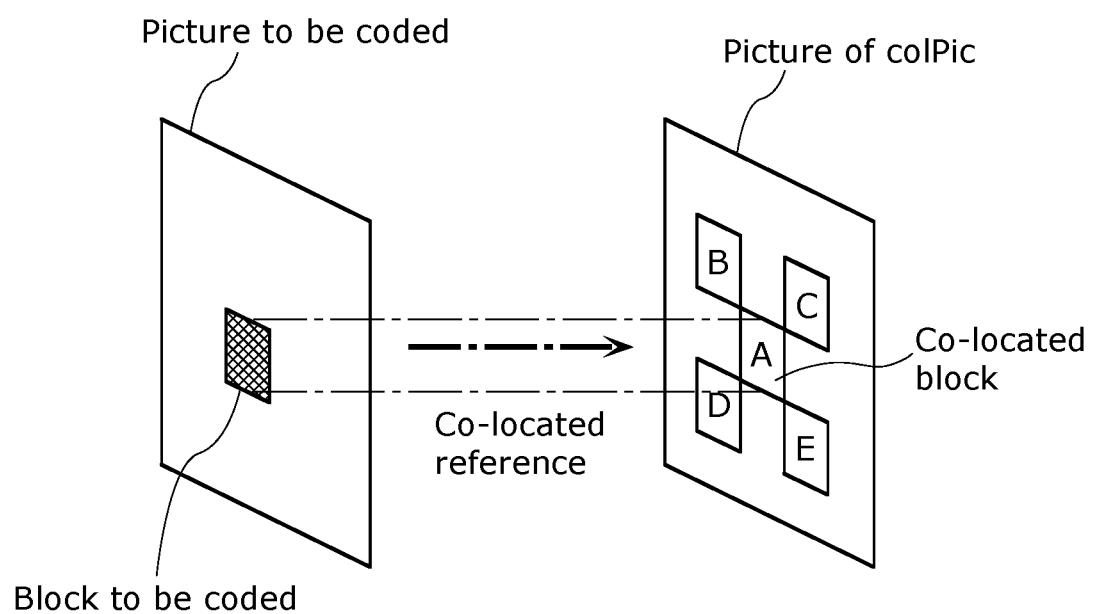

FIG. 33

| Video stream (PID=0x1011, Primary video) |
|---|
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 44
| Corresponding standard | Driving frequency |
|---|---|
| MPEG-4 AVC | 500 MHz |
| MPEG-2 | 350 MHz |
| ⋮ | ⋮ |
FIG. 45A
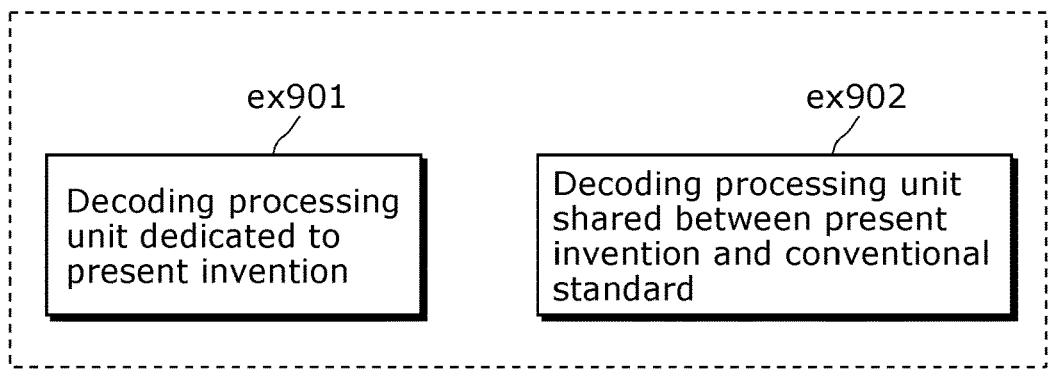
ex900
FIG. 45B
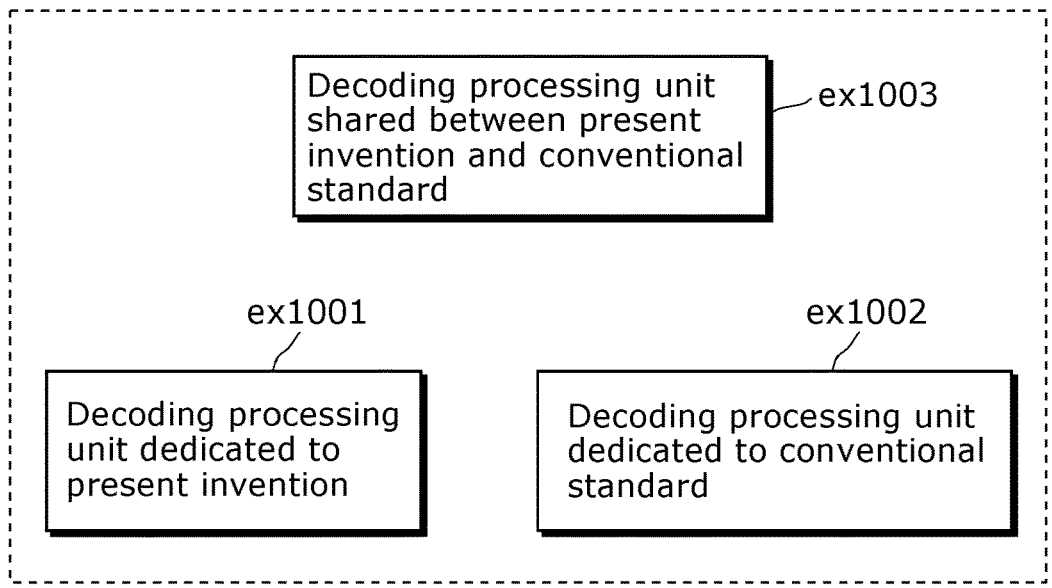
ex1000

VIDEO ENCODING METHOD, VIDEO ENCODING DEVICE, VIDEO DECODING METHOD AND VIDEO DECODING DEVICE

TECHNICAL FIELD

The present invention relates to a moving picture coding method and a moving picture decoding method.

BACKGROUND ART

In moving picture coding, the quantity of information is generally reduced using redundancy of moving pictures in spatial and temporal directions. Here, a method using the redundancy in the spatial direction is represented by transform into frequency domain. A method using the redundancy in the temporal direction is represented by inter-picture prediction (hereinafter referred to as "inter prediction") coding. In the inter prediction coding, when a current block to be coded included in a current picture to be coded is coded, at least one coded picture preceding or following the current picture in display time order are used as a reference picture. Then, a motion vector is derived through motion estimation of the current block with respect to the reference picture. Subsequently, the redundancy in the temporal direction is removed by calculating a difference between input image data of the current block and prediction image data of the current block resulting from motion compensation based on the derived motion vector (see Non Patent Literature (NPL) 1, for instance).

CITATION LIST

Non Patent Literature

[NPL 1] ITU-T Recommendation H.264, Advanced video coding for generic audiovisual services, March 2010

[NPL 2] HEVC WD4: Working Draft 4 of High-Efficiency Video Coding Joint Collaborative Team on Video Coding (JCT-VC) of ITU-T SG16 WP3 and ISO/IEC JTC1/SC29/WG11 6th Meeting: Torino, IT, 14-22 Jul. 2011, Document: JCVC-F803_d2

SUMMARY OF INVENTION

Technical Problem

It is desired to further increase coding efficiency in the conventional inter prediction coding.

In view of this, the present invention provides a moving picture coding method which makes it possible to increase coding efficiency.

Solution to Problem

A moving picture coding method according to an aspect of the present invention is a moving picture coding method for coding a moving picture using a list having at least one entry including a motion vector, the method including: determining whether or not (a) a picture including a co-located block and (b) a current picture to be coded are included in a same view, the co-located block being a block that is included in a picture different from the current picture and is at a position corresponding to a position of a current block to be coded included in the current picture; adjusting the position of the co-located block when the picture including the co-located block and the current picture are included in different views; and adding to the list an entry including a motion vector derived from the co-located block, wherein the adjusting includes: obtaining a disparity vector between the view including the picture including the co-located block and the view including the current picture; and adjusting the position of the co-located block by the obtained disparity vector.

These general and specific aspects may be implemented using a system, a device, an integrated circuit, a computer program, or a computer-readable recording medium such as a CD-ROM, or any combination of systems, devices, integrated circuits, computer programs, or computer-readable recording media.

Advantageous Effects of Invention

A moving picture coding method according to an aspect of the present invention makes it possible to increase coding efficiency.

BRIEF DESCRIPTION OF THE DRAWINGS

FIG. 2A is a table showing a reference picture list L0.

FIG. 2B is a table showing a reference picture list L1.

FIG. 6 is a diagram showing equations for scaling process described in NPL 1.

FIG. 7 is a diagram for illustrating spatial direct mode.

FIG. 12A is a table showing an exemplary motion vector predictor candidate list according to Embodiment 1.

FIG. 12B is a table showing an exemplary motion vector predictor candidate list according to Embodiment 1.

FIG. 18A is a table showing an exemplary motion vector predictor candidate list when a position of a co-located block is adjusted according to Embodiment 1.

FIG. 18B is a table showing an exemplary motion vector predictor candidate list when a position of a co-located block is adjusted according to Embodiment 1.

FIG. 25 is a diagram showing, in pseudo code, processing of adding motion data of a co-located block to a motion vector predictor candidate list according to Embodiment 2.

FIG. 26 is a diagram showing an exemplary current picture to be coded.

FIG. 33 illustrates a structure of the multiplexed data.

FIG. 44 shows an example of a look-up table in which standards of video data are associated with the driving frequencies.

FIG. 45A shows an example of a configuration for sharing a module of a signal processing unit.

FIG. 45B shows another example of a configuration for sharing a module of a signal processing unit.

DESCRIPTION OF EMBODIMENTS

Underlying Knowledge Forming Basis of Present Invention

In NPL 1, when a current block to be decoded is included in a B slice or the like, the current block is decoded by inter prediction decoding using, as reference pictures, two pictures different from a current picture to be decoded (a picture including the current block).

Figure 1:
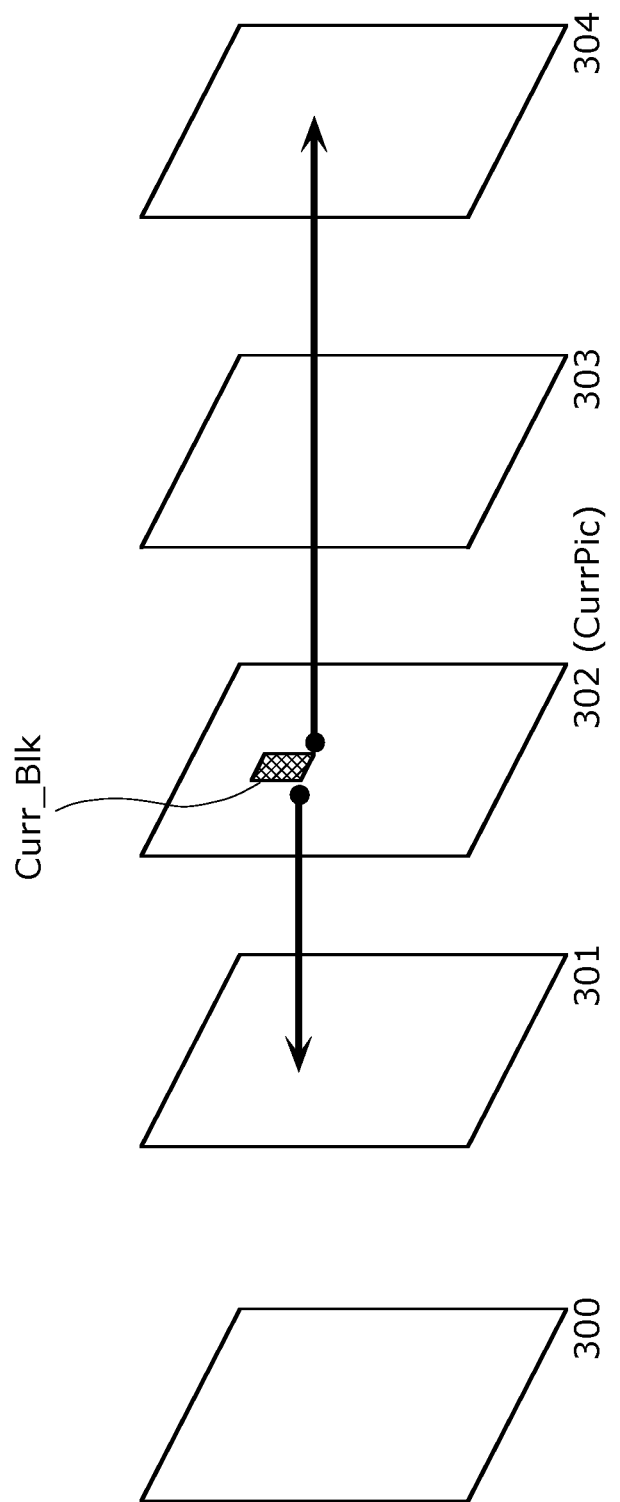
FIG. 1 is a diagram for illustrating inter prediction decoding of a current block to be decoded in H.264.

FIG. 1 is a diagram for illustrating two pictures referred to in inter prediction decoding of a current block to be decoded. The numerals "300" to "304" shown in FIG. 1 each indicate a picture number (PicNum). In FIG. 1, pictures whose picture numbers are "300" to "304" are arranged in ascending display order (PicOrderCnt).

A current block to be decoded (Curr_Blk) is included in a current picture to be decoded (CurrPic) having the picture number "302." In this example, the current block is decoded by inter prediction using, as reference pictures, the picture having the picture number "301" and preceding the current block in the display order, and the picture having the picture number "304" and following the current picture in the display order.

Hereinafter, a starting point of an arrow indicates a position of a picture used in decoding (referring) (a picture to be decoded). Moreover, an end point of the arrow indicates a picture used for decoding (referred to) (a reference picture).

Each of FIG. 2A and FIG. 2B is a table showing a reference picture list. Specifically, FIG. 2A shows a reference picture list L0 (RefPicList0) for identifying the first reference picture. Moreover, FIG. 2B shows a reference picture list L1 (RefPicList1) for identifying the second reference picture.

Each of the reference picture lists is a list for identifying a reference picture used for inter prediction of a current block to be decoded, not with a picture number but with an index value having a smaller value than the picture number. In other words, it is determined which picture in the reference picture list is used as a reference picture for decoding of the current block by inter prediction, based on an index value in the reference picture list.

Each of the reference picture lists is initialized (generated) when a B slice including the current block is decoded. In the initialization, the picture numbers are arranged to allow different picture numbers to correspond to indexes having small values in the reference picture list L0 and the reference picture list L1.

In FIG. 2A and FIG. 2B, each reference picture list is divided into the first part including the picture numbers smaller than the picture number "302" of the current picture, and the second part including the picture numbers larger than the picture number "302." In the reference picture list L0, the first part and the second part are arranged in this order. Moreover, in the reference picture list L1, the first part and the second part are arranged in reverse order.

Here, the picture numbers are arranged in descending order ("301," "300," . . . ) in the first part. Moreover, the picture numbers are arranged in ascending order ("303," "304," . . . ) in the second part.

For instance, when the index value "0" is obtained by parsing a bitstream, the following two pictures are determined as reference pictures to be used for inter prediction decoding of a current picture to be decoded. The first picture is a picture having the picture number "301" identified by the index value "0" in the reference picture list L0. In addition, the second picture is a picture having the picture number "303" identified by the index value "0" in the reference picture list L1.

Moreover, in the example shown in FIG. 1, "0" for identifying the picture number "301" in the reference picture list L0 is assigned as a value of the first index (refIdxL0). In addition, "1" for identifying the picture number "304" in the reference picture list L1 is assigned as a value of the second index (refIdxL1).

Figure 3:
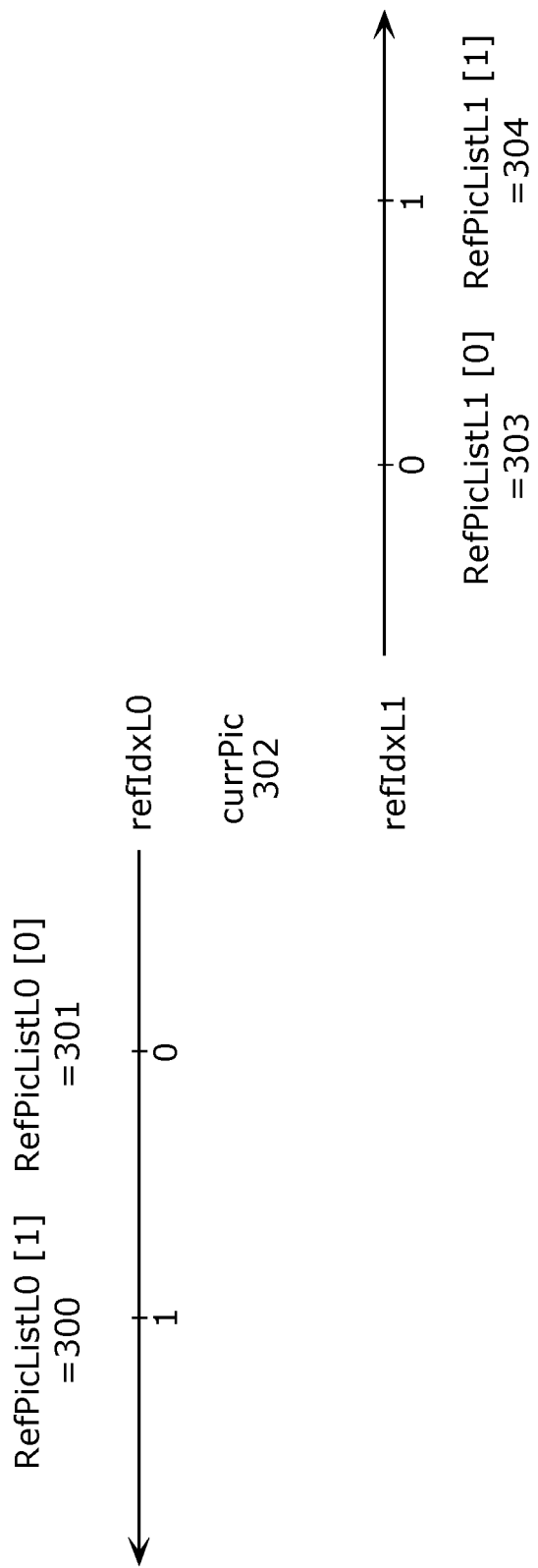
FIG. 3 is a diagram for illustrating a correspondence relationship between an index value and a picture number.

FIG. 3 is a diagram for illustrating a correspondence relationship between an index value and a picture number. In FIG. 3, a picture having a corresponding picture number goes away from the current picture (picNum=302) farther as an index value (a value of refIdxL0 and a value of refIdxL1) increases.

In particular, in the reference picture list L1, picture numbers of pictures (pictures that are decoded and stored in a memory) following the current picture (greater than PicOrderCnt (CurrPic)) are set to smaller index values in descending order. Hereinafter, this setting rule is referred to as Rule 1. According to Rule 1, a picture identified by the index value "0" in the reference picture list L1 is the picture having the picture number 303 (RefPicList1[0]=303) in FIG. 3.

Moreover, methods for coding and decoding a motion vector (mvL0, mvL1) showing which block position in a reference picture identified using a reference picture list is referred to have been examined in various ways. One of the methods is a method for directly deriving a motion vector from coded (decoded) data without using information from a bitstream (H.264 direct mode). Another one of the methods is a method for deriving a motion vector predictor, obtaining a motion vector difference from a bitstream, and deriving a motion vector using the motion vector predictor and the motion vector difference (mode through H.264 motion vector predictor derivation) (see Equations (8-174), (8-175), and so on of NPL 1).

[(1) H.264 Direct Mode]

In H.264, there is a mode, called a direct mode, for deriving a motion vector for generating a prediction image (Sections 8.4.2.1, 3.45, and so on of NPL 1). The H.264 direct mode includes two modes, that is, a temporal direct mode and a spatial direct mode.

In the temporal direct mode (temporal mode), a result of scaling, at a predetermined rate, a motion vector (mvCol) of a co-located block (Col_Blk) that is a block which is spatially co-located with a current block to be decoded (but is included in a temporally different picture) is used.

In the spatial direct mode, information (hereinafter, referred to as motion data) about a motion vector of a block which is not spatially co-located with a current block to be decoded (but is temporally included in a picture of the same display time) is used.

Figure 4:
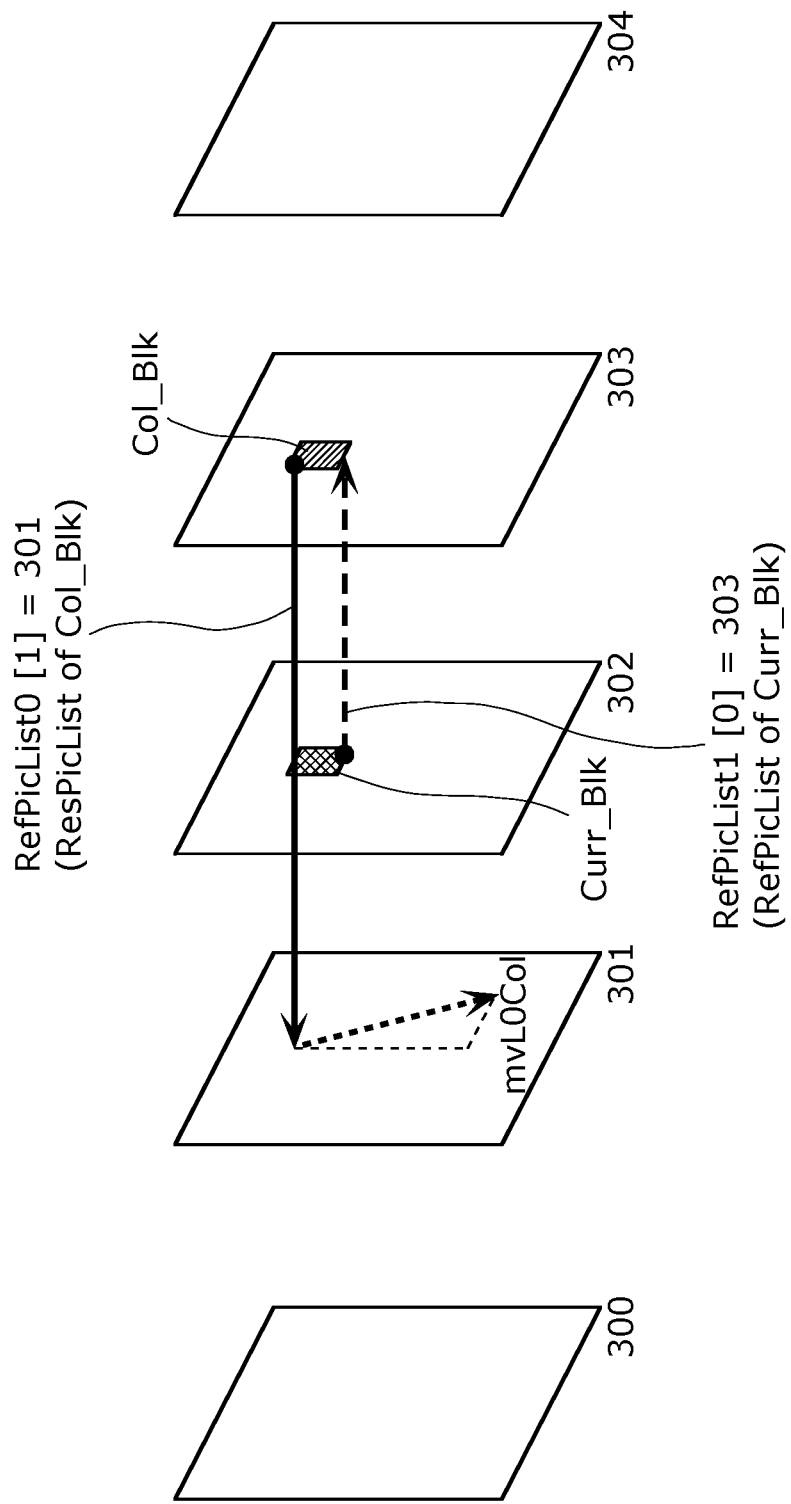
FIG. 4 is a diagram for illustrating information used in temporal direct mode in H.264.

FIG. 4 is a diagram for illustrating information used in the temporal direct mode.

In the temporal direct mode, first, motion data of Col_Blk is obtained. Col_Blk is a block included in the picture identified by the index value "0" in the reference picture list L1 and co-located with a current block to be decoded. As shown in FIG. 4, in the reference picture list L1 initialized based on above Rule 1, the picture identified by the index value "0" is a picture most immediately following a current picture to be decoded except when there is a special case where following pictures are not included in a picture memory.

Next, in the temporal direct mode, a motion vector of Curr_Blk is derived using the motion data of Col_Blk. The motion data includes the following.

(i) Reference Picture (refIdxL0[Refidx]) Used for Inter Prediction of Col_Blk

In FIG. 4, the picture having the picture number 301 (RefPicList0[1]=301) is used as a reference picture of Col_Blk.

(ii) Motion Vector (mvL0Col) Used for Inter Prediction of Col_Blk

In FIG. 4, a dashed arrow in the picture having the picture number 301 indicates the first motion vector (mvL0Col) used for inter prediction of Col_Blk.

Figure 5A:
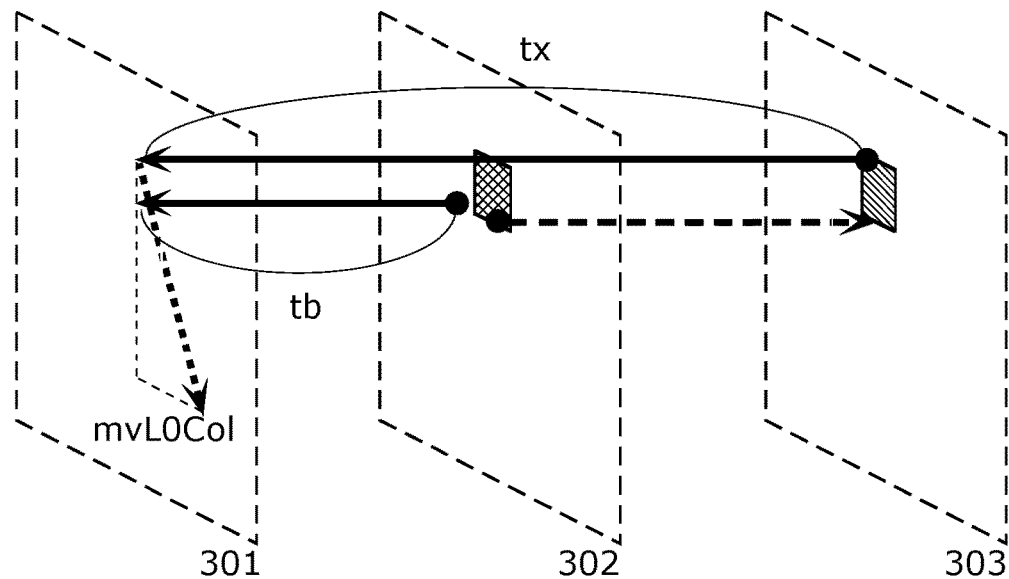
FIG. 5A is a diagram for illustrating scaling process in temporal direct mode in H.264.
Figure 5B:
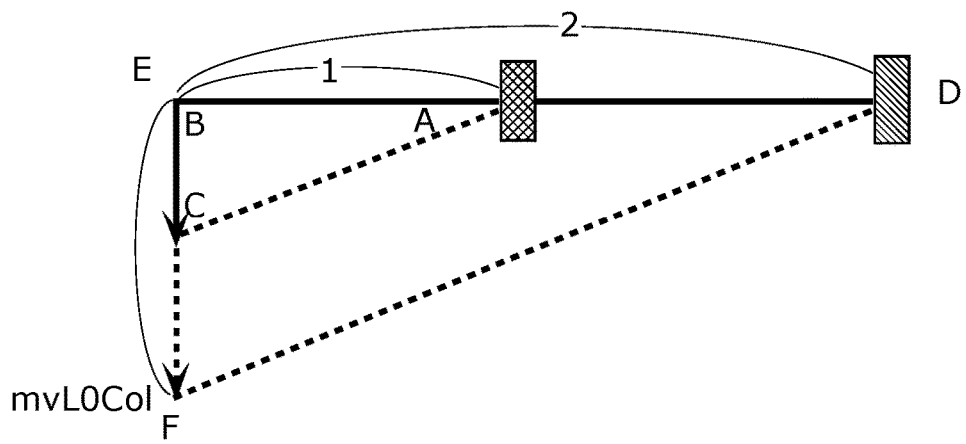
FIG. 5B is a diagram for illustrating scaling process in temporal direct mode in H.264.

Each of FIG. 5A and FIG. 5B is a diagram for illustrating a scaling process in the temporal direct mode. The scaling process is a process of deriving mvL0 and mvL1 of Curr_Blk by scaling a value of mvL0Col using a ratio between distances to a reference picture.

Specifically, FIG. 5A is a diagram for illustrating a reference structure for a current block to be decoded and a co-located block, and a motion vector of the co-located block in a simplified manner. Moreover, FIG. 5B is a diagram for illustrating the concept of the scaling process.

To put it simply, the scaling process can be understood as a similarity between triangles ABC and DEF shown in FIG. 5B.

The triangle DEF is a triangle for Col_Blk. Point D indicates a position of Col_Blk. Point E indicates a position corresponding to Col_Blk in a reference picture. In addition, the point E also indicates a position of a starting point of mvL0Col.

Point F indicates a position of an end point of mvL0Col.

The triangle ABC is a triangle for Curr_Blk. Point A indicates a position of Curr_Blk. Point B indicates a position corresponding to Curr_Blk in a reference picture. In addition, the point B indicates a position of a starting point of mvL0. Point C indicates a position of an end point of mvL0.

In the scaling process, first, a ratio of a relative distance (tx) from a picture including Col_Blk to a reference picture to a relative distance (tb) from a picture including Curr_Blk to the reference picture is derived as ScaleFactor in STEP 1. For instance, in FIG. 5B, a ratio (tb/tx=1/2=0.5) of tx (=303−301=2) to tb (=302−301=1) is derived as the ScaleFactor. This ScaleFactor corresponds to a similarity ratio (1/2) between the triangles ABC and DEF.

Next, mvL0 is derived by multiplying mvL0Col and the derived ScaleFactor together in STEP 2.

Lastly, mvL1 is derived by adding mvL0 derived in STEP 2 and a reverse vector of mvL0Col in STEP 3.

FIG. 6 is a diagram showing equations for scaling process described in NPL 1. The equations shown in FIG. 6 are described in the section 8.4.1.2.3 "Derivation process for temporal direct luma motion vector and reference index prediction mode" of NPL 1.

FIG. 7 is a diagram for illustrating the spatial direct mode.

In the spatial direct mode, the above-mentioned motion data (motion vectors and reference indexes) is obtained from blocks (adjacent blocks A to D) adjacent to a current block to be decoded (Curr_Blk)

Among the obtained motion data, motion data (refIdxL0 and refIdxL1 and corresponding mvL0 and mvL1) of a block having a natural number (minPositive value) including "0" that is smallest as a value of a reference index (refIdx-LXN) is directly used (Equations (8-186) and (8-187) of NPL 1). Specifically, refIdxL0 and refIdxL1 are derived by the following equations, respectively.

$$\text{refIdx}L0=\text{MinPositive}(\text{refIdx}L0A,\text{MinPositive}(\text{refIdx}L0B,\text{refIdx}L0C)) \quad (8\text{-}186)$$

$$\text{refIdx}L1=\text{MinPositive}(\text{refIdx}L1A,\text{MinPositive}(\text{refIdx}L1B,\text{refIdx}L1C)) \quad (8\text{-}186)$$

In the spatial direct mode, the motion vector mvL0 or mvL1 is directly used. In other words, the current block and the adjacent blocks are included in the same picture, and thus the scaling process for the motion vectors is unnecessary.

[(2) Mode Through H.264 Motion Vector Predictor Derivation]

Figure 8:
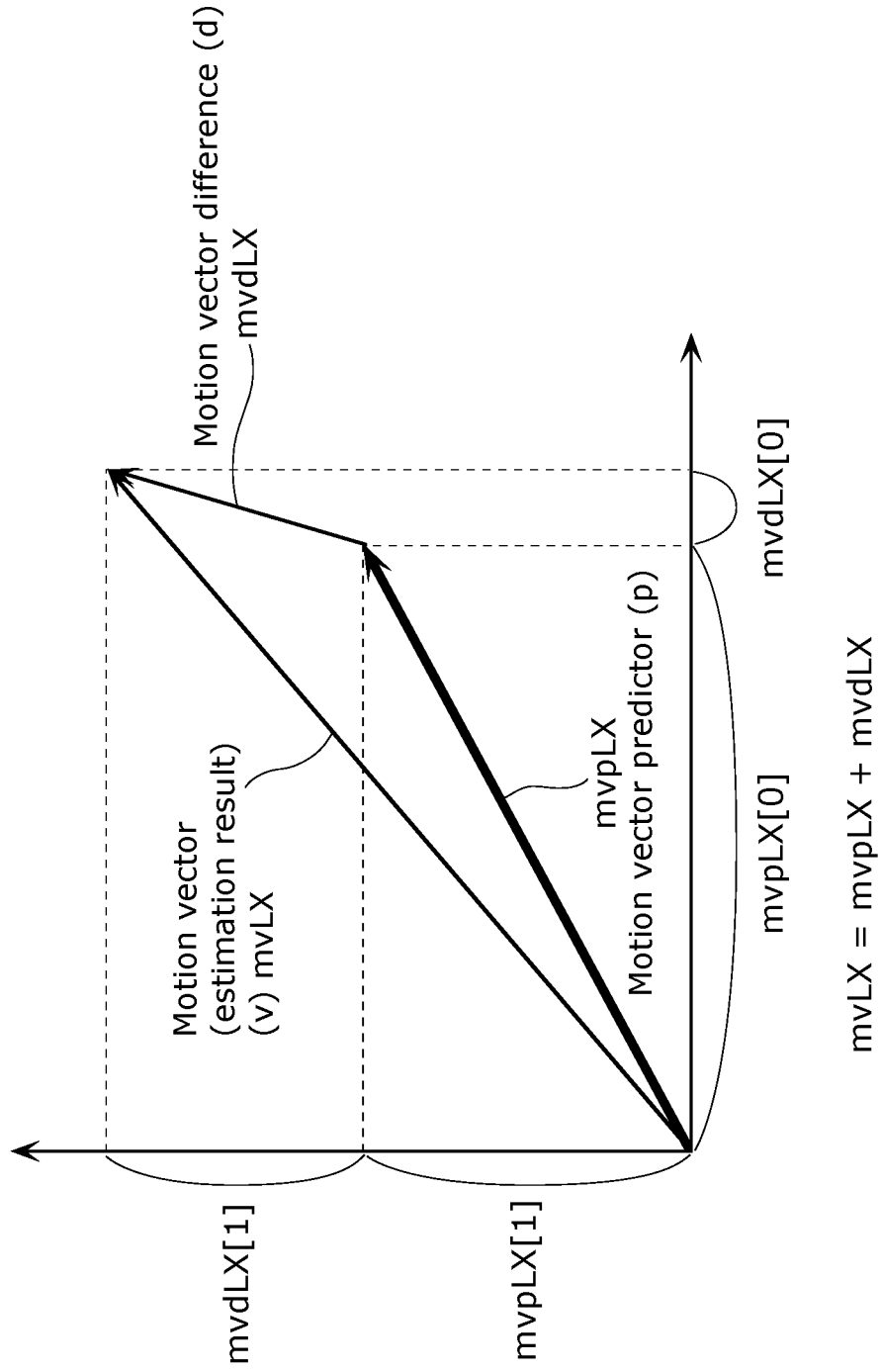
FIG. 8 is a diagram for illustrating a relationship between a motion vector (estimation result), a motion vector predictor, and a motion vector difference.

FIG. 8 is a diagram for illustrating a relationship between a motion vector (estimation result) (mvLX), a motion vector predictor (mvpLX), and a motion vector difference (mvdLX).

In FIG. 8, mvLX represents a motion vector (estimation result) (v) used for inter prediction. Moreover, mvpLX represents a motion vector predictor (p) used for decoding of a motion vector. Furthermore, mvdLX represents a motion vector difference that is a vector difference between the motion vector (v) and the motion vector predictor (p). At the time of decoding, mvLX is derived for each of a horizontal component and a vertical component, using mvpLX and mvdLX.

$$\text{Horizontal component:}mvLX[0]=mvpLX[0]+mvdLX[0]$$

$$\text{Vertical component:}mvLX[1]=mvpLX[1]+mvdLX[1]$$

In contrast, at the time of coding, optimal mvLX (mvLX[0], mvLX[1]) is searched for from a standpoint of coding efficiency, and each of the horizontal component [0] and the vertical component [1] of mvdLX is coded according to the search result.

$$\text{Horizontal component:}mvdLX[0]=mvLX[0]-mvpLX[0]$$

$$\text{Vertical component:}mvdLX[1]=mvLX[1]-mvpLX[0]$$

NPL 2 discloses a method for coding a motion vector using, as a motion vector predictor, a motion vector derived from a co-located block.

When the motion vector thus derived from the co-located block is used for coding a moving picture, there is a case where the coding efficiency decreases when the co-located block is not set properly.

In view of this, a moving picture coding method according to an aspect of the present invention is a moving picture coding method for coding a moving picture using a list having at least one entry including a motion vector, the method including: determining whether or not (a) a picture including a co-located block and (b) a current picture to be coded are included in a same view, the co-located block being a block that is included in a picture different from the current picture and is at a position corresponding to a position of a current block to be coded included in the current picture; adjusting the position of the co-located block when the picture including the co-located block and the current picture are included in different views; and adding to the list an entry including a motion vector derived from the co-located block, wherein the adjusting includes: obtaining a disparity vector between the view including the picture including the co-located block and the view including the current picture; and adjusting the position of the co-located block by the obtained disparity vector.

With this, when the view including the picture including the co-located block is different from the view including the current picture, it is possible to adjust the position of the co-located block using the disparity vector between the two views. In addition, it is possible to add to the list the entry including the motion vector of the co-located block having the adjusted position. Thus, it is possible to use a block at a more appropriate position as the co-located block when the current block is decoded, which is expected to increase coding efficiency.

For example, in the adjusting, when the picture including the co-located block and the current picture are included in the different views, and the picture including the co-located block is identified by a first entry of a reference picture list, the position of the co-located block may be adjusted.

With this, it is possible to adjust the position of the co-located block when the picture including the co-located block is identified by the first entry of the reference picture list.

For example, the moving picture coding method may further include coding a motion vector of the current block using, as a motion vector predictor, a motion vector included in one of the at least one entry of the list.

With this, it is possible to code the motion vector of the current block using, as the motion vector predictor, the motion vector included in one of the at least one entry of the list. As a result, it is possible to increase the coding efficiency of the motion vector.

For example, the moving picture coding method may further include generating a prediction image of the current block using a motion vector included in one of the at least one entry of the list.

With this, it is possible to generate the prediction image of the current block using the motion vector included in one of the at least one entry of the list. Thus, it is possible to increase accuracy of predicting a prediction image, and the coding efficiency.

For example, the moving picture coding method may further include: switching a coding process to either a first coding process compliant with a first standard or a second coding process compliant with a second standard; and attaching to a bitstream identification information indicating the first standard or the second standard with which the coding process switched to is compliant, wherein when the coding process is switched to the first coding process, the determining, the adjusting, and the adding are performed as the first coding process.

With this, it is possible to switch between the first coding process compliant with the first standard and the second coding process compliant with the second standard.

Moreover, a moving picture decoding method according to another aspect of the present invention is a moving picture decoding method for decoding a coded moving picture using a list having at least one entry including a motion vector, the method including: determining whether or not (a) a picture including a co-located block and (b) a current picture to be decoded are included in a same view, the co-located block being a block that is included in a picture different from the current picture and is at a position corresponding to a position of a current block to be decoded included in the current picture; adjusting the position of the co-located block when the picture including the co-located block and the current picture are included in different views; and adding to the list an entry including a motion vector derived from the co-located block, wherein the adjusting includes: obtaining a disparity vector between the view including the picture including the co-located block and the view including the current picture; and adjusting the position of the co-located block by the obtained disparity vector.

With this, when the view including the picture including the co-located block is different from the view including the current picture, it is possible to adjust the position of the co-located block using the disparity vector between the two views. In addition, it is possible to add to the list the entry including the motion vector of the co-located block having the adjusted position. Thus, it is possible to use a block at a more appropriate position as the co-located block when the current block is decoded, which is expected to increase the coding efficiency.

For example, in the adjusting, when the picture including the co-located block and the current picture are included in the different views, and the picture including the co-located block is identified by a first entry of a reference picture list, the position of the co-located block may be adjusted.

With this, it is possible to adjust the position of the co-located block when the picture including the co-located block is identified by the first entry of the reference picture list.

For example, the moving picture decoding method may further include reconstructing a motion vector of the current block using, as a motion vector predictor, a motion vector included in one of the at least one entry of the list.

With this, it is possible to reconstruct the motion vector of the current block using, as the motion vector predictor, the motion vector included in one of the at least one entry of the list. As a result, it is possible to increase the coding efficiency of the motion vector.

For example, the moving picture coding method may further include generating a prediction image of the current block using a motion vector included in one of the at least one entry of the list.

With this, it is possible to generate the prediction image of the current block using the motion vector included in one of the at least one entry of the list. Thus, it is possible to increase accuracy of predicting a prediction image, and the coding efficiency.

For example, the moving picture decoding method may further include switching a decoding process to one of a first decoding process compliant with a first standard and a second decoding process compliant with a second standard, according to identification information attached to a bitstream and indicating the one of the first standard and the second standard, wherein when the decoding process is switched to the first decoding process, the determining, the adjusting, and the adding may be performed as the first decoding process.

With this, it is possible to switch between the first decoding process compliant with the first standard and the second decoding process compliant with the second standard.

These general and specific aspects may be implemented using a system, a device, an integrated circuit, a computer program, or a computer-readable recording medium such as a CD-ROM, or any combination of systems, devices, integrated circuits, computer programs, or computer-readable recording media.

The following specifically describes embodiments with reference to the drawings.

The embodiments described hereinafter indicate specific or generic examples of the present invention. The values, shapes, materials, constituent elements, positions and connections of the constituent elements, steps, and orders of the steps indicated in the embodiments are examples, and do not limit the claims. Furthermore, the constituent elements in the embodiments that are not described in independent claims that describe the most generic concept of the present invention are described as arbitrary constituent elements.

Embodiment 1

Figure 9A:
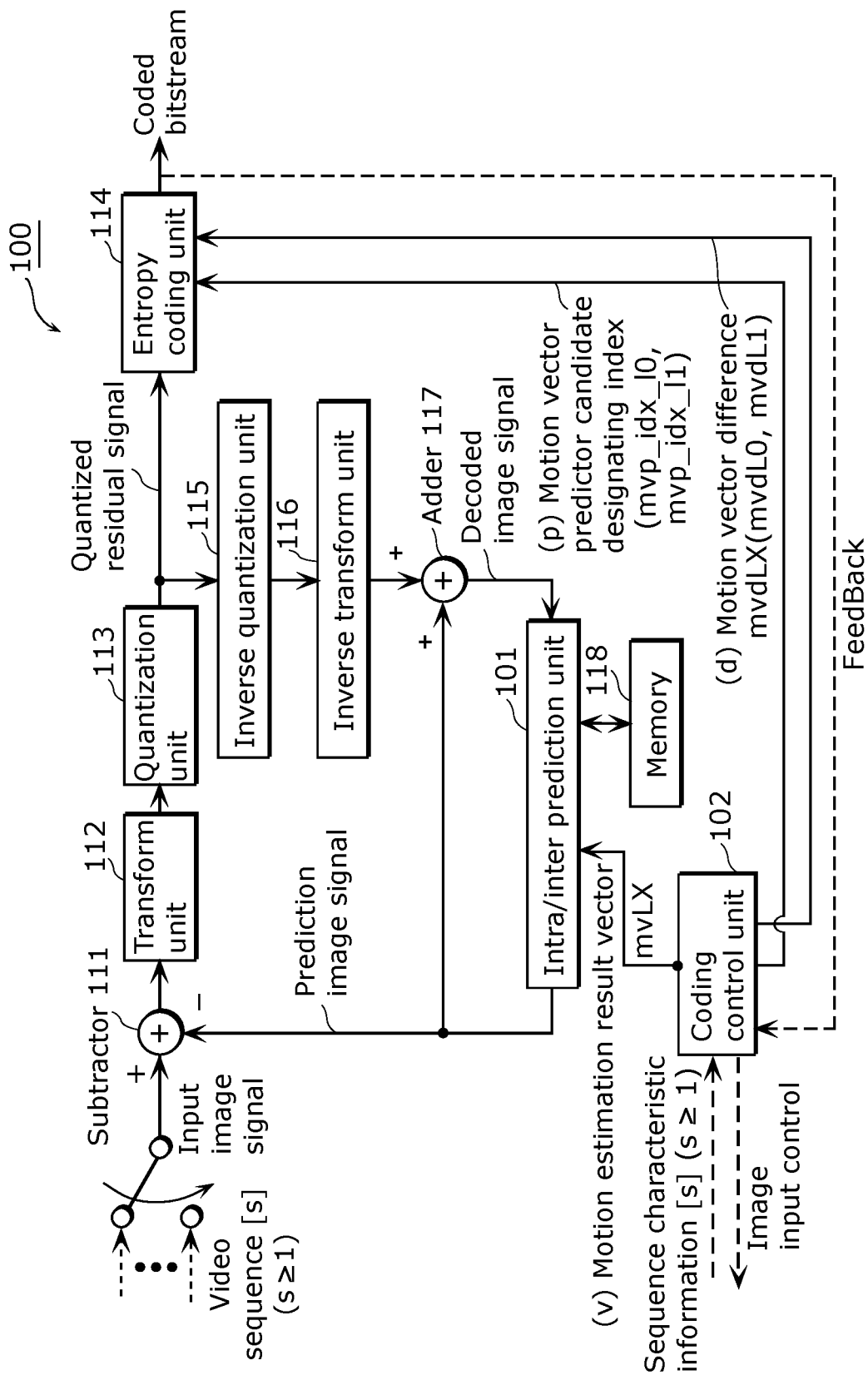
FIG. 9A is a block diagram showing a configuration of a moving picture coding apparatus according to Embodiment 1.

FIG. 9A is a block diagram showing a configuration of a moving picture coding apparatus 100 according to Embodiment 1. Here, the moving picture coding apparatus 100 codes a multi-view moving picture using a motion vector predictor candidate list having at least one entry including a motion vector.

As shown in FIG. 9A, the moving picture coding apparatus 100 mainly includes a subtractor 111, a transform unit 112, a quantization unit 113, an entropy coding unit 114, an inverse quantization unit 115, an inverse transform unit 116, an adder 117, a memory 118, and an intra/inter prediction unit 101. In addition, the moving picture coding apparatus 100 includes a coding control unit 102 which controls these elements.

The moving picture coding apparatus 100 receives moving pictures of at least one video sequence in sequence or in parallel, and outputs the at least one video sequence as one coded bitstream.

The subtractor 111 outputs a residual signal that is a difference between an input image signal (a partial image signal) and a prediction image signal (a derived partial prediction image signal) of a video sequence [s] at a time.

The transform unit 112 and the quantization unit 113 process (perform frequency transform and quantization on) the residual signal and output the quantized residual signal.

The entropy coding unit 114 performs entropy coding on the quantized residual signal and a decoding control signal, and outputs a coded bitstream.

The inverse quantization unit 115 and the inverse transform unit 116 process (perform inverse quantization and inverse frequency transform on) the quantized residual signal, and output a reconstructed residual signal.

The adder 117 adds the reconstructed residual signal and a prediction image signal, and outputs a decoded image signal.

The intra/inter prediction unit 101 accumulates the decoded image signal on a predetermined unit basis (e.g., a frame or block) in the memory 118. In addition, according to an instruction from the coding control unit 102, the intra/inter prediction unit 101 generates a prediction image signal (e.g., a pixel value derived based on a decoded image signal and a motion vector), and outputs the generated prediction image signal to the subtractor 111 and the adder 117.

The coding control unit 102 performs a trial to determine with which control parameter (this parameter corresponding to a decoding control signal) a picture is coded, and determines a control parameter according to the trial result. Then, the coding control unit 102 provides the determined control parameter to each processing unit (especially the intra/inter prediction unit 101) shown in FIG. 9A. The trial for determining a control parameter is performed using, for instance, Cost function aiming at reducing a bit length of the coded bitstream (FeedBack) indicated by a dashed line in FIG. 9A. For example, the coding control unit 102 determines a control parameter (e.g., distinction between inter prediction and intra prediction) for coding image data, extracts information (a decoding control signal) necessary for decoding, and outputs the information to the entropy coding unit 114. The decoding control signal includes, for each slice, a prediction type (pred_type), a motion vector predictor candidate designating index (mvp_idx_lX), and a motion vector difference (mvdLX), for instance.

In this embodiment, the coding control unit 102 receives sequence characteristic information corresponding to characteristics of a received video signal sequence [s] (where s is greater than or equal to 1).

Figure 9B:
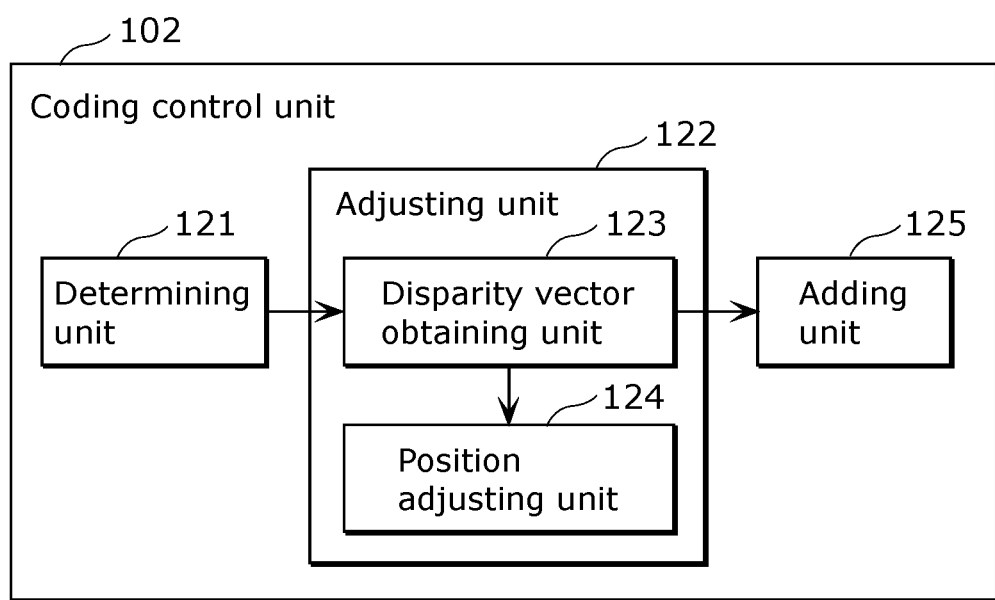
FIG. 9B is a block diagram showing a configuration of a coding control unit according to Embodiment 1.

FIG. 9B is a block diagram showing a configuration of the coding control unit 102 according to Embodiment 1. As shown in FIG. 9B, the coding control unit 102 includes a determining unit 121, an adjusting unit 122, and an adding unit 125.

The determining unit 121 determines whether or not a picture including a co-located block and a current picture to be coded are included in the same view. The co-located block is a block included in a picture different from the current picture and located at a position corresponding to that of a current block to be coded. It is to be noted that the position corresponding to the position of the current block includes not only the same position as the position of the current block but also a position near the position of the current block in the picture different from the current picture.

When the picture including the co-located block and the current picture are included in different views, the adjusting unit 122 adjusts a position of the co-located block. To put it another way, the adjusting unit 122 adjusts the intra-picture position of the co-located block. As shown in FIG. 9B, the adjusting unit 122 includes a disparity vector obtaining unit 123 and a position adjusting unit 124.

The disparity vector obtaining unit 123 obtains a disparity vector between the view including the picture including the co-located block and the view including the current picture.

The position adjusting unit 124 adjusts the position of the co-located block by the obtained disparity vector. Stated differently, the position adjusting unit 124 adjusts an original position of the co-located block by shifting the original position of the co-located block toward a direction indicated by the disparity vector by a distance indicated the disparity vector.

The adding unit 125 adds to a list an entry including a motion vector derived from the co-located block. In this embodiment, the adding unit 125 adds, to a motion vector predictor candidate list, the entry including the motion vector derived from the co-located block as a motion vector predictor candidate.

It is to be noted that the adding unit 125 may add, to a merge candidate list, an entry including a motion vector derived from a co-located block and a reference picture index as a merge candidate. Here, the merge candidate is a candidate of a set of a motion vector to be used for coding a current block to be coded and a reference picture index.

Figure 10:
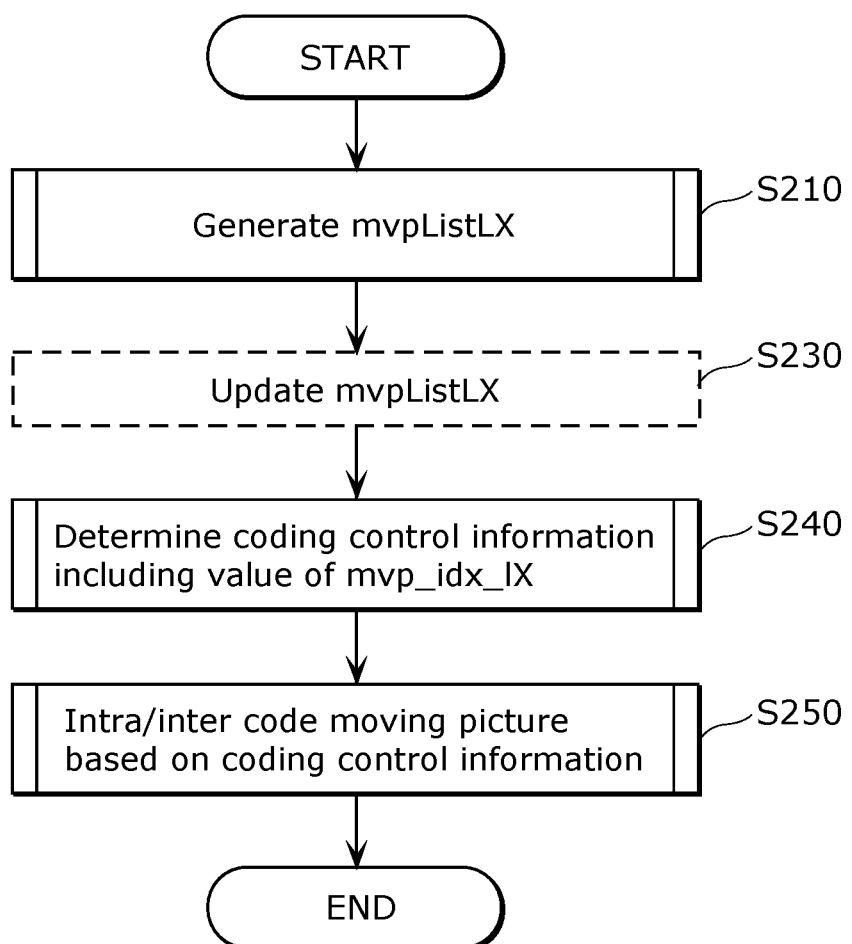
FIG. 10 is a flow chart showing a moving picture coding method according to Embodiment 1.

FIG. 10 is a flow chart showing a moving picture coding method according to Embodiment 1.

In step S210, the coding control unit 102 generates (derives) and outputs a motion vector predictor candidate list (mvpListLX) per unit of a prediction block (PU) including a current block to be coded (Curr_Blk) (mvpListLX generation step).

In step S230, the coding control unit 102 performs an update process of mvpListLX and outputs mvpListLX (update step). The update process is a process of receiving mvpListLX, updating mvpListLX, and outputting updated mvpListLX. The update process is a process such as adding an entry, copying an entry from another list, and deleting an entry. The update process complies with a rule implicitly shared with a decoding side. It is to be noted that the update process may not need to be performed.

In step S240, the coding control unit 102 determines coding control information including a value of mvp_idx_lX for each PU (determination step). In addition, the coding control unit 102 selects an entry from a list.

In step S250, the intra/inter prediction unit 101 generates a prediction image of the current block based on the coding control information. In this embodiment, the entropy coding unit 114 further codes a motion vector of the current block using a motion vector (motion vector predictor) included in the entry selected from the list. Stated differently, the entropy coding unit 114 codes a difference between the motion vector predictor and the motion vector of the current block.

Figure 11:
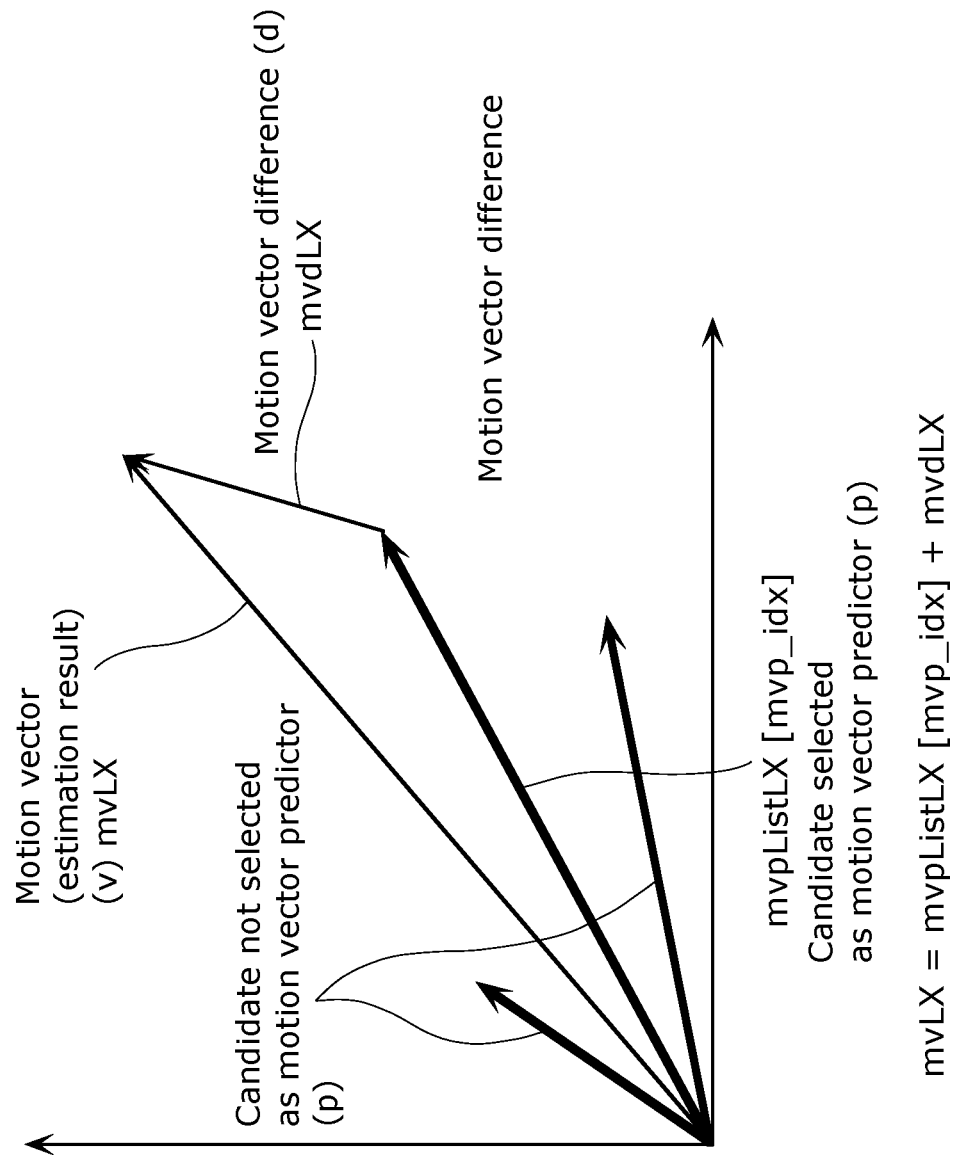
FIG. 11 is a diagram for illustrating a concept of a motion vector predictor candidate list according to Embodiment 1.

FIG. 11 is a diagram for illustrating a concept of a motion vector predictor candidate list. Specifically, FIG. 11 shows a relationship between motion vector predictor candidates included in a motion vector predictor candidate list and a motion vector predictor selected from the motion vector predictor candidate list. This embodiment differs from the case of the motion vector predictor in H.264 (FIG. 8) in that there is at least one motion vector predictor. Among the candidates, a vector (candidate) determined based on an index value of mvp_idx_lX is used as a motion vector predictor for coding a motion vector (estimation result).

Each of FIG. 12A and FIG. 12B is a table showing an exemplary motion vector predictor candidate list according to Embodiment 1.

Figure 13:
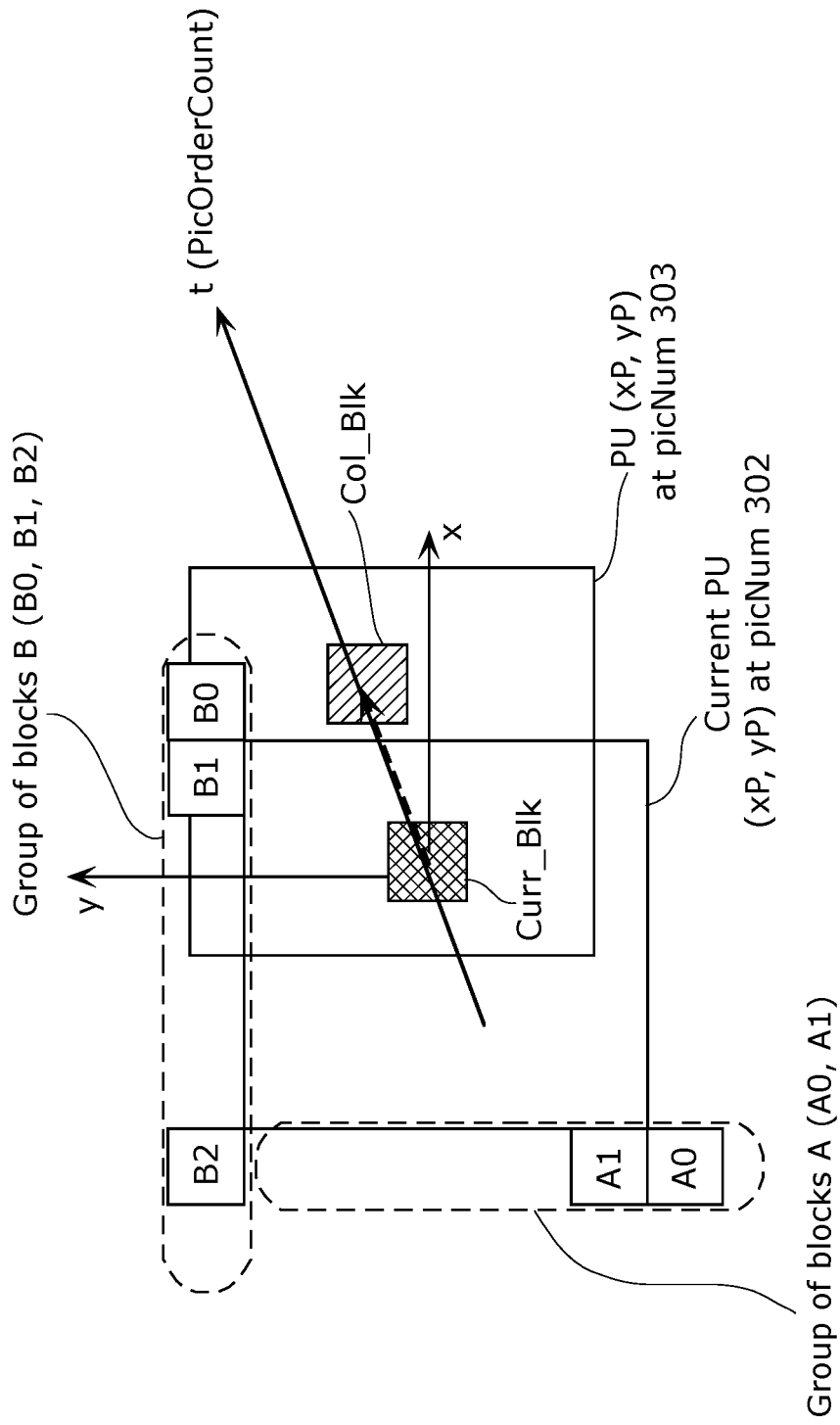
FIG. 13 is a diagram showing positions of adjacent blocks and a position of a co-located block.

FIG. 12A shows exemplary motion vector predictor candidates added (appended) in sequence to the list for prediction direction 0 output in step S210 (when a special case for video sequences to be described later is excluded). An entry of a block A[i] among adjacent blocks A[0 . . . k] in a group of blocks N=A shown in FIG. 13 is added as a candidate [0] to the list. Moreover, an entry of a block B[i] among adjacent blocks B[0 . . . k] included in a group of blocks N=B shown in FIG. 13 is added as a candidate [1] to the list. Furthermore, an entry of a co-located block (Col_Blk) shown in FIG. 13 is added as a candidate [2] to the list. Each of the entries includes the above-mentioned motion data (a set of a motion vector of a block and a reference picture index). It is to be noted that hereinafter, the group of blocks N=A adjacent to the left side of Curr_Blk is referred to as a group of blocks A, and the group of blocks N=B adjacent to the upper side of Curr_Blk is referred to as a group of block B.

FIG. 12B shows exemplary motion vector predictor candidates added in sequence to a list for prediction direction 1. Here, a case is described where the group of blocks N=B is unavailable, for instance.

It is to be noted that although the motion vector predictor candidate lists are separated for each prediction direction in FIG. 12A and FIG. 12B, both motion data for prediction direction 0 and motion data for prediction direction 1 may be merged in one list (in the case of a merge mode).

FIG. 13 is a diagram showing positions of adjacent blocks and a position of a co-located block. The group of blocks A (A0, A1) and the group of blocks B (B0, B1, B2) are shown. In FIG. 13, Current PU indicates a prediction unit block (PU) including a current block to be coded.

Figure 14:
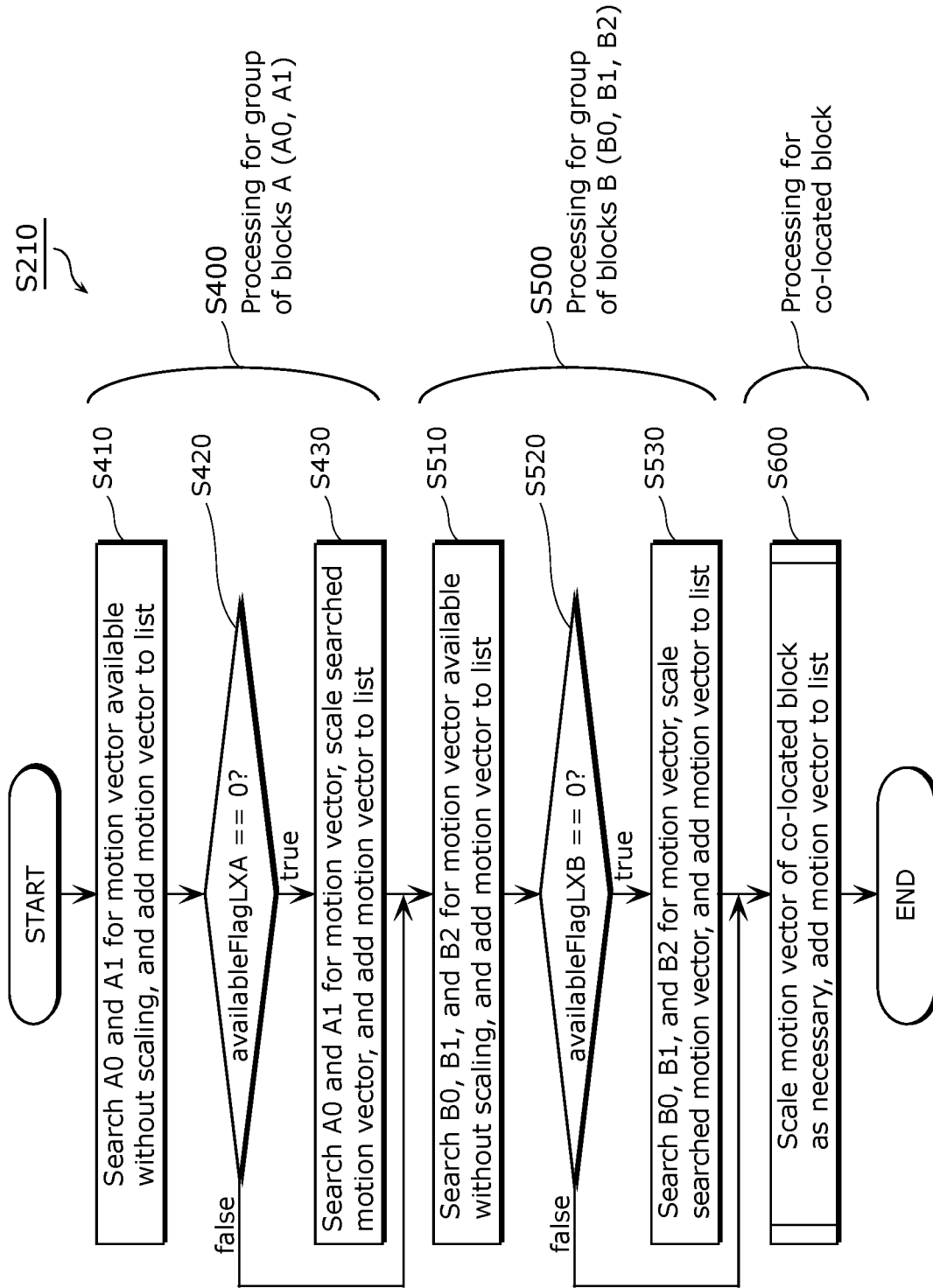
FIG. 14 is a flow chart for processing of generating a motion vector predictor candidate list according to Embodiment 1.

FIG. 14 is a flow chart for processing of generating a motion vector predictor candidate list. Specifically, FIG. 14 is a flow chart showing details of the process in step S210 shown in FIG. 10. Prior to the following processes, the coding control unit 102 initializes a value of each of flags (availableFlagLXA, availableFlagLXB, and so on) to 0. The coding control unit 102 first generates the first candidate (entry) for mvpListLX (S400). In step S400, the coding control unit 102 performs a process for deriving a candidate from the blocks A0 and A1 included in the group of blocks A. It is to be noted that when intra prediction are used for both the blocks A0 and A1, there may be a case where the candidate cannot be derived from the group of blocks A.

In more detail, in step S410, the coding control unit 102 searches the group of blocks A for a block having a motion vector available without a scaling process (scaling). The search is performed in order of A0 and A1. When succeeding in the search, the coding control unit 102 sets "1" to availableFlagLXA. In addition, the coding control unit 102 adds the motion vector of the searched block to mvpListLX.

In step S420, the coding control unit 102 determines whether or not availableFlagLXA is "0" (whether or not the search in step S410 is failed).

When availableFlagLXA is "0" (true in S420), the coding control unit 102 searches the group of blocks A (A0, A1) for a block having an available motion vector in step S430. The search is performed in order of A0 and A1. When succeeding in the search, the coding control unit 102 performs the scaling process on the motion vector of the searched block, and adds the scaled motion vector to mvpListLX. The scaling process is a process of scaling up or down a motion vector. It is to be noted that the equations (8-130) to (8-134) or the like of NPL 2 can be used for the scaling process.

Next, the coding control unit 102 generates the second candidate for mvpListLX (S500). In step S500, the coding control unit 102 performs a process for deriving a candidate from the group of blocks B (B0, B1, B2). It is to be noted that when intra prediction is used for all the blocks B0, B1, and B2, there may be a case where the candidate cannot be derived from the group of blocks B.

In more detail, in step S510, the coding control unit 102 searches the group of blocks B for a block having a motion vector available without the scaling process. The search is performed in order of B0, B1, and B2. When succeeding in the search, the coding control unit 102 sets "1" to availableFlagLXB. In addition, the coding control unit 102 adds the motion vector of the searched block to mvpListLX.

In step S520, the coding control unit 102 determines whether or not availableFlagLXB is "0."

When availableFlagLXB is "0" (true in S520), the coding control unit 102 searches the group of blocks B (B0, B1, B2) for a block having an available motion vector in step S530. The search is performed in order of B0, B1, and B2. When succeeding in the search, the coding control unit 102 performs the scaling process on the motion vector of the searched block, and adds the scaled motion vector to mvpListLX.

Finally, the coding control unit 102 performs a process on a co-located block. In more detail, in step S600, the coding control unit 102 adds to mvpListLX a motion vector of the co-located block on which the scaling process is performed as necessary.

Figure 15:
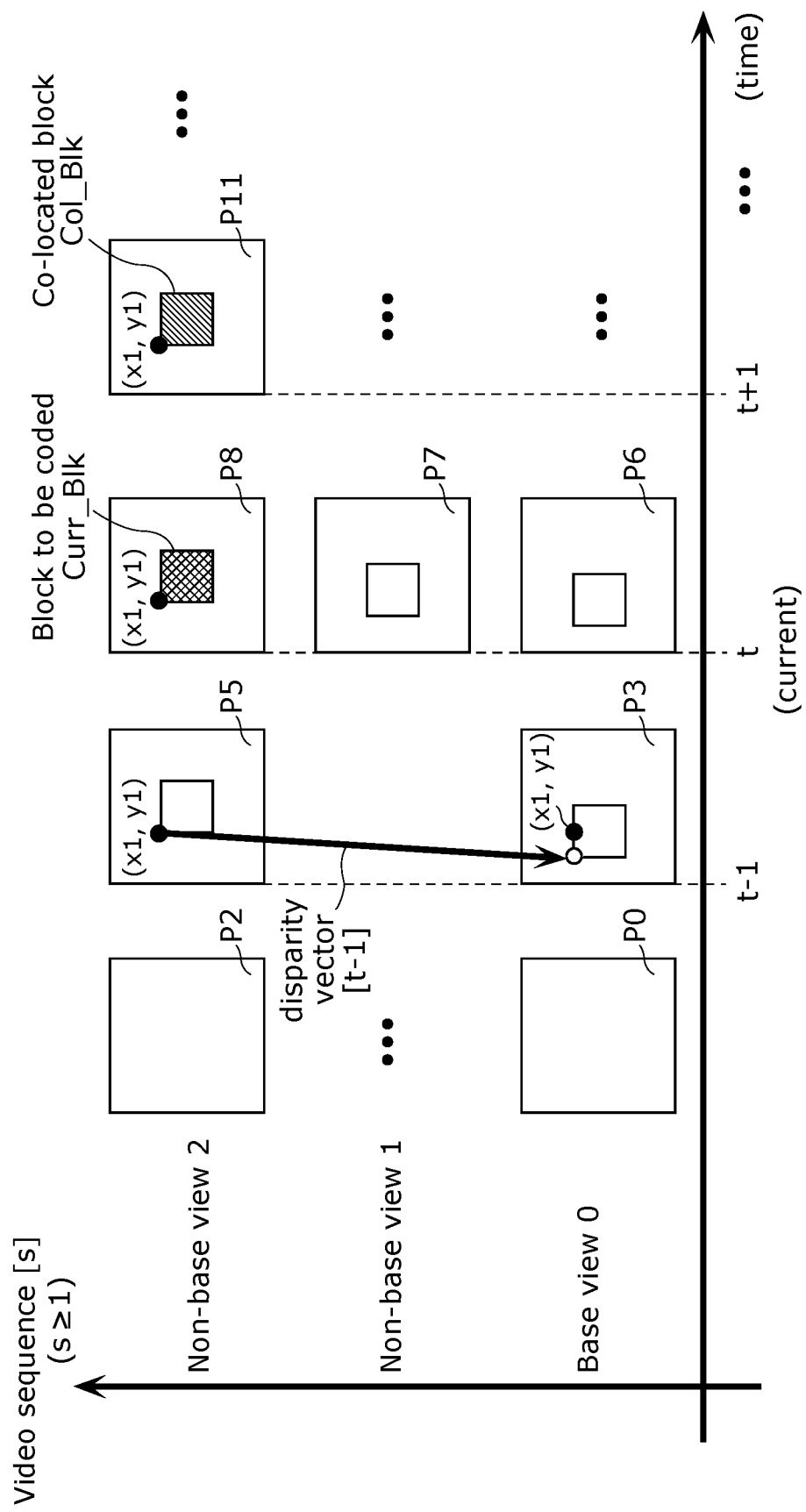
FIG. 15 is a diagram for illustrating a co-located block in video sequences [s].

FIG. 15 is a diagram for illustrating a co-located block in video sequences [s].

In FIG. 15, the horizontal axis indicates image display timing (time), and the vertical axis indicates a number of a video sequence. Three moving pictures having different views are shown as exemplary video sequences. The video sequences [s] shown in FIG. 9A correspond to a base view 0, a non-base view 1, and a non-base view 2, respectively. As shown by the example in FIG. 15, each of the views includes pictures (image signals) P0 . . . P11.

A current block to be coded (Curr_Blk) is a block included in P8 at time t. The image signal P8 is included in the non-base view 2.

It is to be noted that black circles (x1, y1) shown in the pictures P5, P3, P8, and P11 in FIG. 15 indicate coordinates where relative coordinate positions in the pictures are identical with each other. When the pictures P5, P3, P8, and P11 have the same size, the coordinates of the black circles have the same values.

A disparity vector (disparity vector [t−1]) indicated by an arrow from the black circle (x1, y1) of the picture P5 at time t−1 to a white circle of the picture P3 is a coordinate transformation vector that is most recent at the time of coding the current block. This coordinate transformation vector is a vector that the coding apparatus obtains to match coordinates where reference objects are located between the non-base view 2 and the base view 0. In this example, coordinates where a corresponding one of the reference objects is located are displaced by a difference between the black circle and the white circle shown in the picture P3, between the non-base view 2 and the base view 0.

On condition that the disparity vector can be extracted or derived in the same manner on the decoding side, the disparity vector may be a motion vector obtained as a result of motion vector search up until the point when a current block to be coded is coded or may be previously given as inter-sequence information. In addition, a disparity vector corresponding to a picture including a co-located block (Col_Blk) may be added to a sequence parameter set (SPS), a picture parameter set (PPS), a slice header, or the like, and may be explicitly suggested to a decoding apparatus.

As described with reference to FIG. 2A and FIG. 2B, the conventional concept of co-located block is a block which is substantially co-located with a current block (but is included in a picture that is different in a temporal direction). For instance, the co-located block of the current block is a block (Col_Blk) hatched in the picture P11.

Figure 16:
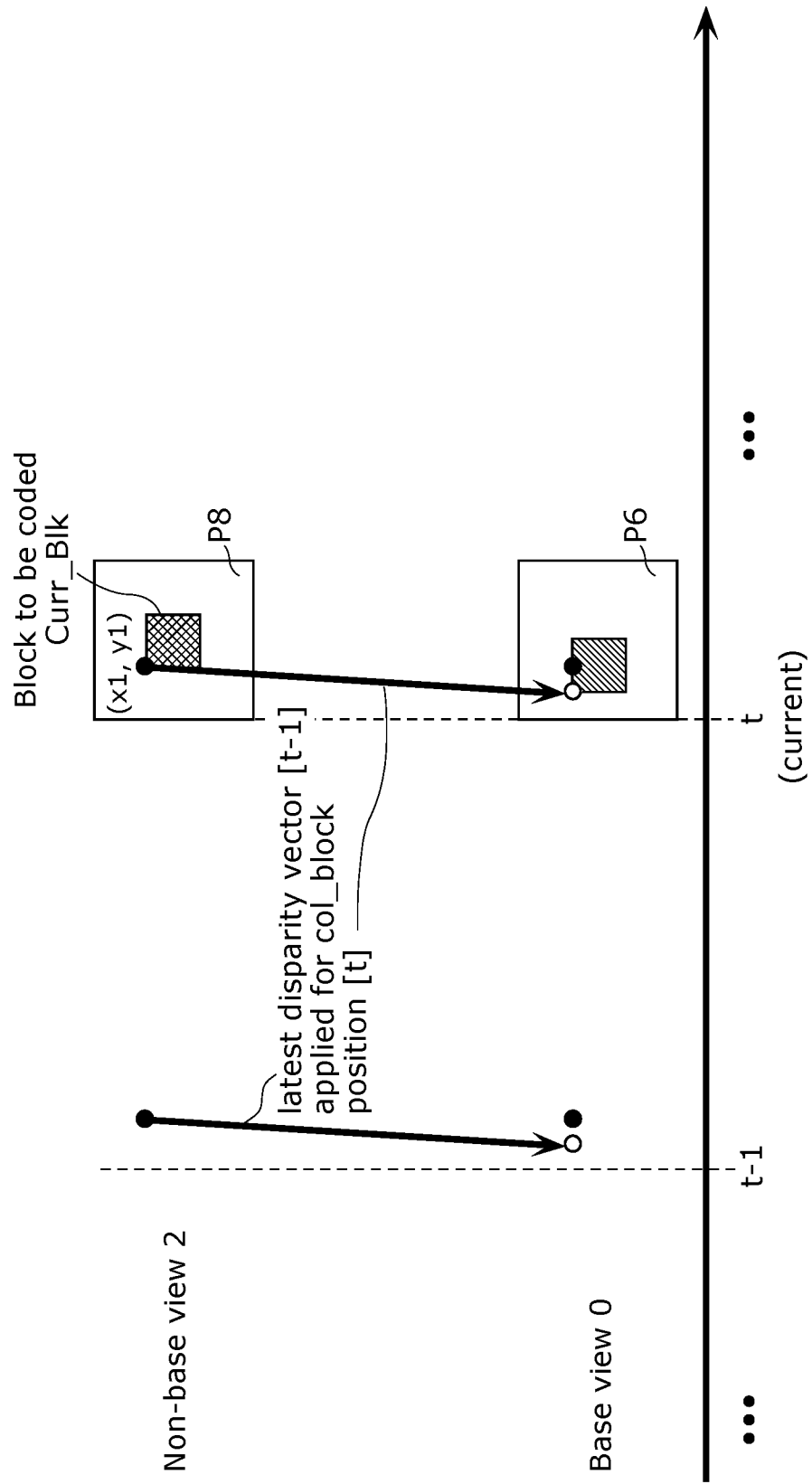
FIG. 16 is a diagram for illustrating adjustment of a position of a co-located block designated when an entry for co-located block is added to a motion vector predictor candidate list according to Embodiment 1.

FIG. 16 is a diagram for illustrating adjustment of a position of a co-located block designated when an entry for co-located block is added to a motion vector predictor candidate list according to Embodiment 1.

This adjustment is applied when a picture of the initial (first) entry in a reference picture list (RefPicListLX) of a side that designates a picture including a co-located block is defined as a picture in a view different from a view including a current block to be coded. In this case, the position of the co-located block is adjusted using the disparity vector (disparity vector [t−1]) that is already obtained at the time of coding (already obtained at the time of decoding) the current block and updated. Then, motion data of the block having the adjusted position is added as motion data of the co-located block to the list. Here, the first entry is an entry having the smallest index value among entries held by the list. In the picture P6, a block (a hatched region in the figure) having a position offset from a point of (x1, y1) by an immediately previous disparity vector is used as the co-located block.

Figure 17:
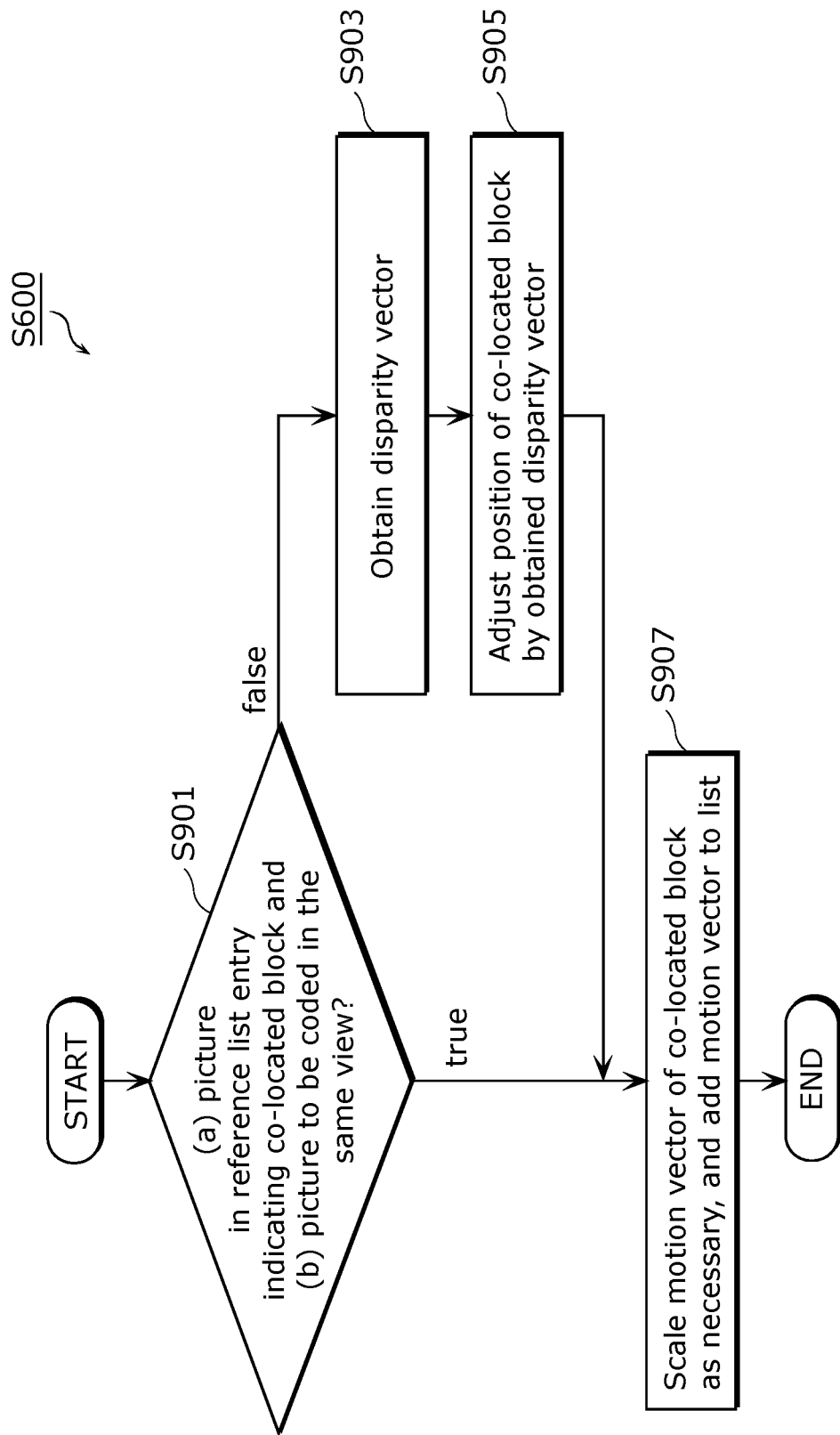
FIG. 17 is a flow chart for processing of adding motion data of a co-located block to a motion vector predictor candidate list according to Embodiment 1.

FIG. 17 is a flow chart for processing of adding motion data of a co-located block to a motion vector predictor candidate list according to Embodiment 1. Specifically, FIG. 17 is a flow chart showing details of the process in step S600 shown in FIG. 14.

In step S901, the determining unit 121 determines whether or not (a) a picture that is identified by an entry in a reference picture list and includes a co-located block and (b) a current picture to be coded are included in the same view.

Here, the picture described in (a) is a picture RefPicListL [1-collocated_direction flag][0]. When the reference picture list L1 is used as in H.264, the picture is a picture RefPicListL1[0] (the first entry). It is to be noted that although the picture including the co-located block is the picture RefPicListL[1-collocated_direction flag][0] in this embodiment, the present invention is not always limited to this. For example, the picture including the co-located block may be RefPicListL[1-collocated_direction flag][colPic_idx]. In this case, the parameter (colPic_idx) makes it possible to specify which picture is to be used as the picture including the co-located block. Moreover, colPic_idx may be added to a bitstream as header information such as an SPS, a PPS, and a slice header, and the picture including the co-located block may be explicitly suggested to the decoding apparatus.

When the determination result in step S901 is true, a position of the co-located block is not adjusted as in the conventional manner.

When the determination result in step S901 is false, the disparity vector obtaining unit 123 obtains a disparity vector between a view including the picture including the co-located block and a view including the current picture (S903). Then, the position adjusting unit 124 adjusts the position (co_located_block_position(x, y)) of the co-located block by the obtained disparity vector (S905).

Finally, the adding unit 125 adds to the motion vector predictor candidate list motion data of the co-located block having the adjusted position or the original position (S907).

Each of FIG. 18A and FIG. 18B is a table showing an exemplary motion vector predictor candidate list when a position of a co-located block is adjusted according to Embodiment 1. In other words, each of FIG. 18A and FIG. 18B shows a motion vector predictor candidate list generated through the processing shown in FIG. 17. In comparison to the motion vector predictor candidate lists shown in FIG. 12A and FIG. 12B, a position of a block added when N=Col is obtained by adapting a disparity vector between views.

Figure 19:
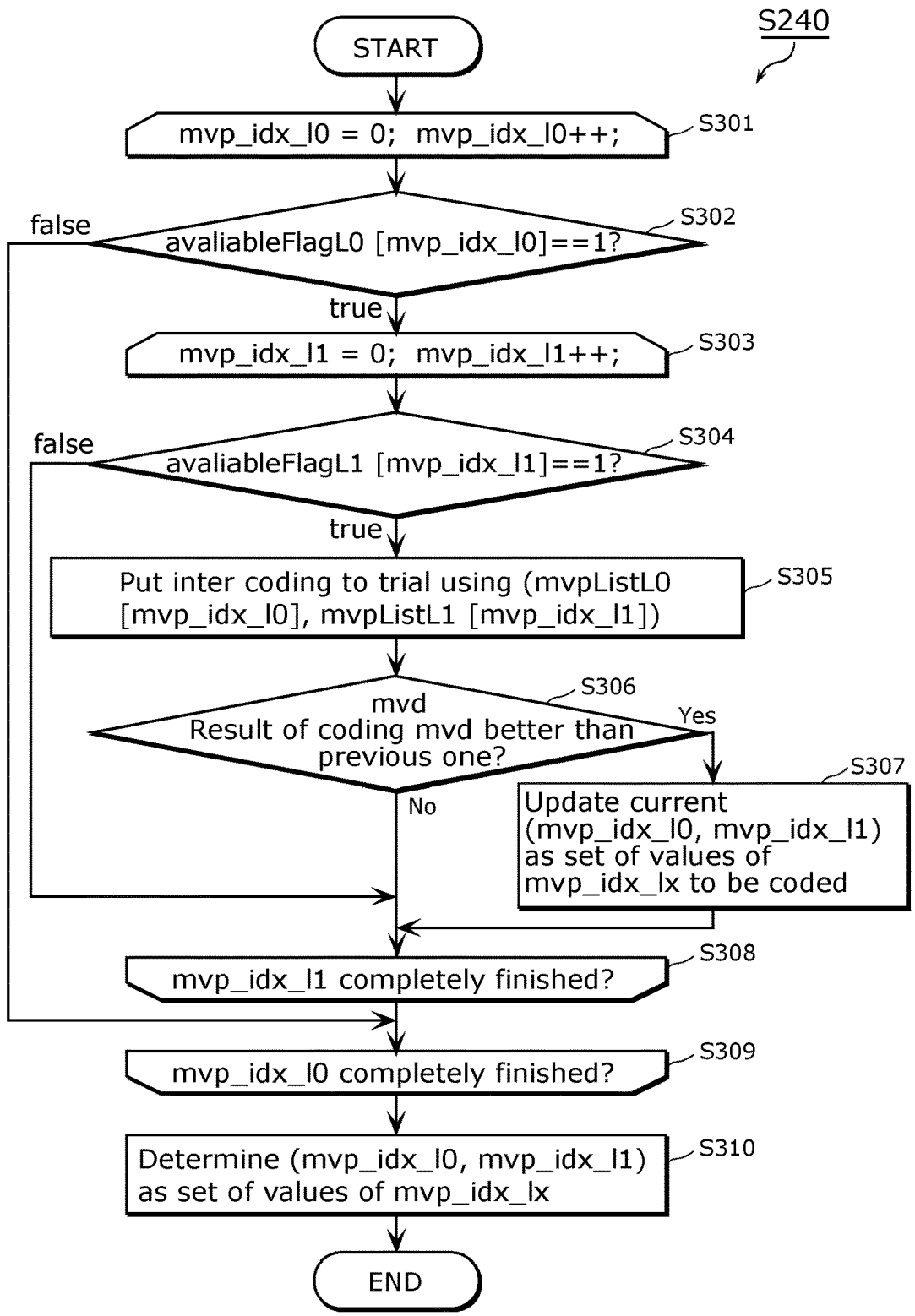
FIG. 19 is a flow chart for processing of determining a motion vector predictor according to Embodiment 1.

FIG. 19 is a flow chart for processing of determining a motion vector predictor according to Embodiment 1. To put it another way, FIG. 19 is a flow chart for processing of determining a set of a value of mvp_idx_l0 and a value of mvp_idx_l1. Specifically, FIG. 19 is a flow chart showing details of the process in step S240 shown in FIG. 10. In step S240, the coding control unit 102 calculates coding efficiency of each set of motion vector predictor candidates. Then, the coding control unit 102 verifies using which set of motion vector predictor candidates (for L0 and L1) results in high coding efficiency for a motion vector (estimation result). Subsequently, the coding control unit 102 determines the motion vector predictor candidate having the high coding efficiency as a motion vector predictor to be used for coding a motion vector. Consequently, one of the value of mvp_idx_l0 and the value of mvp_idx_l1 to be used for coding the motion vector is determined.

Specifically, in step S301, the coding control unit 102 sets 0 to mvp_idx_l0. Moreover, the coding control unit 102 increments mvp_idx_l0 by 1 after performing steps S302 to S308 to be described later. The coding control unit 102 repeatedly performs steps S302 to S308.

In step S302, the coding control unit 102 determines whether or not availableFlagL0[mvp_idx_l0] is 1.

When availableFlagL0[mvp_idx_l0] is not 1 in step S302 (false in S302), the coding control unit 102 skips the processing to step S309.

In contrast, when availableFlagL0[mvp_idx_l0] is 1 in step S302 (true in S302), the coding control unit 102 moves the processing to step S303.

In step S303, the coding control unit 102 sets 0 to mvp_idx_l1. Moreover, the coding control unit 102 increments mvp_idx_l1 by 1 after performing steps S304 and S305 to be described later. The coding control unit 102 repeatedly performs steps S304 and S305.

In step S304, the coding control unit 102 determines whether or not availableFlagL1[mvp_idx_l1] is 1.

When availableFlagL1[mvp_idx_l1] is not 1 in step S304 (false in S304), the coding control unit 102 skips the processing to step S308.

In contrast, when availableFlagL1[mvp_idx_l1] is 1 in step S304 (true in S304), the coding control unit 102 moves the processing to step S305.

In step S305, the coding control unit 102 puts inter coding to trial using a set of motion vector predictor candidates (mvpListL0[mvp_idx_l0], mvpListL1[mvp_idx_l1]) (hereinafter, appropriately referred to as a "set of current motion vector predictor candidates") indicated by a set of current motion vector predictor indexes (mvp_idx_l0, mvp_idx_l1).

In step S306, the coding control unit 102 compares coding efficiency of a set of motion vector predictor candidates (mvpListL0[mvp_idx_l0], mvpListL1[mvp_idx_l1]) (hereinafter, appropriately referred to as a "set of provisionally set motion vector predictor candidates") indicated by a value of a set of motion vector predictor indexes provisionally set as mvp_idx_lx with coding efficiency of the set of the current motion vector predictor candidates.

When the coding efficiency of the set of the provisionally set motion vector predictor candidates is higher than that of the set of the current motion vector predictor candidates in step S306 (No in S306), the coding control unit 102 moves the processing to step S308.

In contrast, when the coding efficiency of the set of the current motion vector predictor candidates is higher than that of the set of the provisionally set motion vector predictor candidates in step S306 (Yes in S306), the coding control unit 102 moves the processing to step S307 and sets a value of current (mvp_idx_l0, mvp_idx_l1) to the set of the motion vector predictor indexes mvp_idx_lx (mvp_idx_l0, mvp_idx_l1). It is to be noted that when a value is not set to the set of the motion vector predictor indexes mvp_idx_lx (mvp_idx_l0, mvp_idx_l1), a value of current (mvp_idx_l0, mvp_idx_l1) is set.

In step S308, the coding control unit 102 determines whether or not mvpListL1[mvp_idx_l1] is the last candidate in the candidate list (described as "mvp_idx_l1 completely finished?" in FIG. 19). For instance, in the case of the candidate list mvpListL1 shown in FIG. 18B, since a size of the candidate list is 2, it is determined that the mvpListL1[mvp_idx_l1] is the last candidate when mvp_idx_l1==1 (=candidate list size−1). When it is determined that mvpListL1[mvp_idx_l1] is not the last candidate in the candidate list, the coding control unit 102 returns the processing to step S303 and increments mvp_idx_l1 by 1 (S303).

In contrast, when it is determined that mvpListL1[mvp_idx_l1] is the last candidate in the candidate list in step S308, the coding control unit 102 moves the processing to step S309.

In step S309, the coding control unit 102 determines whether or not mvpListL0[mvp_idx_l0] is the last candidate in the candidate list (described as "mvp_idx_l0 completely finished?" in FIG. 19). For example, in the case of the candidate list mvpListL0 shown in FIG. 18A, since a size of the candidate list is 3, it is determined that the mvpListL0 [mvp_idx_l0] is the last candidate when mvp_idx_l0==2 (=candidate list size−1). When it is determined that mvpListL0[mvp_idx_l0] is not the last candidate in the candidate list, the coding control unit 102 returns the processing to step S301 and increments mvp_idx_l0 by 1 (S301).

In contrast, when it is determined that mvpListL0 [mvp_idx_l0] is the last candidate in the candidate list in step S309, the coding control unit 102 moves the processing to step S310.

In step S310, the coding control unit 102 determines mvp_idx_lx (mvp_idx_l0, mvp_idx_l1) as a set of motion vector predictor indexes.

Figure 20:
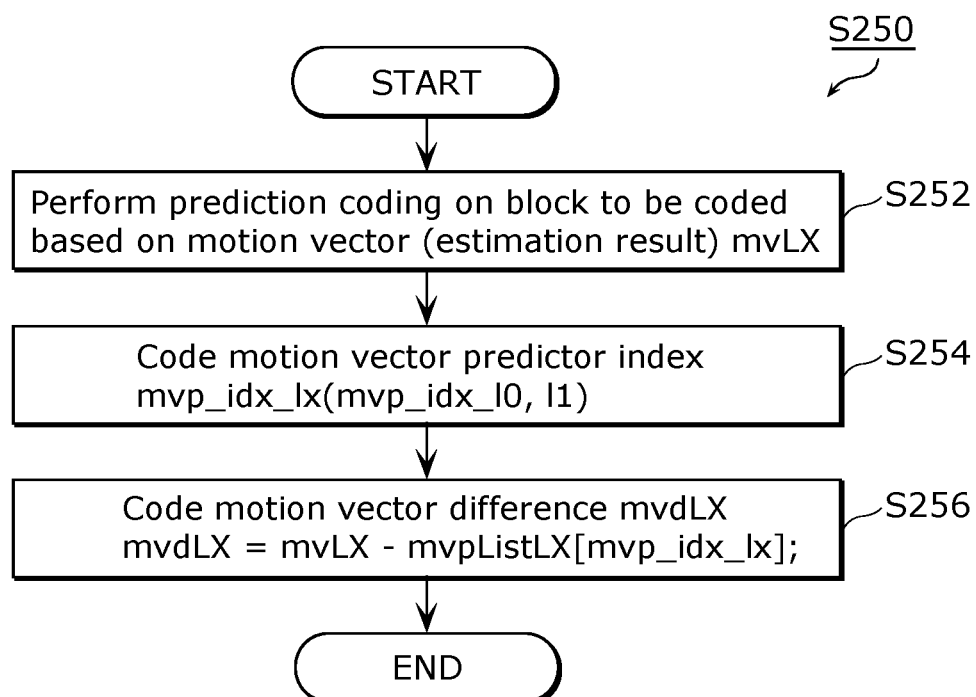
FIG. 20 is a flow chart for intra/inter coding according to Embodiment 1.

FIG. 20 is a flow chart for intra/inter coding according to Embodiment 1. Specifically, FIG. 20 is a flow chart showing details of the process in step S250 shown in FIG. 10.

In step S252, the intra/inter prediction unit 101 generates a prediction image of a current block to be coded using a motion vector (estimation result) mvLX, and outputs a prediction image signal representing the generated prediction image. The subtractor 111 subtracts the prediction image signal from an input image signal to generate a residual signal. The transform unit 112 transforms the residual signal from the image domain to the frequency domain. The quantization unit 113 quantizes the residual signal which is transformed to the frequency domain, to generate a quantized residual signal. The entropy coding unit 114 codes the quantized residual signal.

In step S254, the entropy coding unit 114 codes a value of a motion vector predictor candidate designating index. In other words, the entropy coding unit 114 codes mvp_idx_lx (mvp_idx_l0, mvp_idx_l1).

In step S256, the entropy coding unit 114 codes a motion vector difference mvdLX.

The entropy coding unit 114 generates and outputs a coded bitstream including the coded quantized residual signal, the set of the motion vector predictor indexes mvp_idx_lx (mvp_idx_l0, mvp_idx_l1), and the motion vector difference mvdLX.

Effects of Embodiment 1

As described above, with the moving picture coding method according to this embodiment, when the view including the picture including the co-located block is different from the view including the current picture, it is possible to adjust the intra-picture position of the co-located block using the disparity vector between the two views. In addition, it is possible to add to the list the entry including the motion vector of the co-located block having the adjusted position. Thus, although the views respectively including the two pictures are different, the coding does not need to be performed using the motion data of the block at the exact same position (the black circle in FIG. 16). In other words, it is possible to use a block at a more appropriate position as the co-located block when the current block is coded, which is expected to increase the coding efficiency.

It is to be noted that although the adjustment of the position of the co-located block for the motion vector predictor candidate (motion vector predictor vector mode), the above-mentioned adjustment can be also applied to a co-located block in the merge mode of HEVC. To put it another way, the prediction image of the current block may be generated using the motion data of the co-located block having the adjusted position.

It is to be noted that the moving picture coding apparatus 100 does not need to include all the structural elements shown in FIG. 9A in this embodiment. For instance, the moving picture coding apparatus 100 may include only the structural elements shown in FIG. 9B. Stated differently, the moving picture coding method may include only the steps shown in FIG. 17. Even in such a case, it is possible to use the block at the more appropriate position as the co-located block, which is expected to increase the coding efficiency.

Each of the structural elements in this embodiment may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the moving picture coding apparatus or the like according to this embodiment is a program described below.

The program causes a computer to execute a moving picture coding method for coding a moving picture using a list having at least one entry including a motion vector, the method including: determining whether or not (a) a picture including a co-located block and (b) a current picture to be coded are included in a same view, the co-located block being a block that is included in a picture different from the current picture and is at a position corresponding to a position of a current block to be coded included in the current picture; adjusting the position of the co-located block when the picture including the co-located block and the current picture are included in different views; and adding to the list an entry including a motion vector derived from the co-located block, wherein the adjusting includes: obtaining a disparity vector between the view including the picture including the co-located block and the view including the current picture; and adjusting the position of the co-located block by the obtained disparity vector.

Embodiment 2

Embodiment 2 describes a moving picture decoding apparatus 200 that decodes a coded bitstream output by the moving picture coding apparatus 100 according to Embodiment 1.

Figure 21A:
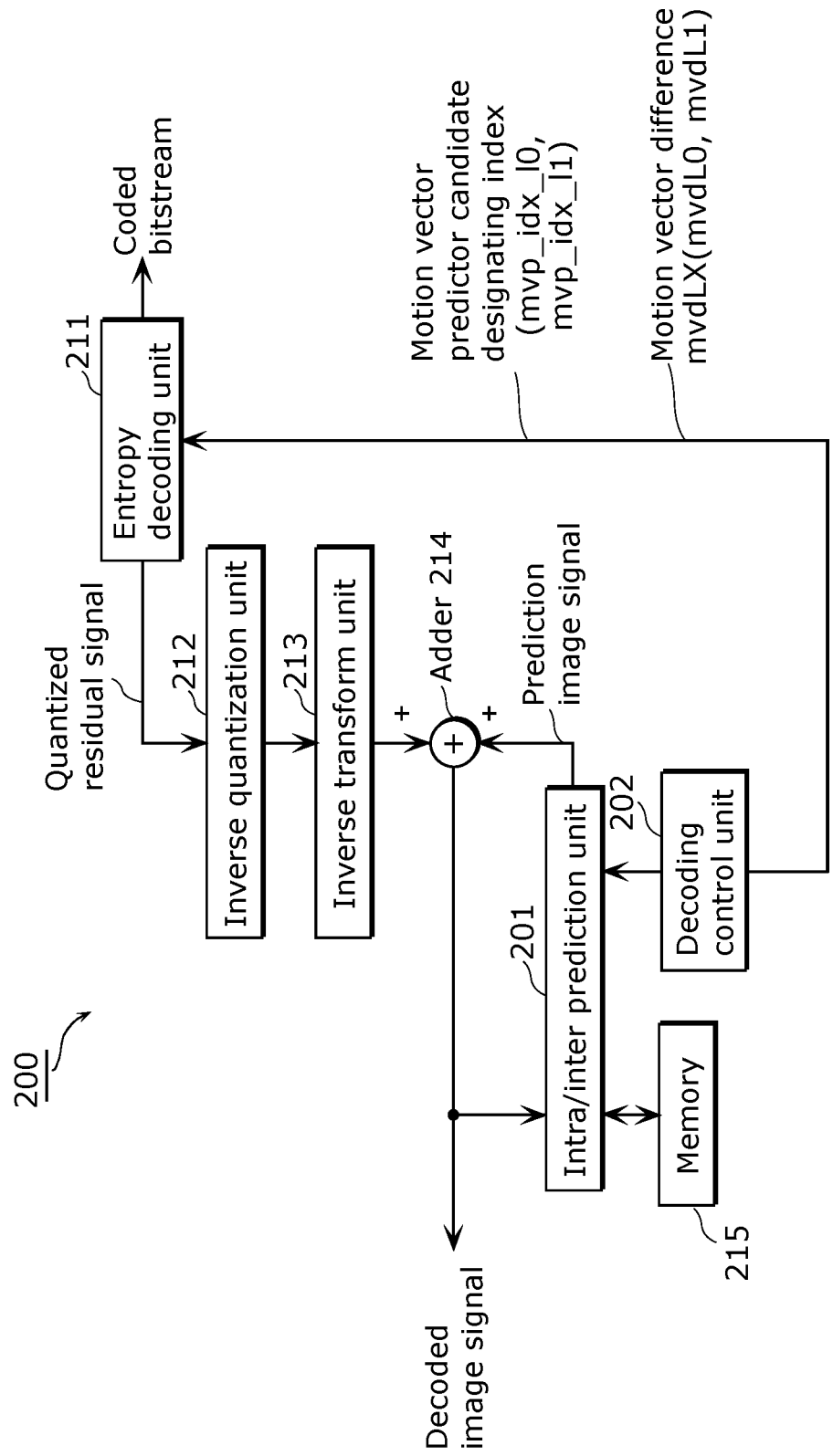
FIG. 21A is a block diagram showing a configuration of a moving picture decoding apparatus according to Embodiment 2.

FIG. 21A is a block diagram showing a configuration of the moving picture decoding apparatus 200 according to Embodiment 2.

The moving picture decoding apparatus 200 receives a coded bitstream and outputs a decoded image signal in display order. Here, the moving picture decoding apparatus 200 decodes a coded multi-view moving picture using a list having at least one entry including a motion vector.

As shown in FIG. 21A, the moving picture decoding apparatus 200 includes an entropy decoding unit 211, an inverse quantization unit 212, an inverse transform unit 213, an adder 214, a memory 215, an intra/inter prediction unit 201, and a decoding control unit 202. In FIG. 21A, a function of each of the units having the same names as those in the moving picture coding apparatus 100 shown in FIG. 9A corresponds to the function of each of the units in the moving picture coding apparatus 100 shown in FIG. 9A.

The entropy decoding unit 211 receives a coded bitstream and outputs a coded residual signal and decoding control information, for instance. The decoding control information includes a motion vector predictor candidate designating index mvp_idx_lx (mvp_idx_l0, mvp_idx_l1) and a motion vector difference mvdLX (mvdL0, mvdL1).

The inverse quantization unit 212 and the inverse transform unit 213 process (perform inverse quantization and inverse frequency transform on) the quantized residual signal and output a reconstructed residual signal to the adder 214.

The adder 214 adds the reconstructed residual signal and a prediction image signal, and outputs a decoded image signal.

The decoding control unit 202 generates, using a method to be described later, the motion vector predictor candidate lists (mvpListL0 and mvpListL1) shown in FIG. 18A and FIG. 18B. The decoding control unit 202 further selects, from each of the generated candidate lists, a motion vector predictor according to a motion vector predictor candidate designating index mvp_idx_lx (mvp_idx_l0, mvp_idx_l1). Then, the decoding control unit 202 reconstructs a motion vector (estimation result) using the motion vector predictor and the motion vector difference mvdLX (mvdL0, mvdL1).

The intra/inter prediction unit 201 generates the prediction image signal from the decoded image signal using the reconstructed motion vector, and outputs the prediction image signal.

Figure 21B:
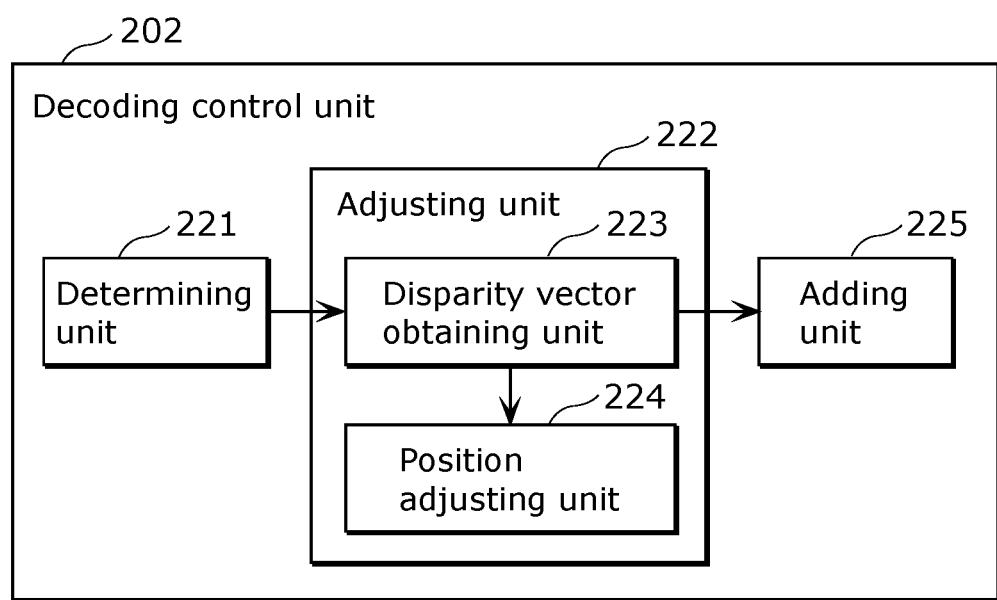
FIG. 21B is a block diagram showing a configuration of a decoding control unit according to Embodiment 2.

FIG. 21B is a block diagram showing a configuration of the decoding control unit 202 according to Embodiment 2. As shown in FIG. 21B, the decoding control unit 202 includes a determining unit 221, an adjusting unit 222, and an adding unit 225.

As with the determining unit 121 in Embodiment 1, the determining unit 221 determines whether or not a picture including a co-located block and a current picture to be decoded are included in the same view.

As with the adjusting unit 122 in Embodiment 1, when the picture including the co-located block and the current picture are included in different views, the adjusting unit 222 adjusts a position of the co-located block. To put it another way, the adjusting unit 222 adjusts the intra-picture position of the co-located block. As shown in FIG. 21B, the adjusting unit 222 includes a disparity vector obtaining unit 223 and a position adjusting unit 224.

As with the disparity vector obtaining unit 123 in Embodiment 1, the disparity vector obtaining unit 223 obtains a disparity vector between the view including the picture including the co-located block and the view including the current picture.

As with the adjusting unit 124 in Embodiment 1, the position adjusting unit 224 adjusts the position of the co-located block by the obtained disparity vector.

As with the adding unit 125 in Embodiment 1, the adding unit 225 adds to a list an entry including a motion vector derived from the co-located block. In this embodiment, the adding unit 225 adds, to a motion vector predictor candidate list, the entry including the motion vector derived from the co-located block as a motion vector predictor candidate.

It is to be noted that the adding unit 225 may add, to a merge candidate list, an entry including a motion vector derived from a co-located block and a reference picture index as a merge candidate.

Figure 22:
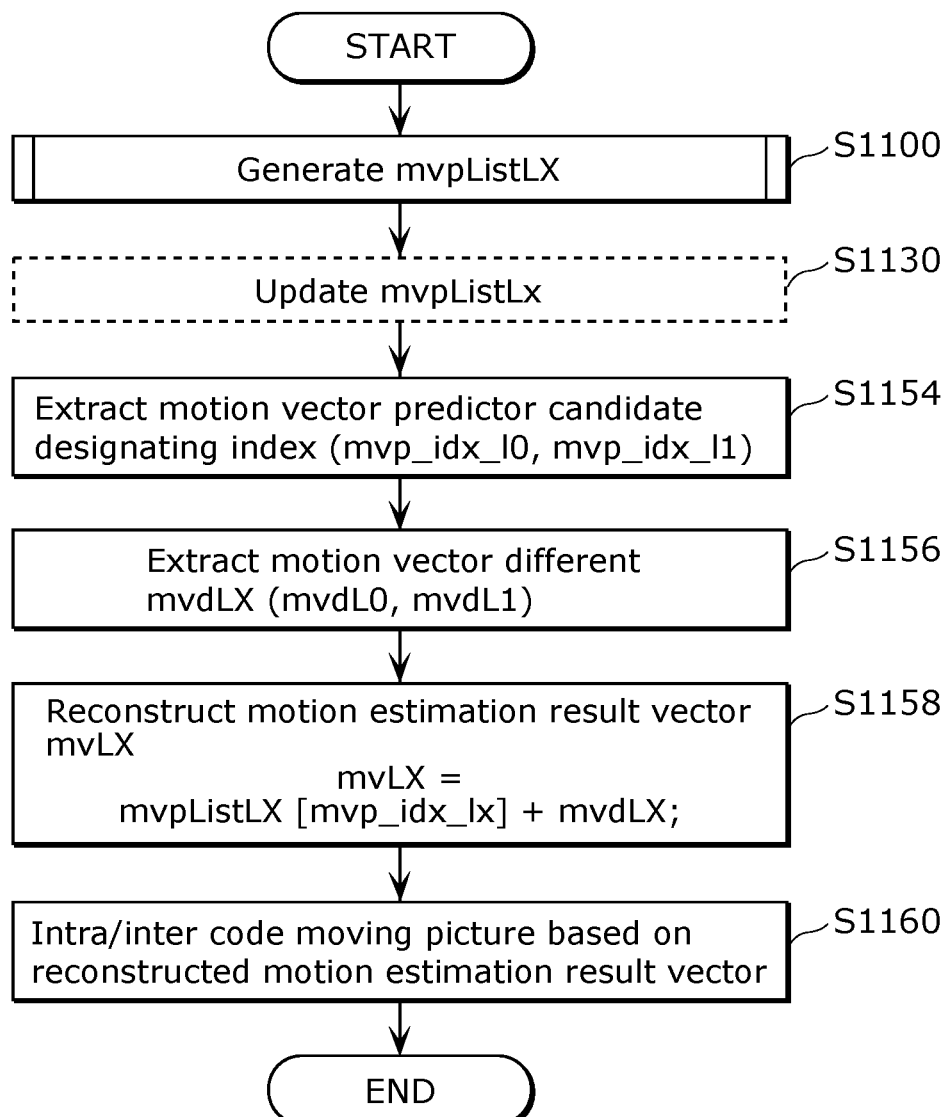
FIG. 22 is a flow chart showing a moving picture decoding method according to Embodiment 2.

FIG. 22 is a flow chart showing a moving picture decoding method according to Embodiment 2.

In step S1100, the decoding control unit 202 generates a motion vector predictor candidate list (mvpListLX). The process in step S1100 corresponds to the process in step S210 on the coding side.

In step S1130, the decoding control unit 202 performs an update process of mvpListLX and outputs mvpListLX. The update process complies with a rule implicitly shared with the coding side. It is to be noted that the update process may not need to be performed.

In step S1154, the entropy decoding unit 211 extracts a motion vector predictor candidate designating index (mvp_idx_lx) from a coded bitstream.

In step S1156, the entropy decoding unit 211 extracts a motion vector difference (mvdLX) from the coded bitstream.

In step S1158, the decoding control unit 202 reconstructs a motion vector (mvLX). Specifically, the decoding control unit 202 adds the motion vector difference mvdLX and the motion vector predictor mvpListLX[mvp_idx_lx] as shown below, to obtain the motion vector mvLX.

$$mvLX = mvpListLX[mvp\_idx\_lx] + mvdLX$$

In step S1160, the intra/inter prediction unit 201 performs inter prediction using the reconstructed motion vector, to generate a prediction image signal. Subsequently, the adding unit 214 adds the prediction image signal and a reconstructed residual signal to generate a decoded image signal.

Figure 23:
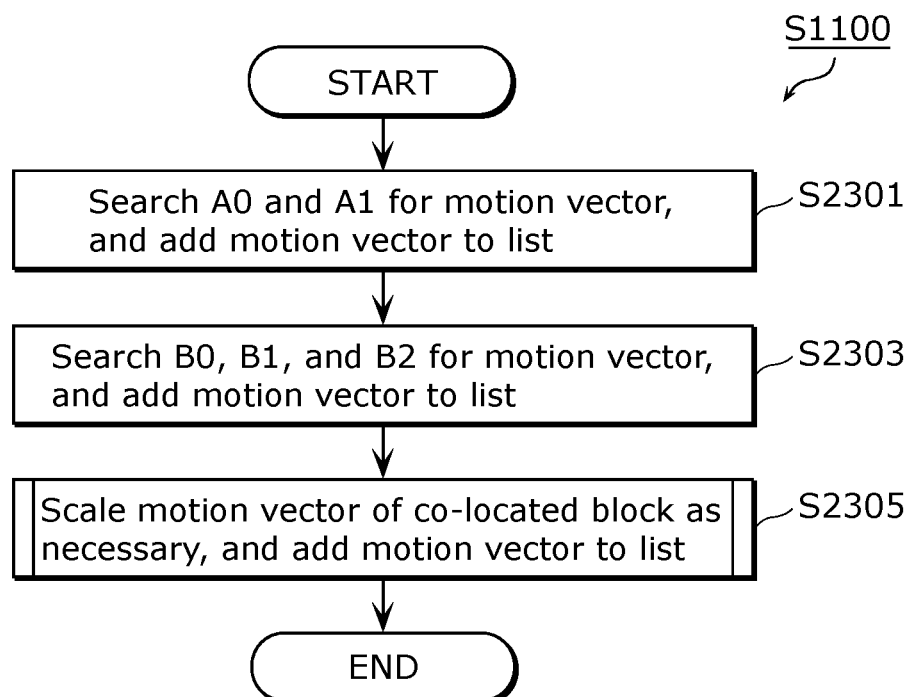
FIG. 23 is a flow chart for processing of generating a motion vector predictor candidate list according to Embodiment 2.

FIG. 23 is a flow chart for processing of generating a motion vector predictor candidate list according to Embodiment 2. Specifically, FIG. 23 is a flow chart showing details of the process in step S1100 shown in FIG. 22.

In step S2301, the decoding control unit 202 searches a group of blocks A for a block having an available motion vector. The decoding control unit 202 adds the motion vector of the searched block to mvpListLX. It is to be noted that the process in step S2301 is the same as the process in step S400 shown in FIG. 14.

In step S2303, the decoding control unit 202 searches a group of blocks B for a block having an available motion vector. The decoding control unit 202 adds the motion vector of the searched block to mvpListLX. It is to be noted that the process in step S2301 is the same as the process in step S500 shown in FIG. 14.

Finally, in step S2305, the decoding control unit 202 adds to mvpListLX an entry including a motion vector of a co-located block that is a motion vector scaled as necessary. It is to be noted that the process in step S2305 is the same as the process in step S600 shown in FIG. 14.

Figure 24:
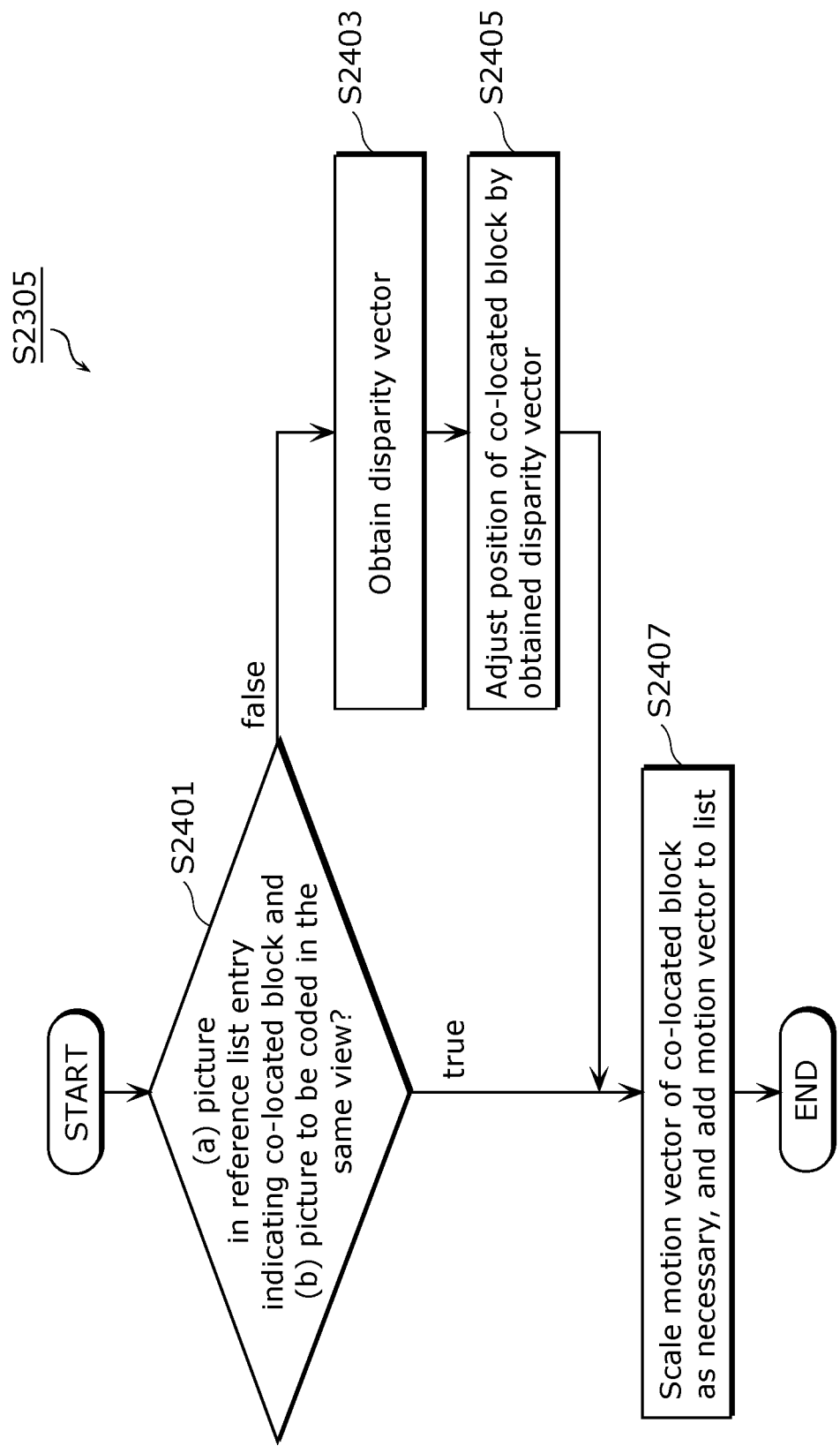
FIG. 24 is a flow chart for processing of adding motion data of a co-located block to a motion vector predictor candidate list according to Embodiment 2.

FIG. 24 is a flow chart for processing of adding motion data of a co-located block to a motion vector predictor candidate list according to Embodiment 2. Specifically, FIG. 24 is a flow chart showing details of the process in step S2305 shown in FIG. 23.

First, in step S2401, the determining unit 221 determines whether or not (a) a picture including a co-located block and (b) a picture (a current picture to be coded) including a current block to be coded are included in the same view. In this embodiment, the determining unit 221 determines whether or not (a) a picture that is identified by an entry 0 (the first entry) in a reference picture list and includes a co-located block and (b) the picture (the current picture) including the current block are included in the same view.

This determination is the same as the determination made in step S901. For instance, when a reference picture list for identifying the picture including the co-located block is L1 (or determined by a flag), as shown in FIG. 2B, the picture including the co-located block is a picture having a picture number (picNum) indicated by RefPicListL1[0]. It is to be noted that although the picture including the co-located block is the picture RefPicListL[1−collocated_direction flag][0] in this embodiment, the present invention is not always limited to this. For example, the picture including the co-located block may be RefPicListL[1−collocated_direction flag][colPic_idx]. In this case, it may be determined which picture is used as the picture including the co-located block, by extracting a parameter (colPic_idx) added to a bitstream as header information such as an SPS, a PPS, and a slice header.

Here, when the determination result in step S2401 is true (the two pictures are included in the same view (a case where there is only one view is included)), the processing proceeds to step S2407.

In contrast, when the determination result in step S2401 is false (the two pictures are not included in the same view), the processing proceeds to step S2403.

As with step S903, in step S2403, the disparity vector obtaining unit 223 obtains a disparity vector between the view (e.g., the base view 0 in FIG. 16) including the picture including the co-located block and the view including a current block to be decoded (e.g., the non-base view 2 in FIG. 16).

It is to be noted that as stated above, the disparity vector obtaining unit 223 may obtain a disparity vector resulting from statistical processing of past disparity vectors near the current block or one of the latest disparity vectors, for instance. In addition, the disparity vector obtaining unit 223 may parse the SPS, the PPS, the slice header, or the like, to obtain, from the SPS, the PPS, the slicer header, or the like, a disparity vector that corresponds to the picture including the co-located block.

Next, in step S2405, the position adjusting unit 124 adjusts a position of the co-located block using the obtained disparity vector. The process in step S2405 corresponds to the process in step S905 shown in FIG. 17.

Finally, in step S2407, the adding unit 225 adds to the motion vector predictor candidate list motion data (a motion vector and a reference picture index) of the co-located block having the adjusted position or the original position as a value of an entry for co-located block (N=Col).

FIG. 25 is a diagram showing, in pseudo code, processing of adding motion data of a co-located block to a motion vector predictor candidate list according to Embodiment 2. In other words, FIG. 25 is obtained by representing the flow chart shown in FIG. 24 in pseudo code.

The description in the first line indicates a process of setting a picture number of a picture including a block designated as a co-located block to a value of colPic. co_located_l0_flag is a flag to which 1 is set when not a reference picture list L1 but a reference picture list L0 is used to identify a picture including the co-located block.

The description in the second line indicates the determination process in step S2401 shown in FIG. 24. That is to say, the description in the second line indicates a process of determining whether (a) a view including a picture of colPic and (b) a view including a current block to be decoded (a picture of currPic) are different (not the same) or the same.

The description in the third line indicates the processes in step S2401 and step S2405 shown in FIG. 24. Namely, the description in the third line indicates a process of adjusting co_located_position, a position of the co-located block, using the latest disparity vector (disparity_vector) between the view including the picture of currPic and the view including the picture of colPic when the determination result is true (i.e., (a) the view including the picture of colPic and (b) the view including the picture of currPic are different).

The description in the fifth line indicates the process in step S2407 shown in FIG. 24. That is to say, the description in the fifth line indicates a process of adding to a motion vector predictor candidate list motion data of a block at a position indicated by co-located_position in the picture of colPic.

As described above, with the moving picture decoding method according to this embodiment, when the view including the picture including the co-located block is different from the view including the current picture, it is possible to adjust the intra-picture position of the co-located block using the disparity vector between the two views. In addition, it is possible to add to the list the entry including the motion vector of the co-located block having the adjusted position. Thus, it is possible to use a block at a more appropriate position as the co-located block when the current block is decoded, which is expected to increase the coding efficiency.

Moreover, since this method of adjusting a position of a co-located block can be implicitly shared by the coding side and the decoding side, it is not necessary to add syntax. Thus, even when the syntax is not added, it is possible to adjust the position of the co-located block, which is expected to increase accuracy of predicting a motion vector predictor using motion data of a co-located block.

It is to be noted that although the adjustment of the position of the co-located block for the motion vector predictor candidate (motion vector predictor vector mode), the above-mentioned adjustment can be also applied to a co-located block in the merge mode of HEVC. In other words, the prediction image of the current block may be generated using the motion data of the co-located block having the adjusted position.

It is to be noted that the moving picture decoding apparatus 200 does not need to include all the structural elements shown in FIG. 21A in this embodiment. For instance, the moving picture decoding apparatus 200 may include only the structural elements shown in FIG. 21B. Stated differently, the moving picture decoding method may include only the steps shown in FIG. 24. Even in such a case, it is possible to use the block at the more appropriate position as the co-located block, which is expected to increase the coding efficiency.

It is to be noted that the position of the co-located block does not need to be exactly the same as that of the current block. For example, examples of the position of the co-located block include a positional relationship as shown in FIG. 26. In this embodiment, it is possible to increase the coding efficiency by adjusting, using a disparity vector, any position that is used as a reference according to a difference in two views.

Each of the structural elements in this embodiment may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the moving picture decoding apparatus or the like according to this embodiment is a program described below.

The program causes a computer to execute a moving picture decoding method for decoding a coded moving picture using a list having at least one entry including a motion vector, the method including: determining whether or not (a) a picture including a co-located block and (b) a current picture to be decoded are included in a same view, the co-located block being a block that is included in a picture different from the current picture and is at a position corresponding to a position of a current block to be decoded included in the current picture; adjusting the position of the co-located block when the picture including the co-located block and the current picture are included in different views; and adding to the list an entry including a motion vector derived from the co-located block, wherein the adjusting includes: obtaining a disparity vector between the view including the picture including the co-located block and the view including the current picture; and adjusting the position of the co-located block by the obtained disparity vector.

Although the moving picture coding apparatus and the moving picture decoding apparatus according to one or more aspects have been described above based on the embodiments, the present invention is not limited to the embodiments. Without departing from the scope of the present invention, the aspects of the present invention may include an embodiment with some modifications on embodiments that are conceived by a person skilled in the art, and another embodiment obtained through combinations of the constituent elements of different embodiments.

For instance, although, in Embodiments 1 and 2, when adding to the entry the motion vector derived from the spatially adjacent block (adjacent block), the moving picture coding apparatus and the moving picture decoding apparatus add the entry including the motion vector derived from the block in the group of blocks A and the entry including the motion vector derived from the block in the group of blocks B in this order, it is not always necessary to add the entries in such order. For example, the moving picture coding apparatus and the moving picture decoding apparatus may add entries without distinction between the group of blocks A and the group of blocks B. Moreover, an entry including motion vectors respectively derived from three or more adjacent blocks may be added to a list.

Furthermore, although each entry in the motion vector predictor candidate list includes a reference picture index in Embodiments 1 and 2, the entry may not need to include the reference picture index.

Embodiment 3

The processing described in each of Embodiments can be simply implemented in an independent computer system, by recording, in a recording medium, a program for implementing a configuration of the moving picture coding method (an image coding method) or the moving picture decoding method (an image decoding method) described in each of Embodiments. The recording medium may be any as long as the program can be recorded thereon, such as a magnetic disk, an optical disk, an optical magnetic disk, an IC card, and a semiconductor memory.

Hereinafter, applications of the moving picture coding method (image coding method) and the moving picture decoding method (image decoding method) according to each of the embodiments, and a system using such applications will be described. The system features including an image coding apparatus using the image coding method, and an image coding and decoding apparatus including an image decoding apparatus using the image decoding method. The other configurations of the system can be appropriately changed depending on a case.

Figure 27:
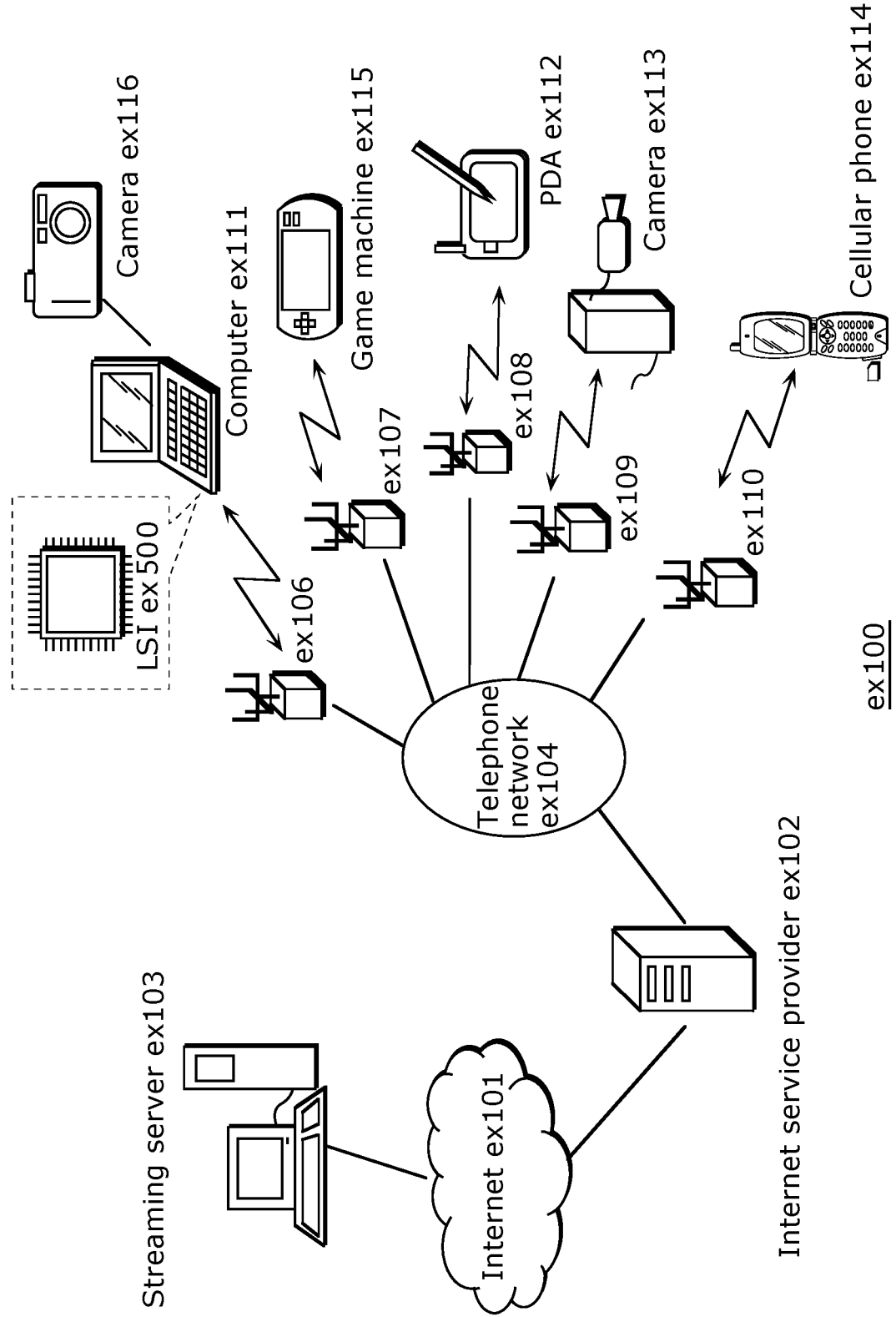
FIG. 27 illustrates an overall configuration of a content providing system for implementing content distribution services.

FIG. 27 illustrates an overall configuration of a content providing system ex100 for implementing content distribution services. The area for providing communication services is divided into cells of desired size, and base stations ex106 to ex110 which are fixed wireless stations are placed in each of the cells.

The content providing system ex100 is connected to devices, such as a computer ex111, a personal digital assistant (PDA) ex112, a camera ex113, a cellular phone ex114, and a game machine ex115, via an Internet ex101, an Internet service provider ex102, a telephone network ex104, as well as the base stations ex106 to ex110.

However, the configuration of the content providing system ex100 is not limited to the configuration shown in FIG. 27, and a combination in which any of the elements are connected is acceptable. In addition, each of the devices may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing moving images. A camera ex116, such as a digital video camera, is capable of capturing both still images and moving images. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of a live show and others. In such a distribution, a content (for example, video of a music live show) captured by the user using the camera ex113 is coded (that is, functions as the image coding apparatus according to an aspect of the present invention) as described above in each of the embodiments, and the coded content is transmitted to the streaming server ex103. On the other hand, the streaming server ex103 carries out stream distribution of the received content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (that is, functions as the image decoding apparatus according to an aspect of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and the moving images captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, generally, the computer ex111 and an LSI ex500 included in each of the devices perform such encoding and decoding processes. The LSI ex500 may be configured of a single chip or a plurality of chips. Software for encoding and decoding moving pictures may be integrated into some type of a recording medium (such as a CD-ROM, a flexible disk, and a hard disk) that is readable by the computer ex111 and others, and the encoding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients can receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 28:
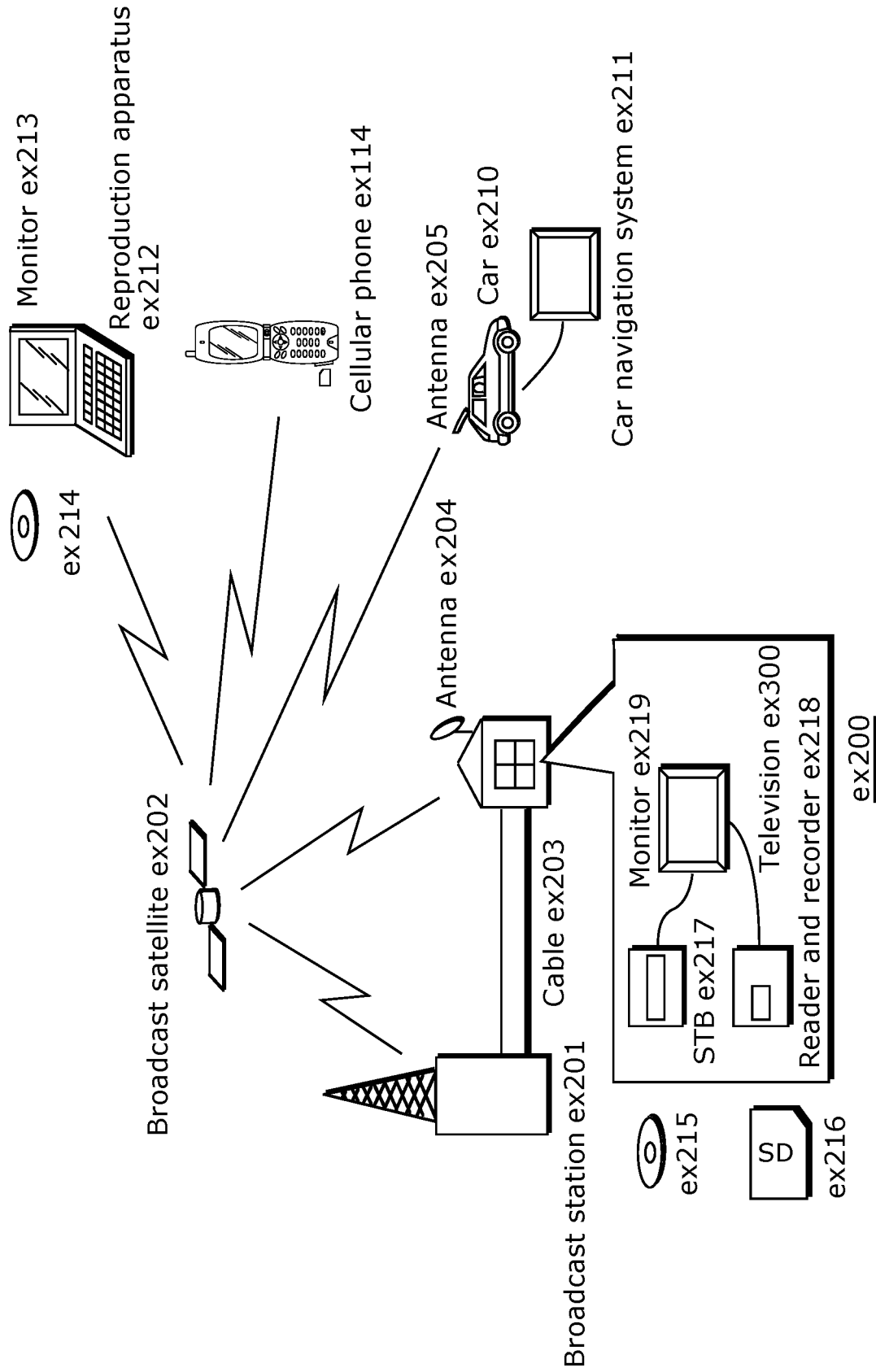
FIG. 28 illustrates an overall configuration of a digital broadcasting system.

Aside from the example of the content providing system ex100, at least one of the moving picture coding apparatus (the image coding apparatus) and the moving picture decoding apparatus (the image decoding apparatus) described in each of the embodiments may be implemented in a digital broadcasting system ex200 illustrated in FIG. 28. More specifically, a broadcast station ex201 communicates or transmits, via radio waves to a broadcast satellite ex202, multiplexed data obtained by multiplexing the audio data onto the video data. The video data is data coded by the moving picture coding method described in each of the embodiments (that is, data coded by the image coding apparatus according to an aspect of the present invention). Upon receipt of the video data, the broadcast satellite ex202 transmits radio waves for broadcasting. Then, a home-use antenna ex204 capable of receiving a satellite broadcast receives the radio waves. A device such as a television (receiver) ex300 and a set top box (STB) ex217 decodes the received multiplexed data, and reproduces the decoded data (that is, functions as the image decoding apparatus according to an aspect of the present invention).

Furthermore, a reader/recorder ex218 that (i) reads and decodes the multiplexed data recorded on a recording media ex215, such as a DVD and a BD, or (ii) codes video signals in the recording medium ex215, and in some cases, writes data obtained by multiplexing an audio signal on the coded data can include the moving picture decoding apparatus or the moving picture coding apparatus as shown in each of the embodiments. In this case, the reproduced video signals are displayed on the monitor ex219, and another apparatus or system can reproduce the video signals, using the recording medium ex215 on which the multiplexed data is recorded. Furthermore, it is also possible to implement the moving picture decoding apparatus in the set top box ex217 connected to the cable ex203 for a cable television or the antenna ex204 for satellite and/or terrestrial broadcasting, so as to display the video signals on the monitor ex219 of the television ex300. The moving picture decoding apparatus may be included not in the set top box but in the television ex300.

Figure 29:
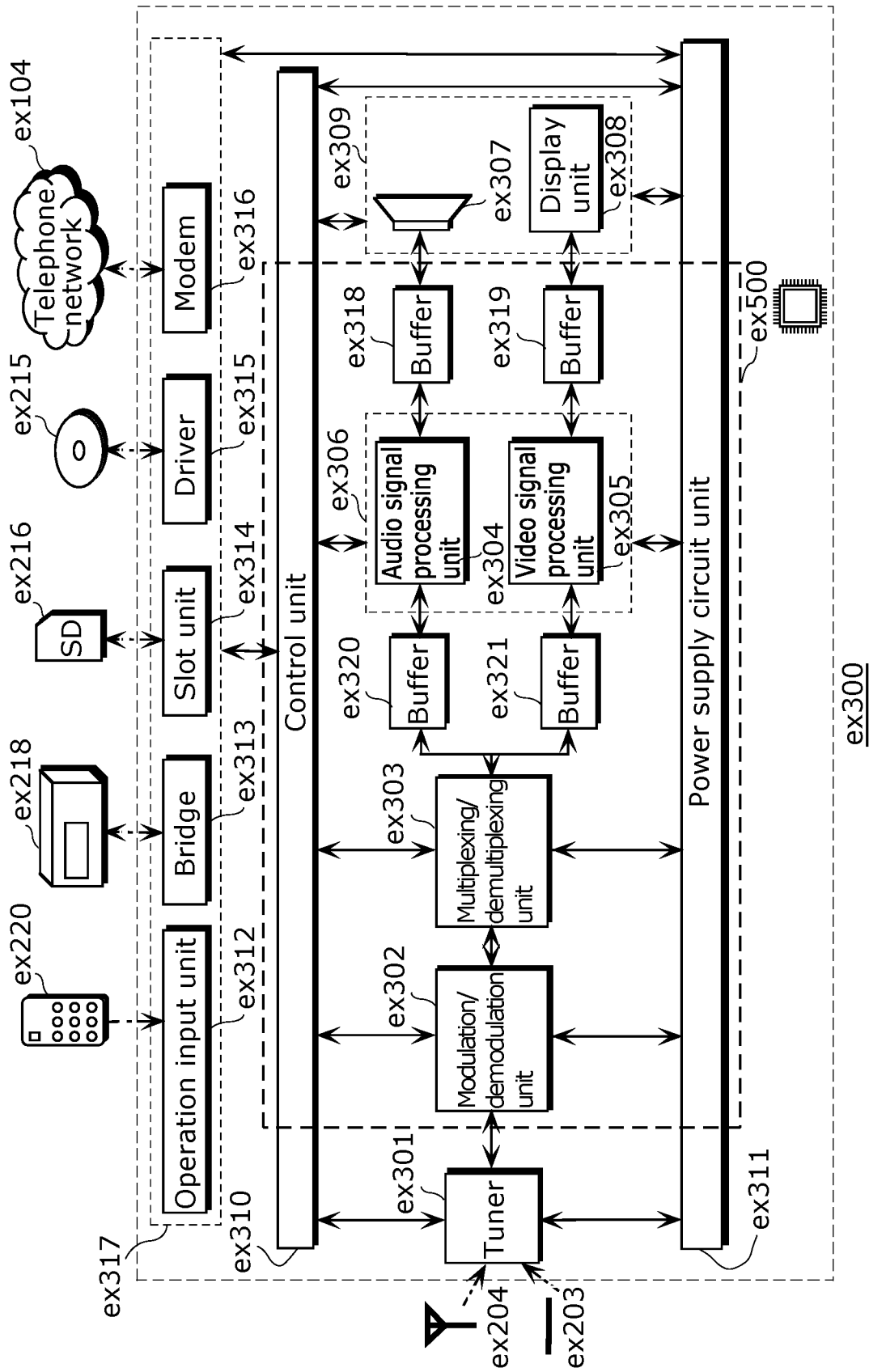
FIG. 29 is a block diagram illustrating an example of a configuration of a television.

FIG. 29 illustrates the television (receiver) ex300 that uses the moving picture coding method and the moving picture decoding method described in each of Embodiments. The television ex300 includes: a tuner ex301 that obtains or provides multiplexed data obtained by multiplexing the audio data and the video data through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes the video data and audio data coded by the signal processing unit ex306 into data.

The television ex300 further includes: a signal processing unit ex306 including an audio signal processing unit ex304 and a video signal processing unit ex305 that decode audio data and video data and code audio data and video data, respectively (that function as the image coding apparatus and the image decoding apparatus, respectively, according to an aspect of the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to one another through a synchronous bus.

First, a configuration in which the television ex300 decodes the multiplexed data obtained from outside through the antenna ex204 and others and reproduces the decoded data will be described. In the television ex300, upon receipt of a user operation from a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of the embodiments, in the television ex300. The output unit ex309 provides the decoded video signal and audio signal outside. When the output unit ex309 provides the video signal and the audio signal, the signals may be temporarily stored in buffers ex318 and ex319, and others so that the signals are reproduced in synchronization with each other. Furthermore, the television ex300 may read the multiplexed data not through a broadcast and others but from the recording media ex215 and ex216, such as a magnetic disk, an optical disc, and an SD card. Next, a configuration in which the television ex300 codes an audio signal and a video signal, and transmits the data outside or writes the data on a recording medium will be described. In the television ex300, upon receipt of a user operation from the remote controller ex220 and others, the audio signal processing unit ex304 codes an audio signal, and the video signal processing unit ex305 codes a video signal, under control of the control unit ex310 using the coding method as described in each of the embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in buffers ex320 and ex321, and others so that the signals are reproduced in synchronization with each other. Here, the buffers ex318 to ex321 may be plural as illustrated, or at least one buffer may be shared in the television ex300. Furthermore, data may be stored in a buffer other than the buffers ex318 to ex321 so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be not capable of performing all the processes but capable of only one of receiving, decoding, and providing outside data.

Furthermore, when the reader/recorder ex218 reads or writes the multiplexed data from or in a recording medium, one of the television ex300 and the reader/recorder ex218 may decode or code the multiplexed data, and the television ex300 and the reader/recorder ex218 may share the decoding or encoding.

Figure 30:
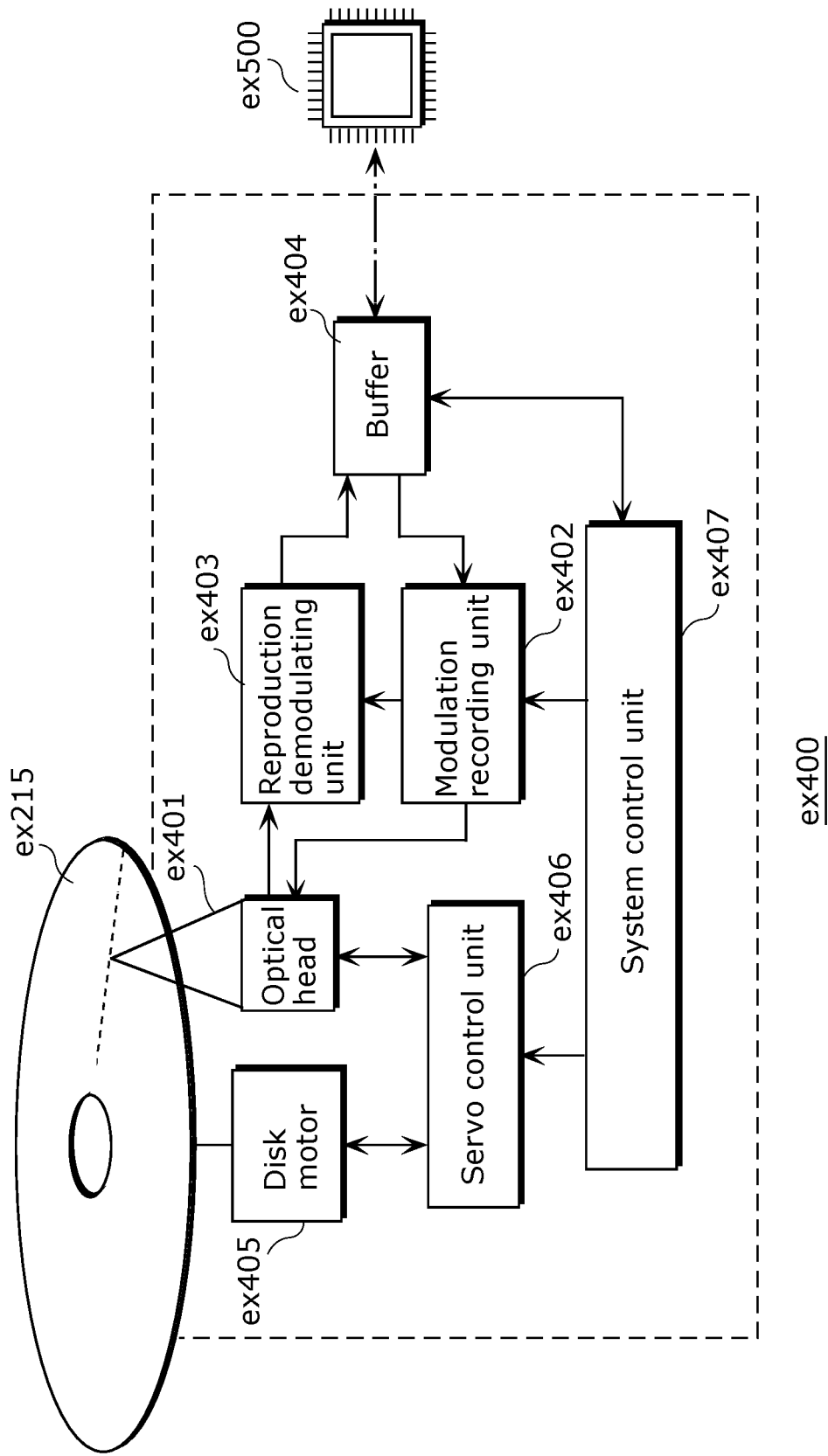
FIG. 30 is a block diagram illustrating an example of a configuration of an information reproducing/recording unit that reads and writes information from and on a recording medium that is an optical disk.

As an example, FIG. 30 illustrates a configuration of an information reproducing/recording unit ex400 when data is read or written from or on an optical disk. The information reproducing/recording unit ex400 includes constituent elements ex401 to ex407 to be described hereinafter. The optical head ex401 irradiates a laser spot on a recording surface of the recording medium ex215 that is an optical disc to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. A disk motor ex405 rotates the recording medium ex215. A servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 31:
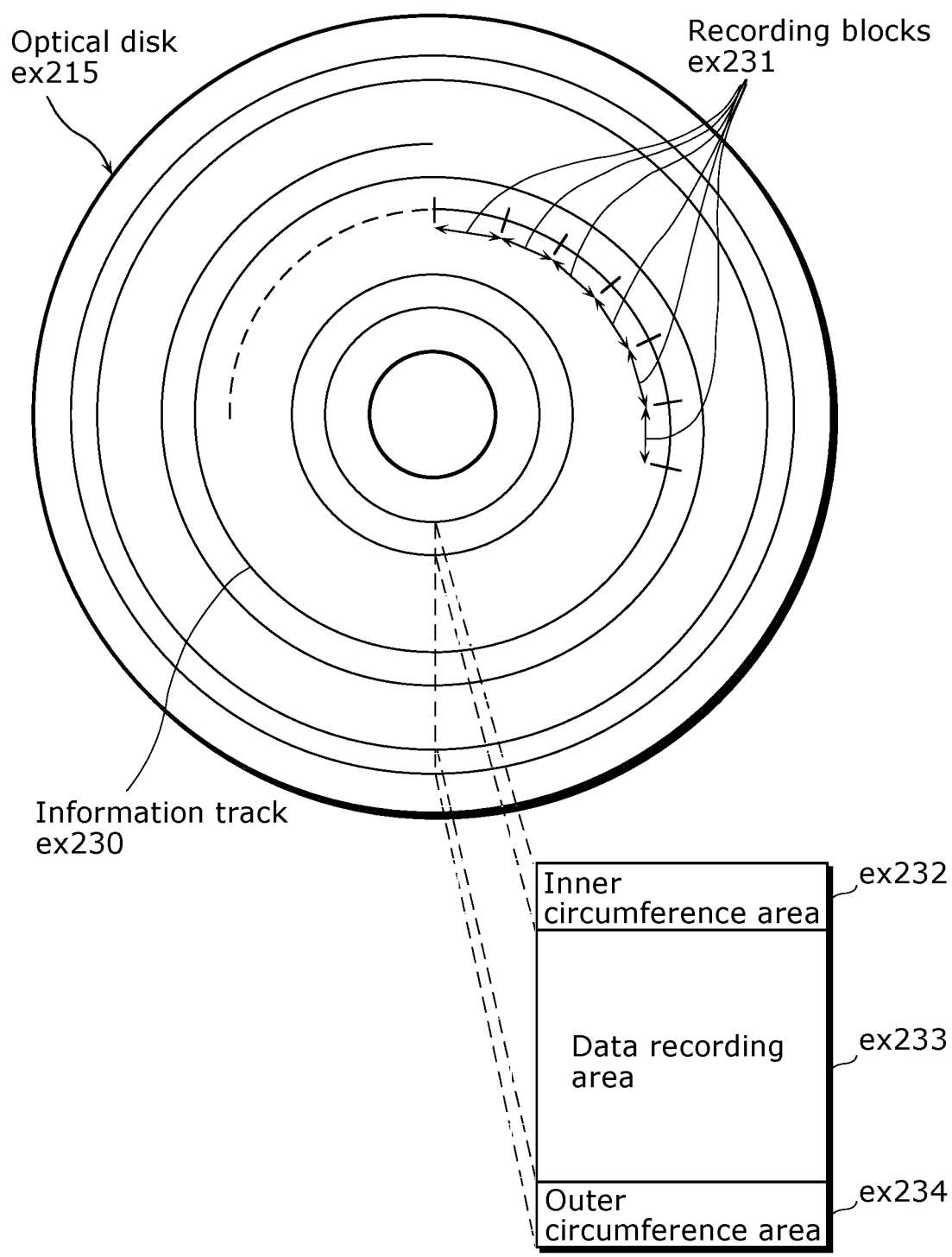
FIG. 31 shows an example of a configuration of a recording medium that is an optical disk.

FIG. 31 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. An apparatus that records and reproduces data reproduces the information track ex230 and reads the address information so as to determine the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio data, coded video data, or multiplexed data obtained by multiplexing the coded audio data and the coded video data, from and on the data recording area ex233 of the recording medium ex215.

Although an optical disc having a layer, such as a DVD and a BD is described as an example in the description, the optical disc is not limited to such, and may be an optical disc having a multilayer structure and capable of being recorded on a part other than the surface. Furthermore, the optical disc may have a structure for multidimensional recording/reproduction, such as recording of information using light of colors with different wavelengths in the same portion of the optical disc and recording information having different layers from various angles.

Furthermore, the car ex210 having the antenna ex205 can receive data from the satellite ex202 and others, and reproduce video on the display device such as the car navigation system ex211 set in the car ex210, in a digital broadcasting system ex200. Here, a configuration of the car navigation system ex212 will be a configuration, for example, including a GPS receiving unit from the configuration illustrated in FIG. 29. The same will be true for the configuration of the computer ex111, the cellular phone ex114, and others.

Figure 32A:
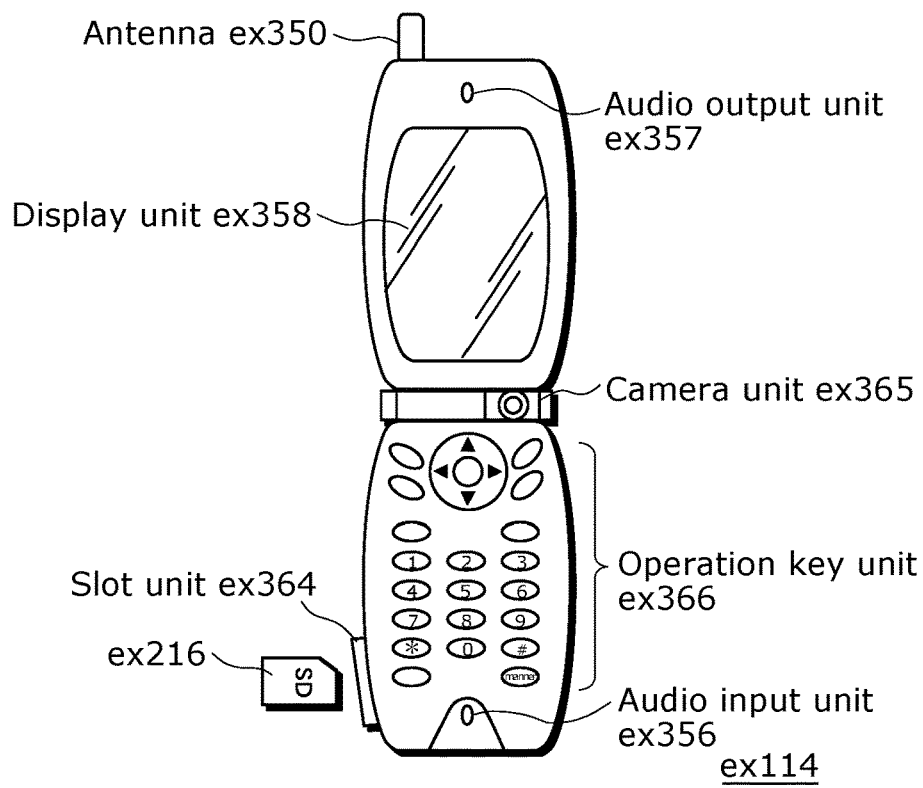
FIG. 32A shows an example of a cellular phone.

FIG. 32A illustrates the cellular phone ex114 that uses the moving picture coding method or the moving picture decoding method described in the embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including a set of operation keys ex366; an audio output unit ex357 such as a speaker for output of audio; an audio input unit ex356 such as a microphone for input of audio; a memory unit ex367 for storing captured video or still pictures, recorded audio, coded or decoded data of the received video, the still images, e-mails, or others; and a slot unit ex364 that is an interface unit for a recording medium that stores data in the same manner as the memory unit ex367.

Figure 32B:
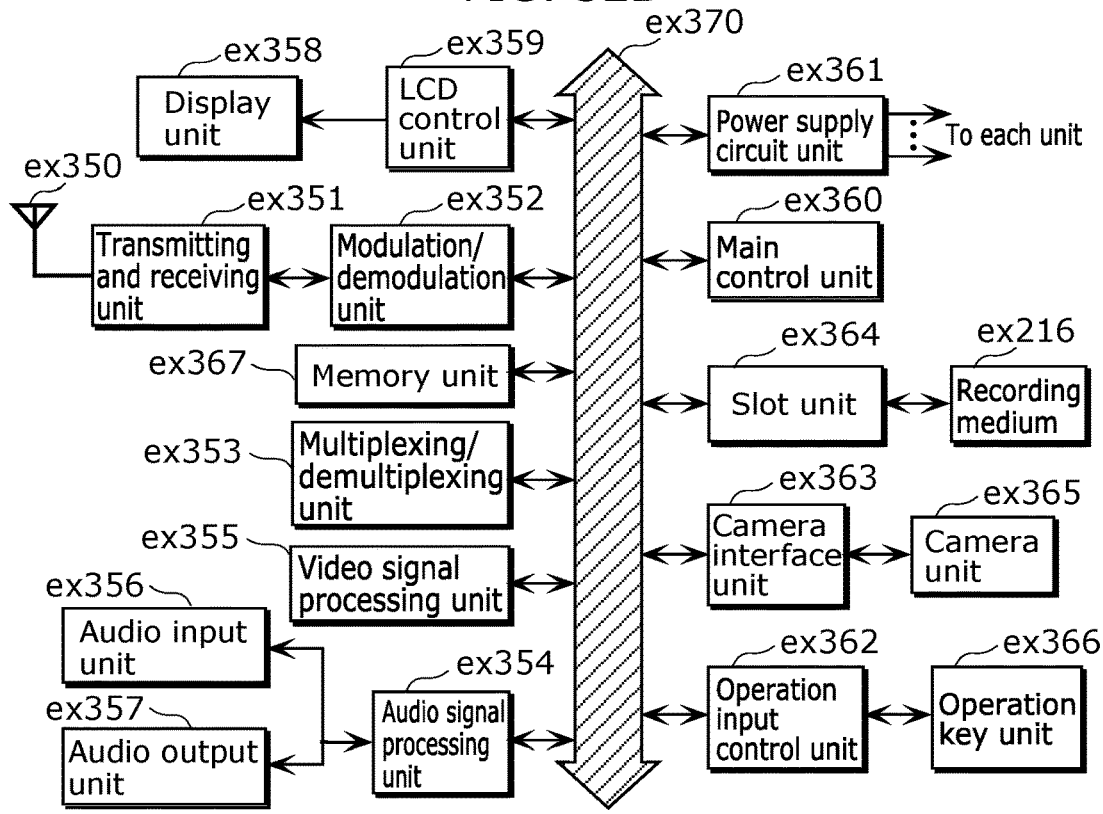
FIG. 32B is a block diagram showing an example of a configuration of the cellular phone.

Next, an example of a configuration of the cellular phone ex114 will be described with reference to FIG. 32B. In the cellular phone ex114, a main control unit ex360 designed to control overall each unit of the main body including the display unit ex358 as well as the operation keys ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation keys ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio are transmitted in data communication mode, the video signal processing unit ex355 compresses and codes video signals supplied from the camera unit ex365 using the moving picture coding method shown in each of the embodiments (that is, functions as the image coding apparatus according to an aspect of the present invention), and transmits the coded video data to the multiplexing/demultiplexing unit ex353. In contrast, while the camera unit ex365 is capturing video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of Embodiments (that is, functions as the image decoding apparatus according to an aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, it is possible for a terminal such as the cellular phone ex114 probably to have three types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method or the moving picture decoding method in each of the embodiments can be used in any of the devices and systems described above. Thus, the advantages described in each of the embodiment can be obtained.

Furthermore, the present invention is not limited to Embodiments, and various modifications and revisions are possible without departing from the scope of the present invention.

Embodiment 4

Video data can be generated by switching, as necessary, between (i) the moving picture coding method or the moving picture coding apparatus shown in each of Embodiments and (ii) a moving picture coding method or a moving picture coding apparatus in conformity with a different standard, such as MPEG-2, MPEG4-AVC, and VC-1.

Here, when a plurality of video data that conforms to the different standards is generated and is then decoded, the decoding methods need to be selected to conform to the different standards. However, since the standard to which each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method or by the moving picture coding apparatus shown in each of Embodiments will be hereinafter described. The multiplexed data is a digital stream in the MPEG-2 Transport Stream format.

FIG. 33 is a diagram showing a structure of multiplexed data. As illustrated in FIG. 33, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of a movie. Here, the primary video is normal video to be displayed on a screen, and the secondary video is video to be displayed on a smaller window in the main video. Furthermore, the interactive graphics stream represents an interactive screen to be generated by arranging the GUI components on a screen. The video stream is coded in the moving picture coding method or by the moving picture coding apparatus shown in each of the embodiments, or in a moving picture coding method or by a moving picture coding apparatus in conformity with a conventional standard, such as MPEG-2, MPEG4-AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary video to be mixed with the primary audio.

Figure 34:
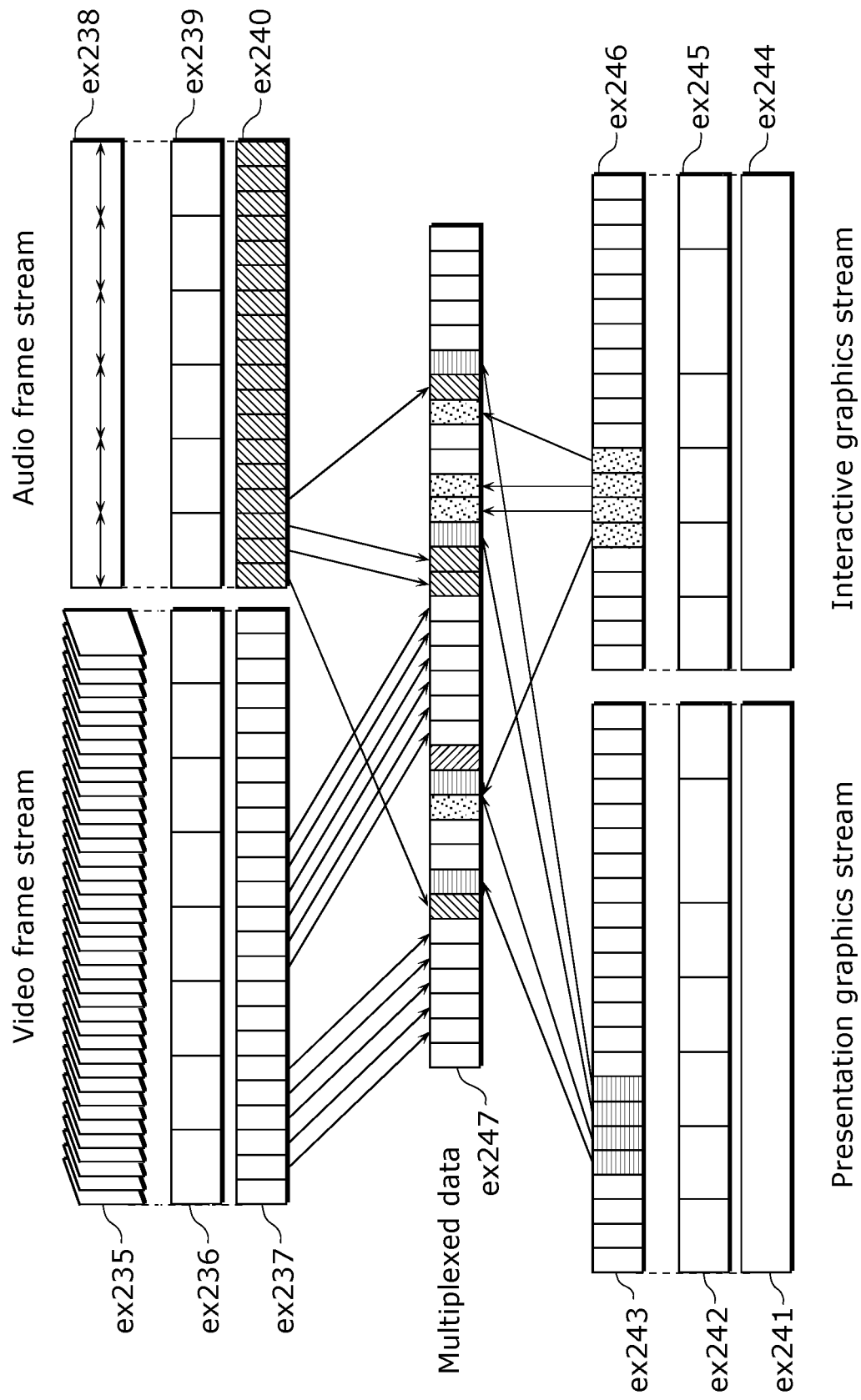
FIG. 34 schematically illustrates how each of streams is multiplexed in multiplexed data.

FIG. 34 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 35:
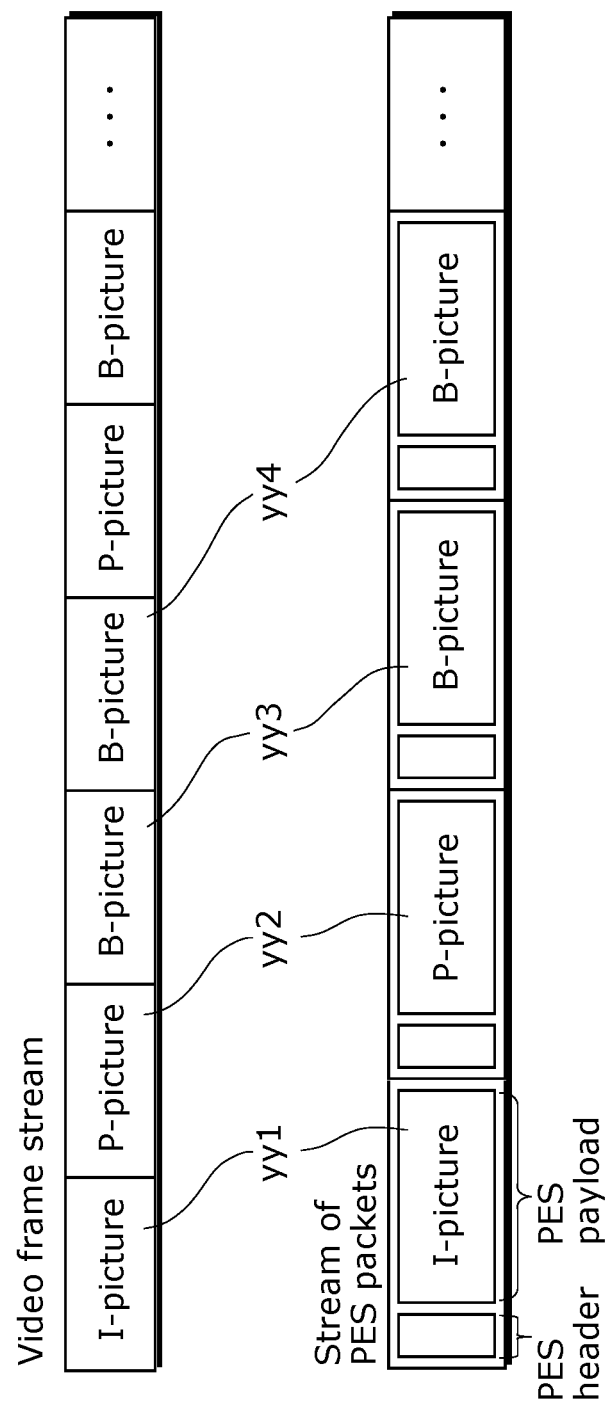
FIG. 35 illustrates how a video stream is stored in a stream of PES packets in more detail.

FIG. 35 illustrates how a video stream is stored in a stream of PES packets in more detail. The first bar in FIG. 35 shows a video frame stream in a video stream. The second bar shows the stream of PES packets. As indicated by arrows denoted as yy1, yy3, yy3, and yy5 in FIG. 35, the video stream is divided into pictures as I-pictures, B-pictures, and P-pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 36:
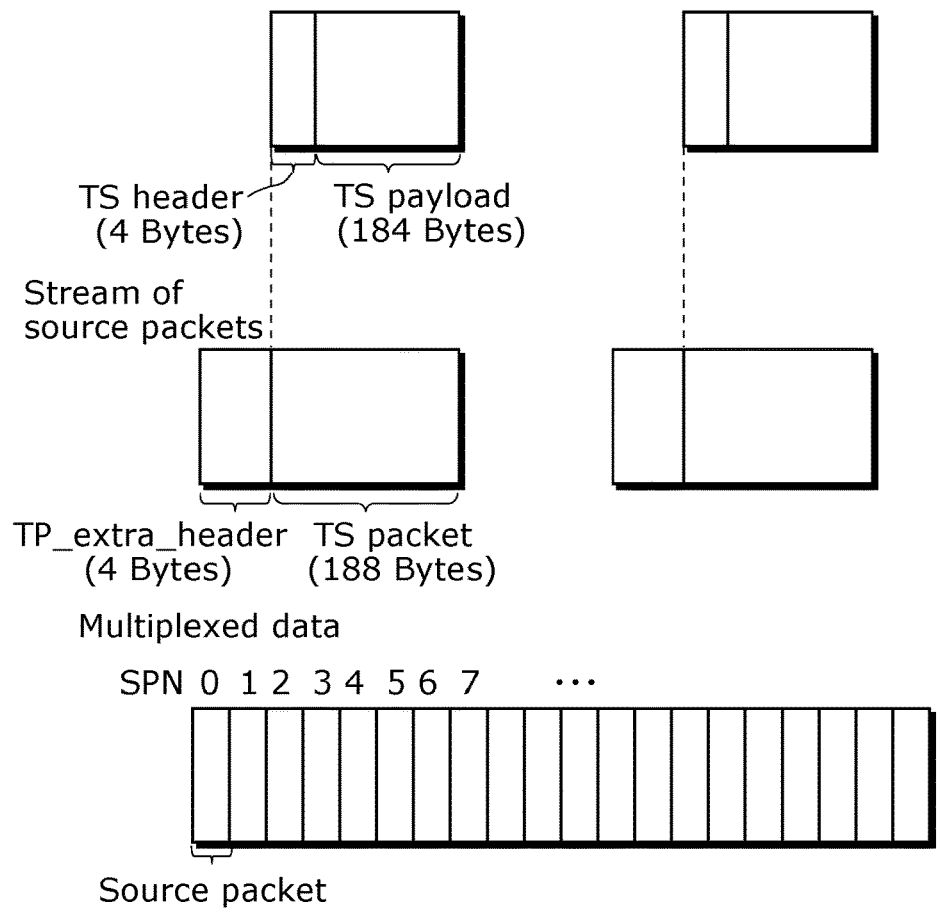
FIG. 36 shows a structure of TS packets and source packets in the multiplexed data.

FIG. 36 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 36. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 37:
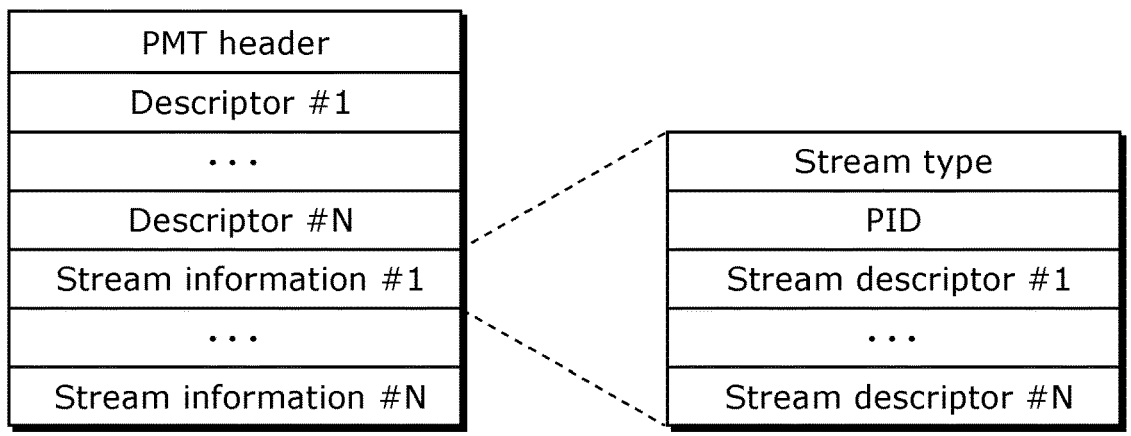
FIG. 37 illustrates a data structure of a PMT.

FIG. 37 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 38:
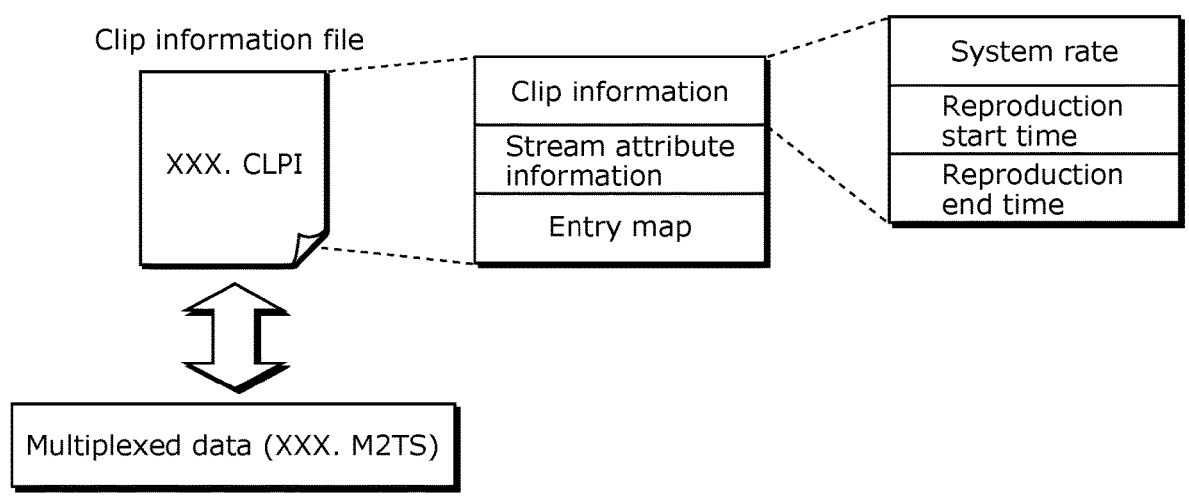
FIG. 38 illustrates an internal structure of multiplexed data information.

Each of the multiplexed data information files is management information of the multiplexed data as shown in FIG. 38. The multiplexed data information files are in one to one correspondence with the multiplexed data, and each of the files includes multiplexed data information, stream attribute information, and an entry map.

As illustrated in FIG. 38, the multiplexed data includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 39:
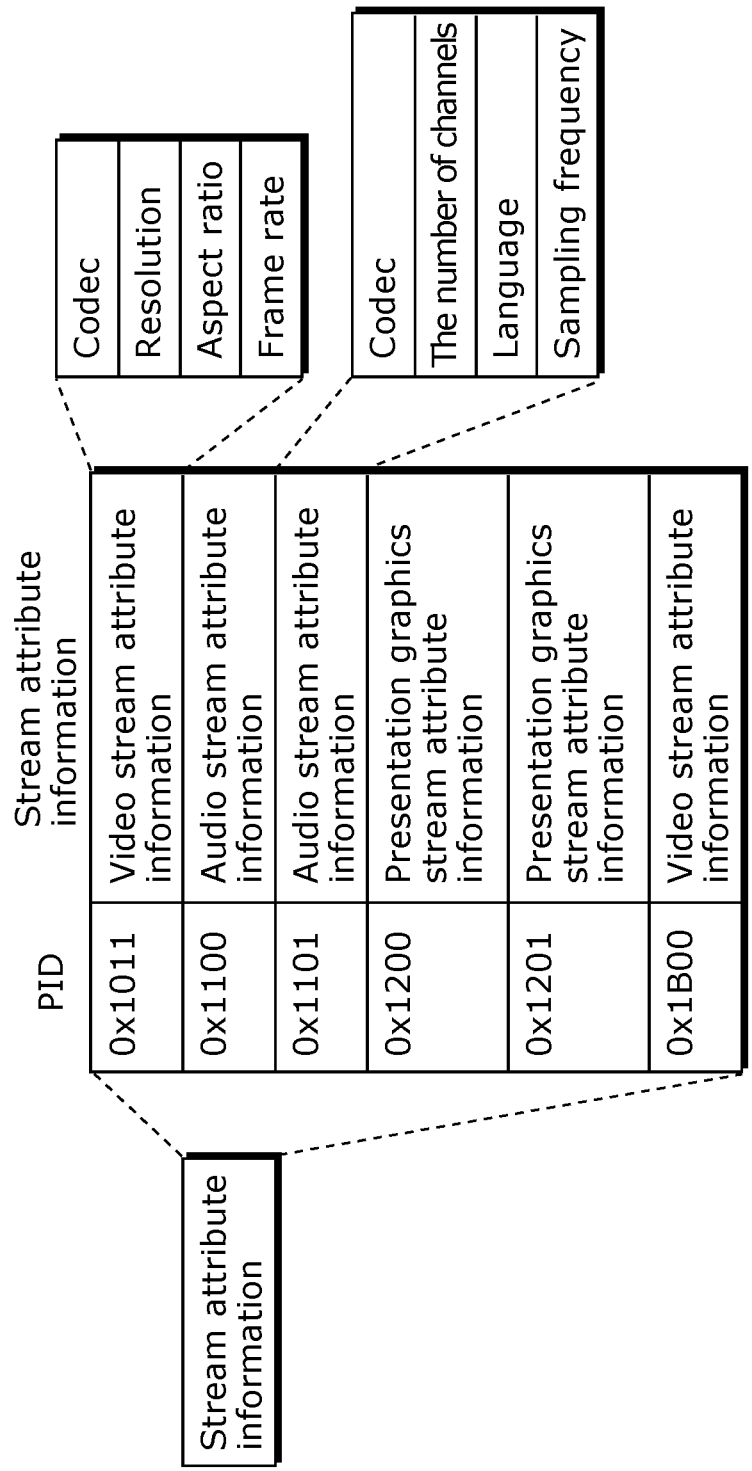
FIG. 39 shows an internal structure of stream attribute information.

As shown in FIG. 39, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is.

The video stream attribute information and the audio stream attribute information are used for initialization of a decoder before the player plays back the information.

In this embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of the embodiments includes a step or a unit for allocating unique information indicating video data generated by the moving picture coding method or the moving picture coding apparatus in each of the embodiments, to the stream type included in the PMT or the video stream attribute information. With the structure, the video data generated by the moving picture coding method or the moving picture coding apparatus described in each of the embodiments can be distinguished from video data that conforms to another standard.

Figure 40:
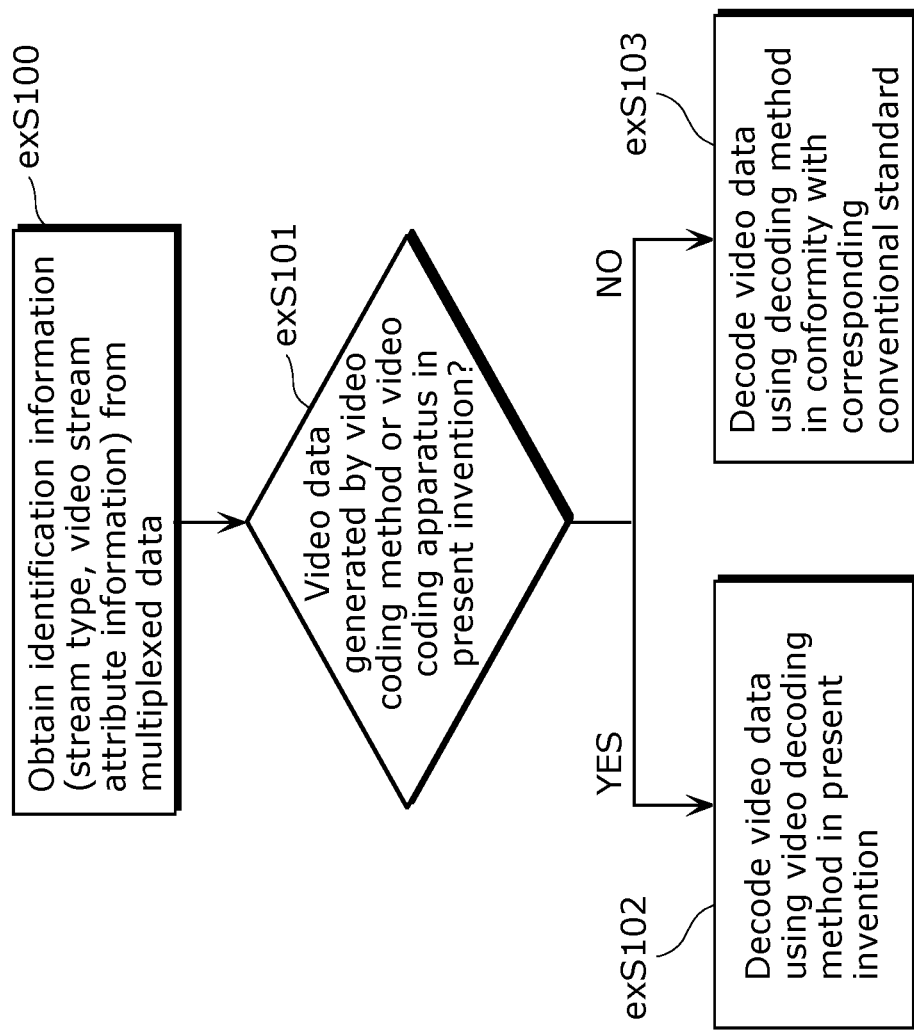
FIG. 40 shows steps for identifying video data.

Furthermore, FIG. 40 illustrates steps of the moving picture decoding method according to this embodiment. In Step exS100, the stream type included in the PMT or the video stream attribute information is obtained from the multiplexed data. Next, in Step exS101, it is determined whether or not the stream type or the video stream attribute information indicates that the multiplexed data is generated by the moving picture coding method or the moving picture coding apparatus in each of the embodiments. When it is determined that the stream type or the video stream attribute information indicates that the multiplexed data is generated by the moving picture coding method or the moving picture coding apparatus in each of the embodiments, in Step exS102, the stream type or the video stream attribute information is decoded by the moving picture decoding method in each of the embodiments. Furthermore, when the stream type or the video stream attribute information indicates conformance to the conventional standards, such as MPEG-2, MPEG4-AVC, and VC-1, in Step exS103, the stream type or the video stream attribute information is decoded by a moving picture decoding method in conformity with the conventional standards.

As such, allocating a new unique value to the stream type or the video stream attribute information enables determination whether or not the moving picture decoding method or the moving picture decoding apparatus that is described in each of the embodiments can perform decoding. Even upon an input of multiplexed data that conforms to a different standard, an appropriate decoding method or apparatus can be selected. Thus, it becomes possible to decode information without any error. Furthermore, the moving picture coding method or apparatus or the moving picture decoding method or apparatus in this embodiment can be used in any of the devices and systems described above.

Embodiment 5

Figure 41:
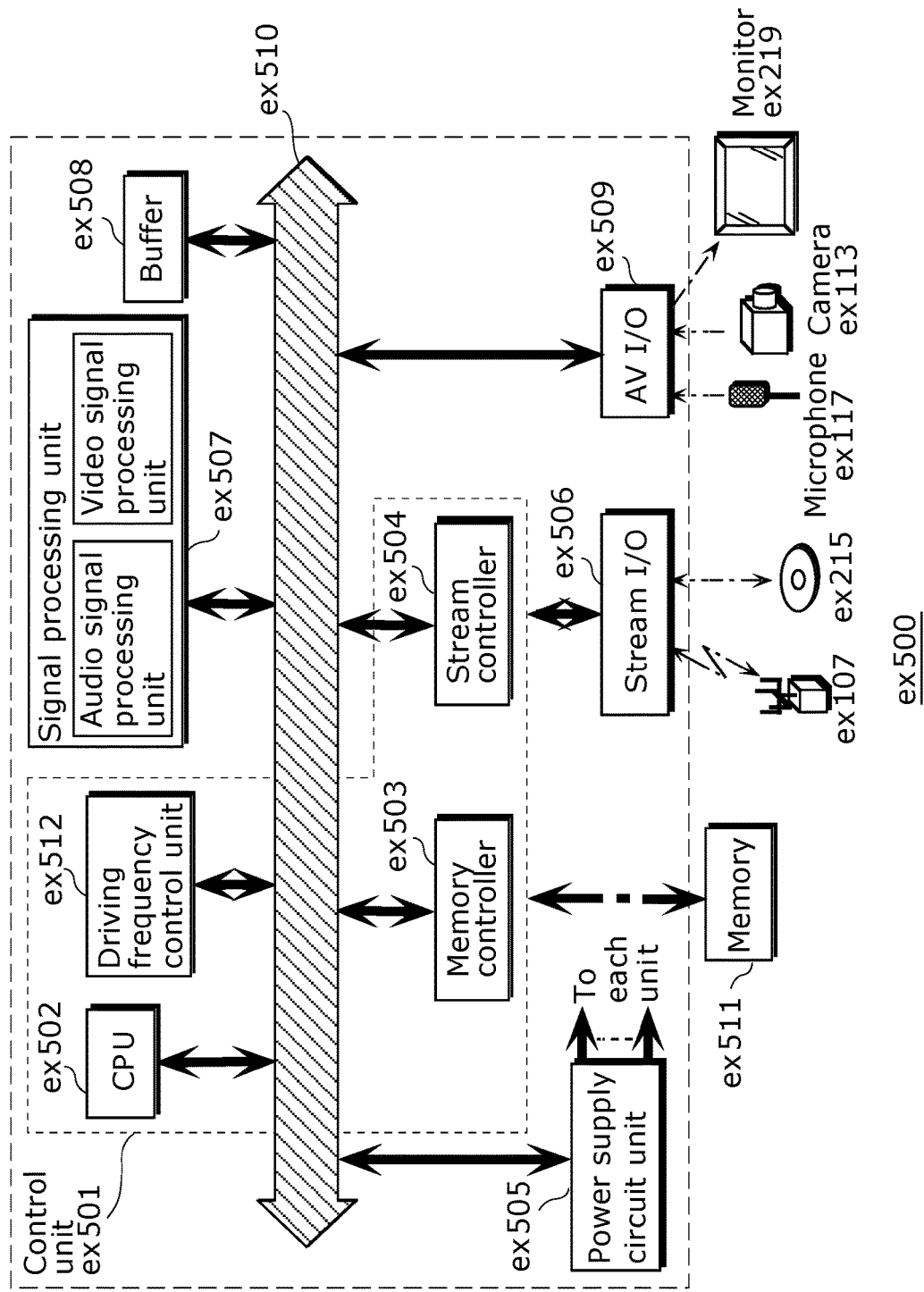
FIG. 41 is a block diagram illustrating an example of a configuration of an integrated circuit for implementing the moving picture coding method and the moving picture decoding method according to each of Embodiments.

Each of the moving picture coding method, the moving picture coding apparatus, the moving picture decoding method, and the moving picture decoding apparatus in each of the embodiments is typically achieved in the form of an integrated circuit or a Large Scale Integrated (LSI) circuit. As an example of the LSI, FIG. 41 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of the embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording media ex215. When data sets are multiplexed, the data sets should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may include the signal processing unit ex507, or an audio signal processing unit that is a part of the signal processing unit ex507. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 6

When video data generated by the moving picture coding method or by the moving picture coding apparatus described in each of the embodiments is decoded, it is possible for the processing amount to increase compared to when video data that conforms to a conventional standard, such as MPEG-2, MPEG4-AVC, and VC-1 is decoded. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 42:
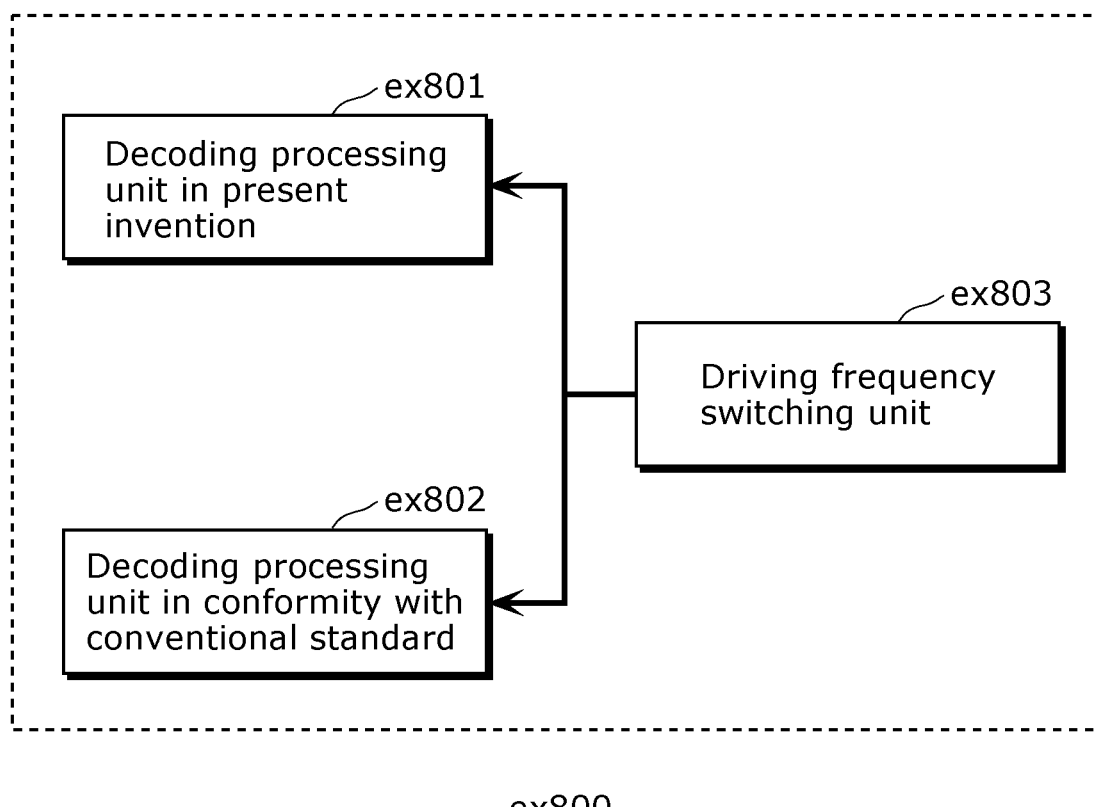
FIG. 42 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 42 illustrates a configuration ex800 in this embodiment. A driving frequency switching unit ex803 sets a driving frequency to a higher driving frequency when video data is generated by the moving picture coding method or the moving picture coding apparatus described in each of the embodiments. Then, the driving frequency switching unit ex803 instructs a decoding processing unit ex801 that executes the moving picture decoding method described in each of the embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of the embodiments. Then, the driving frequency switching unit ex803 instructs the decoding processing unit ex802 that conforms to the conventional standard to decode the video data.

More specifically, the driving frequency switching unit ex804 includes the CPU ex512 and the driving frequency control unit ex512 in FIG. 41. Here, each of the decoding processing unit ex801 that executes the moving picture decoding method described in each of the embodiments and the decoding processing unit ex802 that conforms to the conventional standard corresponds to the signal processing unit ex507 in FIG. 41. The CPU ex502 determines to which standard the video data conforms. Then, the driving frequency control unit ex512 determines a driving frequency based on a signal from the CPU ex502. Furthermore, the signal processing unit ex507 decodes the video data based on a signal from the CPU ex502. For example, the identification information described in Embodiment 4 is probably used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 44. The driving frequency can be selected by storing the look-up table in the buffer ex508 and an internal memory of an LSI, and with reference to the look-up table by the CPU ex502.

Figure 43:
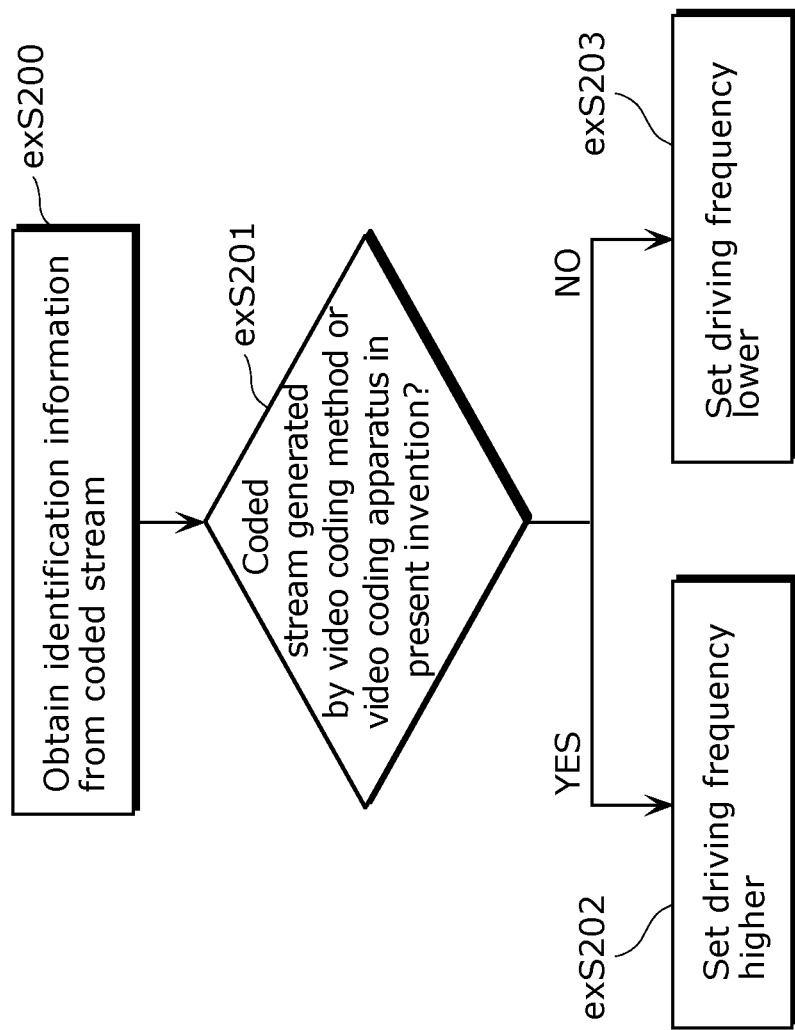
FIG. 43 shows steps for identifying video data and switching between driving frequencies.

FIG. 43 illustrates steps for executing a method in this embodiment. First, in Step exS200, the signal processing unit ex507 obtains identification information from the multiplexed data. Next, in Step exS201, the CPU ex502 determines whether or not the video data is generated based on the identification information by the coding method and the coding apparatus described in each of the embodiments. When the video data is generated by the coding method or the coding apparatus described in each of the embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG4-AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the coding method or the coding apparatus described in each of the embodiments.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the computing amount for decoding is larger, the driving frequency may be set higher, and when the computing amount for decoding is smaller, the driving frequency may be set lower as the method for setting the driving frequency. Thus, the setting method is not limited to the ones described above. For example, when the computing amount for decoding video data in conformity with MPEG4-AVC is larger than the computing amount for decoding video data generated by the moving picture coding method or the moving picture coding apparatus described in each of the embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method or the moving picture coding apparatus described in each of the embodiments, the voltage to be applied to the LSI ex500 or the apparatus including the LSI ex500 is probably set higher. When the identification information indicates that the video data conforms to the conventional standard, such as MPEG-2, MPEG4-AVC, and VC-1, the voltage to be applied to the LSI ex500 or the apparatus including the LSI ex500 is probably set lower. As another example, when the identification information indicates that the video data is generated by the moving picture coding method or the video coding apparatus described in each of the embodiments, the driving of the CPU ex502 does not probably have to be suspended. When the identification information indicates that the video data conforms to the conventional standard, such as MPEG-2, MPEG4-AVC, and VC-1, the driving of the CPU ex502 is probably suspended at a given time because the CPU ex502 has extra processing capacity. Even when the identification information indicates that the video data is generated by the moving picture coding method or the moving picture coding apparatus described in each of the embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG4-AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 7

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problems, what is conceived is a configuration in which the decoding processing unit for implementing the moving picture decoding method described in each of the embodiments and the decoding processing unit that conforms to the conventional standard, such as MPEG-2, MPEG4-AVC, and VC-1 are partly shared. ex900 in FIG. 45A shows an example of the configuration. For example, the moving picture decoding method described in each of the embodiments and the moving picture decoding method that conforms to MPEG4-AVC have, partly in common, the details of processing, such as entropy coding, inverse quantization, deblocking filtering, and motion compensation. The details of processing to be shared probably include use of a decoding processing unit ex902 that conforms to MPEG4-AVC. In contrast, a dedicated decoding processing unit ex901 is probably used for other processing which is unique to the present invention and does not conform to MPEG-4 AVC. The decoding processing unit for implementing the moving picture decoding method described in each of the embodiments may be shared for the processing to be shared, and a dedicated decoding processing unit may be used for processing unique to that of MPEG4-AVC.

Furthermore, ex1000 in FIG. 45B shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing of the aspect of the present invention and the processing of the conventional standard, respectively, and may be the ones capable of implementing general processing. Furthermore, the configuration of this embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

INDUSTRIAL APPLICABILITY

A moving picture coding apparatus and a moving picture decoding apparatus according to an aspect of the present invention can be applied to a television receiver, a digital video recorder, car navigation, a cellular phone, a digital camera, and a digital video camera, for instance.

REFERENCE SIGNS LIST

100 Moving picture coding apparatus
101, 201 Intra/inter prediction unit
102 Coding control unit
111 Subtractor
112 Transform unit
113 Quantization unit
114 Entropy coding unit
115, 212 Inverse quantization unit
116, 213 Inverse transform unit
117, 214 Adder
118, 215 Memory
121, 221 Determining unit
122, 222 Adjusting unit
123, 223 Disparity vector obtaining unit
124, 224 Position adjusting unit
125, 225 Adding unit
200 Moving picture decoding apparatus
202 Decoding control unit
211 Entropy decoding unit

The invention claimed is:

1. A moving picture coding method for coding a current picture using a list including at least one motion vector, the method comprising:
   determining whether or not a first picture including a co-located block and the current picture are included in a same view, the co-located block being included in the first picture different from the current picture and is at a first position corresponding to a second position of the current block included in the current picture;
   when a first view including the first picture and a current view including the current picture are different from each other,
   adjusting the first position of the co-located block to a third position; and
   adding, to the list, a motion vector derived from the co-located block at the third position, and
   when the first view and the current view are same,
   adding, to the list, a motion vector derived from the co-located block at the first position;
   selecting a motion vector from the list; and
   coding the current block using the selected motion vector, wherein the adjusting includes:
   obtaining a disparity vector between the first view and the current view; and
   moving the first position of the co-located block in a direction indicated by the obtained disparity vector, and by a distance indicated by the obtained disparity vector, to adjust the first position to the third position.

2. A moving picture decoding method for decoding a current picture using a list including at least one motion vector, the method comprising:
   determining whether or not a first picture including a co-located block and the current picture are included in a same view, the co-located block being included in the first picture different from the current picture and is at a first position corresponding to a second position of the current block included in the current picture;
   when a first view including the first picture and a current view including the current picture are different from each other, adjusting the first position of the co-located block to a third position; and adding, to the list, a motion vector derived from the co-located block at the third position, and when the first view and the current view are same, adding, to the list, a motion vector derived from the co-located block at the first position;

selecting a motion vector from the list; and coding the current block using the selected motion vector, wherein the adjusting includes:

obtaining a disparity vector between the first view and the current view; and moving the first position of the co-located block in a direction indicated by the obtained disparity vector, and by a distance indicated by the obtained disparity vector, to adjust the first position to the third position.

* * * * *